US012605923B2

(12) United States Patent
Talda et al.

(10) Patent No.: US 12,605,923 B2
(45) Date of Patent: Apr. 21, 2026

(54) PACKAGING MATERIAL HAVING EXPANDABLE LAYERS

(71) Applicant: IOW, LLC, Renton, WA (US)

(72) Inventors: Timothy Alan Talda, Renton, WA (US); John Michael Moran, West Linn, OR (US)

(73) Assignee: IOW, LLC, Renton, WA (US)

( * ) Notice: Subject to any disclaimer, the term of this patent is extended or adjusted under 35 U.S.C. 154(b) by 0 days.

(21) Appl. No.: 18/537,690

(22) Filed: Dec. 12, 2023

(65) Prior Publication Data

US 2024/0149576 A1 May 9, 2024

Related U.S. Application Data

(63) Continuation-in-part of application No. 17/514,005, filed on Oct. 29, 2021, now Pat. No. 11,931,985.
(Continued)

(51) Int. Cl.
| | |
|---|---|
| *B65D 81/03* | (2006.01) |
| *B32B 3/26* | (2006.01) |
| *B32B 7/14* | (2006.01) |
| *B32B 29/00* | (2006.01) |
| *B32B 29/08* | (2006.01) |

(Continued)

(52) U.S. Cl.
CPC ............ *B32B 29/005* (2013.01); *B32B 3/266* (2013.01); *B32B 7/14* (2013.01); *B32B 29/08* (2013.01); *B32B 37/1284* (2013.01); *B32B 37/20* (2013.01); *B65D 65/403* (2013.01); *B32B 2250/26* (2013.01); *B32B 2317/122* (2013.01);
(Continued)

(58) Field of Classification Search
CPC .......... B31D 2205/0035; B31D 5/0043; B31D 5/0065; B65D 65/406; B65D 81/02; B65D 81/03; B65D 81/1075
USPC ............... 229/87.02; 206/521, 814, 591, 594
See application file for complete search history.

(56) References Cited

U.S. PATENT DOCUMENTS

| | | | |
|---|---|---|---|
| 2,203,084 A | 6/1940 | Evans |
| 2,728,479 A | 12/1955 | Wheeler |

(Continued)

FOREIGN PATENT DOCUMENTS

| | | |
|---|---|---|
| JP | 2020164248 | 11/2020 |
| WO | 2019040624 | 2/2019 |

(Continued)

OTHER PUBLICATIONS

International Search Report, PCT/US2024/059537, mailed Feb. 19, 2025.
(Continued)

*Primary Examiner* — Don M Anderson
*Assistant Examiner* — Elizabeth J Volz
(74) *Attorney, Agent, or Firm* — Sand, Sebolt & Wernow Co., LPA

(57) ABSTRACT

A packaging material including one or more expandable layers that provide protection to contents of a packaging enclosure formed with the packaging material. The packaging material includes at least a first layer and a second layer bonded to one another. The first layer is pulled or extended in a first direction that is effective to cause the second layer to expand in a second direction. The second layer is a cut-patterned layer which increases in thickness and provides structural strength to the packaging material when expanded.

20 Claims, 28 Drawing Sheets

Related U.S. Application Data

(60) Provisional application No. 63/153,918, filed on Feb. 25, 2021, provisional application No. 63/111,544, filed on Nov. 9, 2020.

(51) Int. Cl.
| | |
|---|---|
| *B32B 37/12* | (2006.01) |
| *B32B 37/20* | (2006.01) |
| *B65D 65/40* | (2006.01) |

(52) U.S. Cl.
CPC ..... *B32B 2317/127* (2013.01); *B32B 2553/02* (2013.01)

(56) References Cited

U.S. PATENT DOCUMENTS

| | | | |
|---|---|---|---|
| 3,212,229 | A | 10/1965 | Vreeland et al. |
| 3,330,090 | A | 7/1967 | Court et al. |
| 3,501,887 | A | 3/1970 | Umholtz et al. |
| 3,762,125 | A | 10/1973 | Prena |
| 3,796,021 | A | 3/1974 | Toss |
| 3,968,272 | A | 7/1976 | Balk |
| 4,011,798 | A | 3/1977 | Bambara et al. |
| 4,169,345 | A | 10/1979 | Douwenga |
| 4,236,652 | A | 12/1980 | Beguhn |
| 4,331,725 | A | 5/1982 | Akao |
| 4,550,046 | A | 10/1985 | Miller |
| 5,235,792 | A | 8/1993 | Hanagata |
| 5,241,800 | A | 9/1993 | Steinke et al. |
| 5,394,778 | A | 3/1995 | Sakowski |
| 5,487,470 | A | 1/1996 | Pharo |
| 5,519,982 | A | 5/1996 | Herber et al. |
| 5,538,778 | A | 7/1996 | Hurwitz et al. |
| 5,544,473 | A * | 8/1996 | Maida .................... B65D 81/03 |
| | | | 229/928 |
| 5,688,578 | A | 11/1997 | Goodrich |
| 5,910,138 | A | 6/1999 | Sperko et al. |
| 6,058,681 | A | 5/2000 | Recchia, Jr. |
| 6,996,951 | B2 | 2/2006 | Smith et al. |
| 9,315,354 | B2 | 4/2016 | Tommasi |
| 10,226,907 | B2 | 3/2019 | Goodrich |
| 10,442,574 | B2 | 10/2019 | Kuchar et al. |
| 10,669,054 | B1 | 6/2020 | Hoffman |
| 10,773,839 | B1 | 9/2020 | Talda |
| 10,850,891 | B2 * | 12/2020 | Yan ......................... B31B 70/20 |
| 10,981,712 | B2 | 4/2021 | Goodrich |
| 11,130,620 | B1 | 9/2021 | Hoffman |
| 11,260,615 | B2 | 3/2022 | Cheich |
| 11,572,225 | B2 | 2/2023 | Wehrmann |
| 11,702,261 | B2 | 7/2023 | Goodrich |
| 11,718,435 | B2 | 8/2023 | Magnell et al. |
| 11,801,981 | B2 | 10/2023 | Wetsch |
| 11,931,985 | B2 | 3/2024 | Talda |
| 12,017,820 | B2 | 6/2024 | Yan |
| 12,168,334 | B2 | 12/2024 | Kuchar et al. |
| 2001/0009089 | A1 | 7/2001 | Todd et al. |
| 2003/0089817 | A1 | 5/2003 | Hanson et al. |
| 2003/0208988 | A1 | 11/2003 | Buckley |
| 2004/0040262 | A1 | 3/2004 | Palumbo |
| 2006/0169753 | A1 | 8/2006 | Piucci |
| 2006/0218881 | A1 | 10/2006 | Sperry et al. |
| 2007/0175181 | A1 | 8/2007 | Harper |
| 2009/0013655 | A1 | 1/2009 | Monti |
| 2009/0277140 | A1 | 11/2009 | Tsuruta et al. |
| 2010/0011710 | A1 | 1/2010 | Pape |
| 2012/0222393 | A1 | 9/2012 | Vaccari |
| 2015/0059290 | A1 | 3/2015 | Ewert |
| 2015/0140265 | A1 | 5/2015 | Page |
| 2015/0239635 | A1 | 8/2015 | Mcdonald |
| 2015/0329230 | A1 | 11/2015 | Rasi |
| 2016/0067938 | A1 | 3/2016 | Goodrich |
| 2016/0159510 | A1 | 6/2016 | Lau |
| 2016/0280425 | A1 | 9/2016 | Wehrmann et al. |
| 2017/0107017 | A1 | 4/2017 | Kuchar et al. |
| 2017/0203866 | A1 | 7/2017 | Goodrich |
| 2017/0225813 | A1 | 8/2017 | Wehrmann |
| 2017/0313017 | A1 | 11/2017 | Cheich et al. |
| 2018/0022493 | A1 | 1/2018 | Lamb |
| 2018/0086491 | A1 | 3/2018 | Campbell |
| 2018/0118397 | A1 | 5/2018 | Blackford |
| 2018/0141686 | A1 | 5/2018 | Christman et al. |
| 2018/0265228 | A1 | 9/2018 | Hagestedt et al. |
| 2018/0273226 | A1 | 9/2018 | Lancaster, III et al. |
| 2018/0346166 | A1 | 12/2018 | Chang |
| 2019/0062028 | A1 | 2/2019 | Getty et al. |
| 2019/0100369 | A1 * | 4/2019 | Hoffman .............. B65D 65/406 |
| 2019/0276168 | A1 | 9/2019 | Gasparini et al. |
| 2020/0198823 | A1 | 6/2020 | Bauer et al. |
| 2020/0207500 | A1 | 7/2020 | Kalinowski et al. |
| 2020/0307866 | A1 | 10/2020 | Yan |
| 2020/0331648 | A1 | 10/2020 | Lees |
| 2020/0346793 | A1 | 11/2020 | Holmes |
| 2020/0377278 | A1 | 12/2020 | Orsini et al. |
| 2020/0385154 | A1 | 12/2020 | Campbell |
| 2020/0407088 | A1 | 12/2020 | White et al. |
| 2021/0009291 | A1 | 1/2021 | Campbell |
| 2021/0206535 | A1 | 7/2021 | Yan |
| 2021/0229849 | A1 | 7/2021 | Sabato et al. |
| 2021/0252821 | A1 | 8/2021 | Goodrich |
| 2021/0253289 | A1 | 8/2021 | Hirohashi |
| 2022/0002059 | A1 | 1/2022 | Asayama |
| 2022/0002069 | A1 | 1/2022 | Wetsch |
| 2022/0041312 | A1 | 2/2022 | Vilag et al. |
| 2022/0119181 | A1 | 4/2022 | Goodrich |
| 2022/0135308 | A1 | 5/2022 | Wetsch |
| 2022/0219852 | A1 | 7/2022 | Matsuhisa |
| 2023/0002096 | A1 | 1/2023 | Talda et al. |
| 2023/0322445 | A1 | 10/2023 | Yan |
| 2023/0391040 | A1 | 12/2023 | Macgillivary |
| 2024/0018725 | A1 | 1/2024 | Halcomb et al. |
| 2024/0051725 | A1 | 2/2024 | Starks et al. |
| 2024/0100800 | A1 | 3/2024 | Wetsch |
| 2024/0190117 | A1 | 6/2024 | Talda |
| 2024/0286372 | A1 | 8/2024 | Goodrich |
| 2024/0300698 | A1 | 9/2024 | Yan |
| 2024/0368839 | A1 | 11/2024 | Goodrich |
| 2024/0375824 | A1 | 11/2024 | Wetsch |
| 2025/0214731 | A1 | 7/2025 | Shibata |

FOREIGN PATENT DOCUMENTS

| | | | |
|---|---|---|---|
| WO | 2022098599 | | 5/2022 |
| WO | 2022128691 | | 9/2022 |
| WO | 2022182691 | A1 | 9/2022 |

OTHER PUBLICATIONS

International Search Report, PCT/US2024/059547, mailed Feb. 19, 2025.

International Search Report, PCT/US21/57550, mailed Jan. 31, 2022, 10 pages.

International Search Report, PCT/US22/43666, mailed Jan. 3, 2023, 17 pages.

Examination Report Under Section 18(3), PCT/US21/57550, dated May 21, 2024, 13 pages.

Extended European Search Report, PCT/US21/57550, dated Sep. 9, 2024, 8 pages.

International Search Report, PCT/US2025/049992, dated Dec. 4, 2025, 14 pages.

International Search Report, PCT/US2025/049967, dated Dec. 1, 2025, 8 pages.

International Search Report, PCT/US2024/049979, dated Dec. 4, 2025, 14 pages.

* cited by examiner

2/28

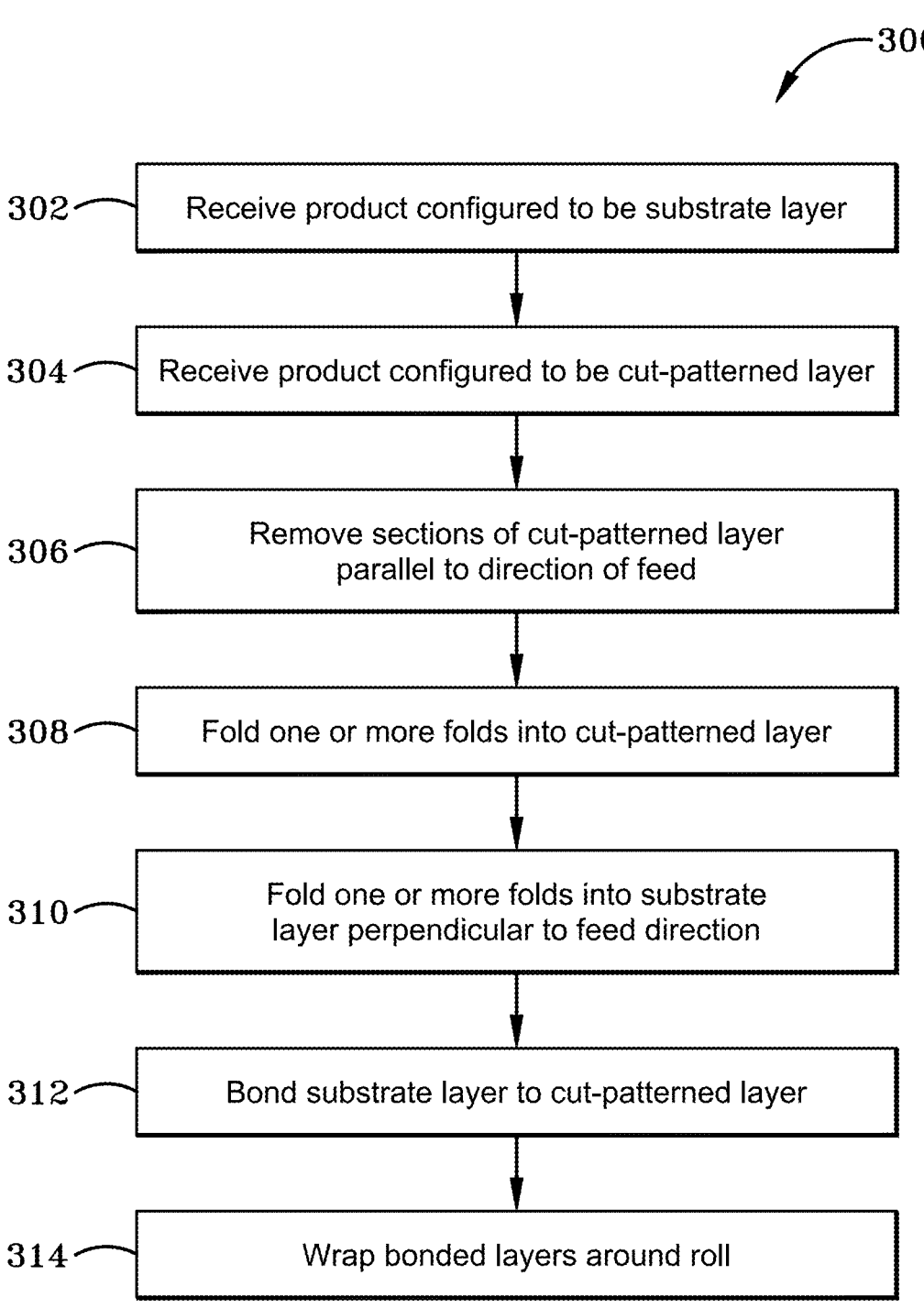

302 — Receive product configured to be substrate layer

304 — Receive product configured to be cut-patterned layer

306 — Remove sections of cut-patterned layer parallel to direction of feed

308 — Fold one or more folds into cut-patterned layer

310 — Fold one or more folds into substrate layer perpendicular to feed direction 312 — Bond substrate layer to cut-patterned layer 314 — Wrap bonded layers around roll

FIG.10

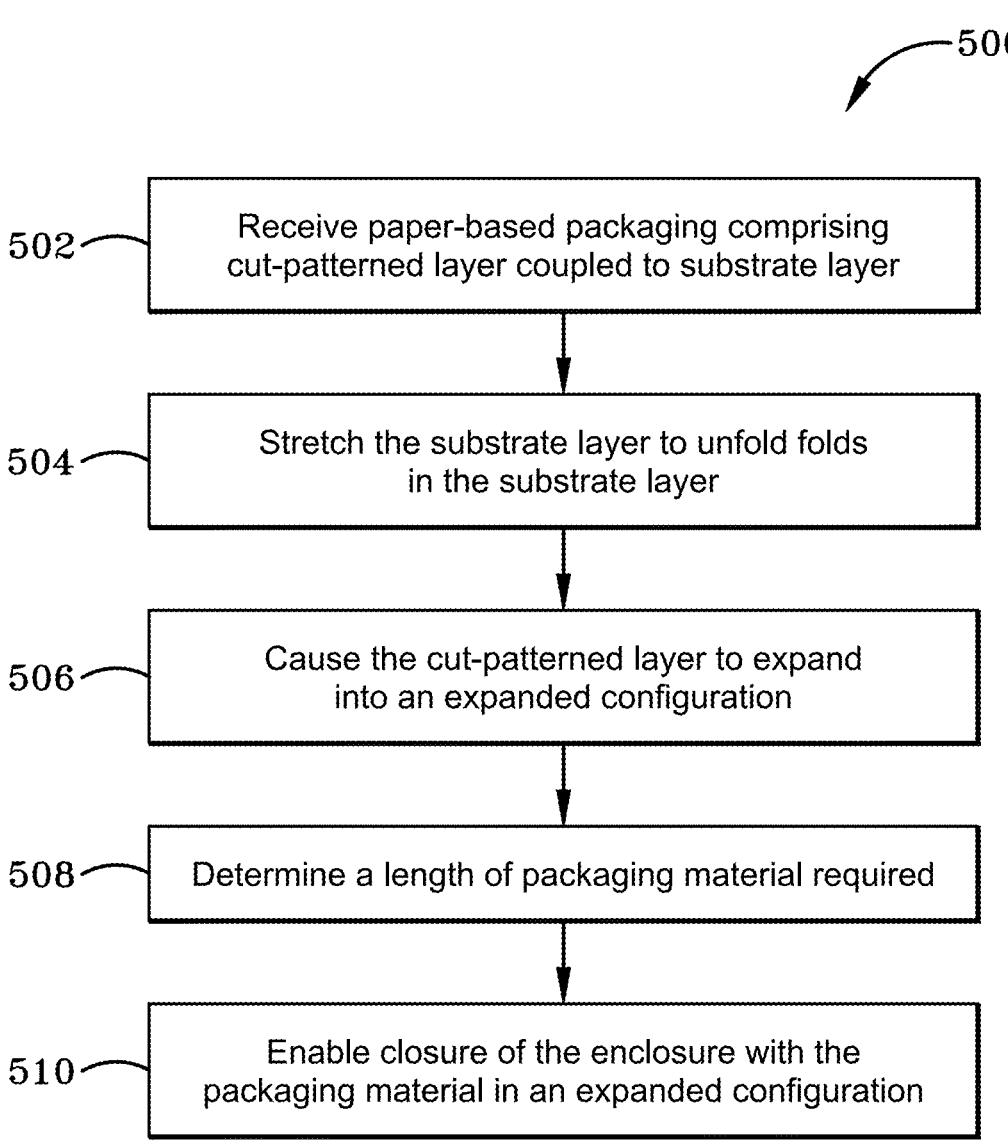

500

502 — Receive paper-based packaging comprising cut-patterned layer coupled to substrate layer 504 — Stretch the substrate layer to unfold folds in the substrate layer 506 — Cause the cut-patterned layer to expand into an expanded configuration 508 — Determine a length of packaging material required 510 — Enable closure of the enclosure with the packaging material in an expanded configuration

SEE FIG.16A 701a          701

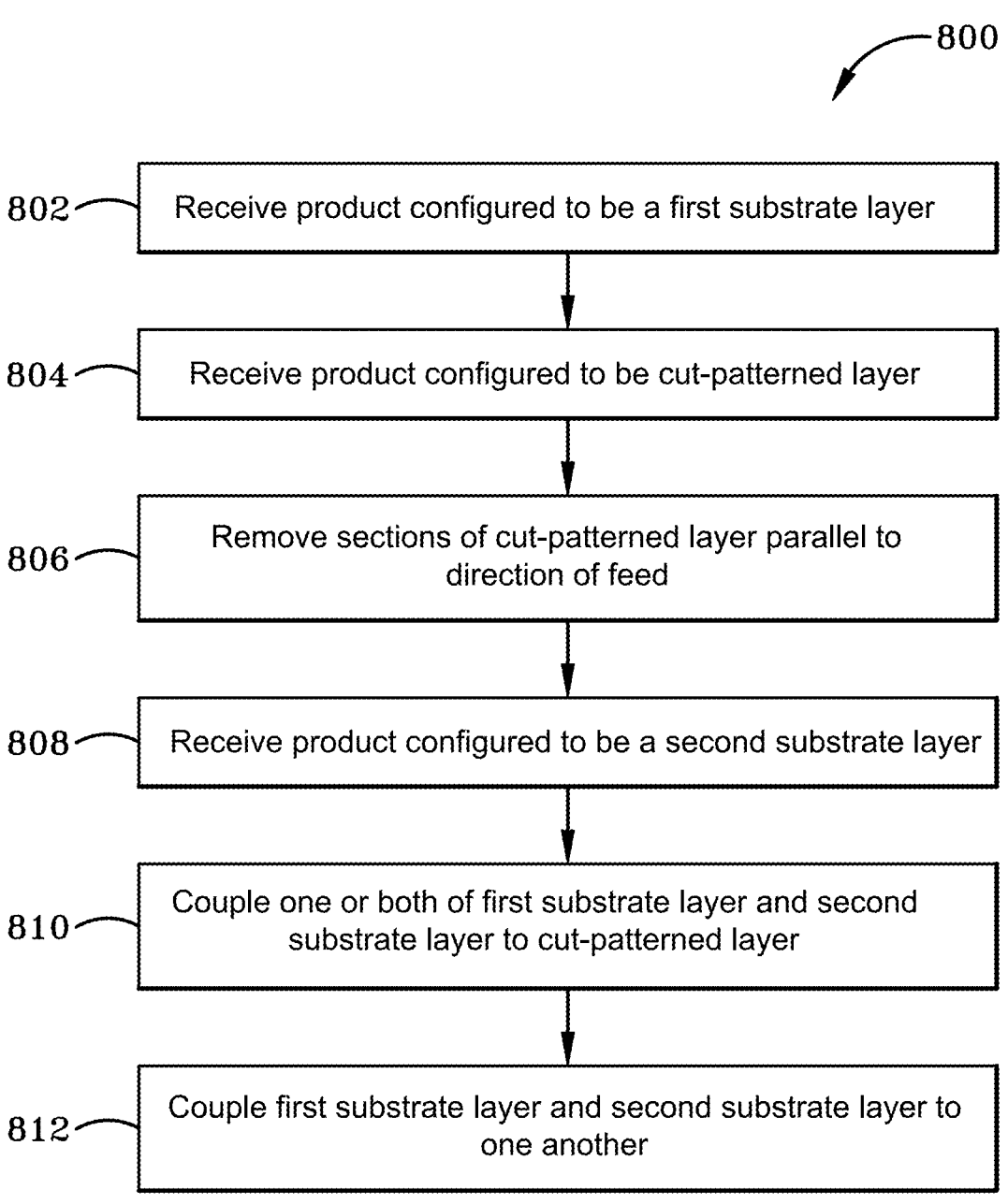

800

802 — Receive product configured to be a first substrate layer

804 — Receive product configured to be cut-patterned layer

806 — Remove sections of cut-patterned layer parallel to direction of feed

808 — Receive product configured to be a second substrate layer

810 — Couple one or both of first substrate layer and second substrate layer to cut-patterned layer 812 — Couple first substrate layer and second substrate layer to one another

FIG.22

PACKAGING MATERIAL HAVING EXPANDABLE LAYERS

REFERENCE TO RELATED APPLICATIONS

This application is a Continuation-in Part of U.S. patent application Ser. No. 17/514,005, filed Oct. 29, 2021.

U.S. patent application Ser. No. 17/514,005 filed Oct. 29, 2021, claims the benefit of U.S. Provisional Application Ser. No. 63/111,544 filed on Nov. 9, 2020.

U.S. patent application Ser. No. 17/514,005 filed Oct. 29, 2021, also claims the benefit of U.S. Provisional Application Ser. No. 63/153,918 filed on Feb. 25, 2021.

The entire disclosures of the above-referenced patent applications are incorporated herein by reference.

TECHNICAL FIELD

This disclosure is generally directed to packaging materials. More particularly this disclosure is directed to a fully-recyclable packaging material which is able to be formed into packaging enclosures for products. In particular, the packaging material is of a type which may be formed in real-time into a packaging enclosure as part of an on-demand packaging system such as would be useful at a large online retailer, for example. Specifically, the disclosure relates to a packaging material comprising at least a first layer and a second layer which are selectively expandable. When moved from an unexpanded condition to an expanded condition, a thickness of the first layer will decrease and a thickness of the second layer will increase.

BACKGROUND ART

Online shopping has greatly increased the need for packaging products and services that enable safe transit and delivery of items and other goods to the consumer. However, many packaging materials are not recyclable, may be bulky, and tend to get discarded in a landfill after use.

Paper-based packaging products, such as rigid corrugate paperboard (e.g. cardboard), may be recyclable and more environmentally responsible than other types of packaging. However, such cardboard packaging has a limited ability to protect a packaged item if the cardboard is folded because the strength of the cardboard is compromised by such folding and previous package assembly processes. Furthermore, cardboard typically requires an item to be placed in preformed boxed packaging that does not conform to a shape or size of the item to be shipped. While the most appropriately shaped and sized cardboard packaging will typically be selected, it is usually necessary to include additional packaging material (e.g. foam pellets or plastic air pouches) in the packaging to provide adequate protection to the item retained therein. Many of these additional packaging materials are not recyclable. Consequently, to sufficiently protect items during distribution and shipping there is an increased shipping cost and an increased environmental cost. The need for these additional materials also introduces a level of complexity into the packaging of items. As such, current packaging products, systems, and methods leave much to be desired with respect to recyclability, environmental impact, flexibility, and costs.

SUMMARY OF THE INVENTION

The present disclosure is directed to an apparatus and method for producing a packaging material with one or more expandable layers and to a packaging enclosure formed therewith. In various aspects, a packaging material in accordance with the present disclosure includes at least two layers, namely, a first layer, also referred to herein as a substrate layer, and a second layer, also referred to herein as a cut-patterned layer. In other aspects, a packaging material in accordance with the present disclosure includes at least three layers namely, a first layer, also referred to herein as a first substrate layer, a second layer, also referred to herein as a cut-patterned layer, and a third layer, also referred to herein as a second substrate layer. In either implementation, the first layer is pulled or extended in at least a first direction that is effective to the first layer to expand and additionally causes the second layer of the packaging material to expand. The second layer expands in the first direction and additionally expands in a second direction orthogonal to the first direction. In the packaging material having at least three layers, the third layer is furthermore pulled or extended in the first direction with the first layer and the second layer. Once expanded, the second layer provides the benefit of creating structural strength in the packaging material.

The two or more layers or at least some of the three or more layers operatively engaged with one another and may be formed into a roll, a sheet, a sleeve, or the like. The packaging material is able to be shipped or moved to a location where products are to be packaged in the packaging material. The packaging material may be shipped in a contracted condition, i.e. unexpanded condition and is then expanded during fabrication of a packaging enclosure with the packaging material. When the packaging material is moved from the contracted or unexpanded condition to the expanded condition, the two or more layers are secured together so that the packaging material will remain in the expanded condition. As such, the disclosed packaging material with expanding layers is suitable for various levels of packaging automation, customer site packaging operations, or preforming into a variety of customized sizes or shapes of packaging enclosure.

In one aspect, a packaging enclosure formed from the disclosed packaging material closely conforms to a size of the item to be packaged therein and because of the inherent structural strength of the packaging material, no additional packaging fillers are needed to protect the product being shipped in the enclosure. In this way, the customized packaging requires the consumption of less packaging material than was the case with previously known packaging materials. As a consequence, the customized packaging in accordance with the present disclosure is less expensive to use and more environmentally friendly than previously known packaging materials as there is less packaging to recycle or dispose of after a customer has retrieved the shipped item from the packaging envelope. Furthermore, because the disclosed packaging material is manufactured from fully recyclable materials, the packaging enclosure is able to be recycled instead of being disposed of in a landfill. In some embodiments, small lengths of packaging material can be formed into a type of packing peanut which is then used as a filler within a packaging enclosure formed from the packaging material or formed in other ways from other materials.

In one aspect, an exemplary embodiment of the present disclosure may provide a packaging material comprising a first layer configurable to form an outer layer of a packaging enclosure; a second layer configurable to form an inner layer of the packaging enclosure; and wherein each of the first layer and the second layer is selectively movable from an unexpanded condition to an expanded condition.

In one embodiment, the packaging material may further comprise a third layer, wherein the second layer is disposed between the first layer and the third layer, and wherein the third layer is also selectively movable from an expanded condition to an expanded condition. In one embodiment, the first layer and the third layer may be of a substantially identical configuration and include a plurality of undulations therein, and wherein the plurality of undulations flatten when the first layer and the third layer are moved to the expanded condition. In one embodiment, the second layer may differ in configuration from the first layer and the third layer, wherein the second layer has a first surface adjacent the first layer and a second surface adjacent the third layer, and wherein the second layer increases in thickness between the first surface and the second surface when the second layer is moved to the expanded condition. In one embodiment, the packaging material may further comprise an adhesive applied between part of the second layer and part of one or both of the first layer and the third layer. In one embodiment, the adhesive may be applied in a quantity sufficient to enable the second layer and the one or both of the first layer and the second layer to move in unison from the unexpanded condition to the expanded condition.

In one embodiment, the adhesive may be applied as one or both of a substantially continuous line of adhesive or a plurality of discrete dots of adhesive applied at intervals from one another. In one embodiment, at least a portion of the substantially continuous line of adhesive or some of the plurality of discrete dots of adhesive may remain intact after the second layer and the one or both of the first layer and the third layer have moved to the expanded condition. In one embodiment, a rest of the substantially continuous line of adhesive and a rest of the plurality of discrete dots of adhesive break may contact with one of the first layer, the second layer, and the third layer when the second layer and the one or both of the first layer and the third layer have moved to the expanded condition. In one embodiment, the adhesive may be one or more of heat sensitive, pressure sensitive, and moisture sensitive. In one embodiment, the second layer and the one or both of the first layer and the third layer may be bonded to one another by the adhesive prior to being moved to the expanded condition.

In one embodiment, the packaging material may further comprise an adhesive coating applied to a surface of the first layer and/or a surface of the third layer, wherein the surface of the first layer and/or the surface of the third layer is adjacent the second layer. In one embodiment, an adhesive coating is activated after the first layer, the second layer, and the third layer are moved to the expanded condition, and wherein the adhesive coating keeps the packaging material in the expanded condition and substantially prevents the first layer, the second layer, and the third layer from moving back to the unexpanded condition. In one embodiment, an adhesive may be applied between the first layer and the second layer, and wherein the adhesive is located proximate a side edge of the first layer. In one embodiment, an adhesive may be applied between the first layer and the second layer, and wherein the adhesive is located a distance inwardly from opposing side edges of the first layer. an adhesive may bond the first layer and the second layer to one another, and wherein the second layer and the third layer are free of attachments to one another.

In one aspect, an exemplary embodiment of the present disclosure may provide a method of fabricating a packaging enclosure from a packaging material comprising providing a first layer, a second layer, and a third layer of a recyclable material, wherein the second layer differs in configuration from the first layer and the third layer, and wherein each of the first layer, the second layer, and the third layer are selectively movable from an unexpanded condition to an expanded condition; placing the second layer between the first layer and the third layer; applying an adhesive between the second layer and one or both of the first layer and the third layer; moving the first layer, the second layer and the third layer from the unexpanded condition to the expanded condition; and retaining the first layer, the second layer, and the third layer in the expanded condition while forming the packaging enclosure.

In one embodiment, applying the adhesive may comprise applying a sufficient quantity of adhesive between the second layer and the one or both of the first layer and the third layer to enable the second layer and the one or both of the first layer and the third layer to move in unison from the unexpanded condition to the expanded condition. In one embodiment, applying the adhesive may further comprise applying one or both of a substantially continuous line of adhesive and a plurality of discrete dots of adhesive. In one embodiment, the method may further comprise retaining at least some of the one or both of the substantially continuous line of adhesive and the plurality of discrete dots of adhesive intact as the first layer, the second layer, and the third layer move from the unexpanded condition to the expanded condition.

In another aspect, an exemplary embodiment of the present disclosure may provide a packaging material comprising a first layer; a second layer; wherein each of the first layer and the second layer is selectively movable from an unexpanded condition to an expanded condition; and wherein each of the first layer and the second layer changes in thickness when moved from the unexpanded condition to the expanded condition.

In one embodiment, the first layer may be of a first thickness when in the unexpanded condition and is of a second thickness when in the expanded condition, and wherein the second thickness may be less than the first thickness. In one embodiment, the second layer may be of a first thickness when in the unexpanded condition and is of a second thickness when in the expanded condition, and the second thickness may be greater than the first thickness. In one embodiment, the packaging material may further comprise a third layer; wherein the second layer is disposed between the first layer and the third layer; and wherein the third layer is also selectively movable from an unexpanded condition to an expanded condition; and wherein the third layer changes in thickness when moved from the unexpanded condition to the expanded condition. In one embodiment, the third layer may be of a first thickness when in the unexpanded condition and is of a second thickness when in the expanded condition, and wherein the second thickness is less than the first thickness. In one embodiment, each of the first layer and the third layer may decease in thickness when moved from the unexpanded condition to the expanded condition. In one embodiment, the second layer may increase in thickness when moved from the unexpanded condition to the expanded condition. In one embodiment, the first layer and the third layer may be of a substantially identical configuration to one another.

In one embodiment, each of the first layer and the third layer may comprise a sheet of material having a plurality of undulations formed therein. In one embodiment, each undulation may have a wave-like form with an amplitude and a wavelength. In one embodiment, the amplitude may decrease in size when a respective one of the first layer and the third layer is moved from the unexpanded condition to the expanded condition. In one embodiment, the wavelength may increase in size when a respective one of the first layer and the third layer is moved from the unexpanded condition to the expanded condition. In one embodiment, each of the first layer and the third layer may comprise a sheet of material having a plurality of alternating peaks and valleys formed therein when in the unexpanded condition, and wherein when each of the first layer and the third layer is moved to the expanded condition, the sheet of material is substantially free of the alternating peaks and valleys.

In one embodiment, each of the first layer and the third layer may expand in one of an X-direction and a Y-direction when moved to the expanded condition, wherein the second layer expands in at least a Z-direction when moved to the expanded condition, and wherein the X-direction, the Y-direction, and the Z-direction are orthogonal to one another. In one embodiment, the first layer and the second layer may be bonded to one another in such a way as to allow the first layer and the second layer to expand in one of an X-direction and a Y-direction, thereby causing the second layer to additionally expand in a Z-direction; wherein the X-direction, Y-direction, and the Z-direction are orthogonal to one another; and wherein the second layer and the third layer are free of attachments to one another. In one embodiment, the second layer may be bonded to one or both of the first layer and the third layer in such a way as to allow the first layer and the third layer to expand in one of an X-direction and a Y-direction, thereby causing the second layer to expand in a Z-direction; and wherein the X-direction, Y-direction, and the Z-direction are orthogonal to one another.

In another aspect, an exemplary embodiment of the present disclosure may provide a method of fabricating a packaging enclosure from a packaging material comprising providing a first layer, a second layer and a third layer which are selectively movable from an unexpanded condition to an expanded condition; placing the second layer between the first layer and the third layer; moving the first layer, the second layer, and the third layer from the unexpanded condition to the expanded condition; reducing a thickness of one or both of the first layer and the third layer as the first layer and the third layer move to the expanded condition; and increasing a thickness of the second layer as the second layer moves to the expanded condition.

In one embodiment, the method may further comprise retaining the first layer, the second layer, and the third layer in the expanded condition while forming the packaging enclosure. In one embodiment, providing the first layer and the third layer may comprise forming a plurality of undulations in a sheet of recyclable material, wherein each undulation of the plurality of undulations has a wave-like form with an amplitude and a wavelength, and wherein the method may further comprise decreasing a size of the amplitude and increasing a size of the wavelength as the first layer and the third layer are moved to the expanded condition. In one embodiment, providing the second layer may comprise forming a plurality of slits in a sheet of recyclable material, and wherein the method may further comprise opening the slits and forming a honeycomb pattern of apertures in the second layer as the second layer expands and the thickness of the second layer increases.

In another aspect, an exemplary embodiment of the present disclosure may provide a packaging material comprising a first layer; a second layer; wherein each of the first layer and the second layer is selectively movable from an unexpanded condition to an expanded condition; and wherein the first layer is comprised of a first material and the second layer is comprised of a second material, and the second material differs from the first material.

In one embodiment, the packaging material may further comprise f a third layer, wherein the second layer is positioned between the first layer and the third layer. In one embodiment, the third layer may be selectively movable from an unexpanded condition to an expanded condition. In one embodiment, the third layer may be comprised of the first material. In one embodiment, the first layer may be comprised of one of a crepe paper, a corrugated paper, a crinkled paper, and a crimped paper. In one embodiment, the third layer may be comprised of one of a crepe paper, a corrugated paper, a crinkled paper, and a crimped paper. In one embodiment, the second layer may comprise a planar sheet of material defining a plurality of slits therein, wherein each slit of the plurality of slits extends between a first surface and a second surface of the second layer. In one embodiment, the plurality of slits in the second layer may be arranged in a pattern. In one embodiment, the plurality of slits may open up to form air pockets when the second layer is moved to the expanded condition. In one embodiment, the third layer may be comprised of a third material which is different from either of the first material and the second material. In one embodiment, each of the first layer and the second layer may be made from a recyclable material. In one embodiment, the recyclable material may be paper. In one embodiment, each of the first layer, the second layer, and the third layer may be made from a recyclable material, particularly from paper.

In another aspect, an exemplary embodiment of the present disclosure may provide a method of fabricating a packaging material comprising providing a first layer and a second layer; wherein providing the first layer comprises providing a sheet of a first material which is selectively movable from an unexpanded condition to an expanded condition; wherein providing the second layer comprises providing a sheet of a second material which is selectively movable from an unexpanded condition to an expanded condition; wherein the second material of the second layer differs from the first material of the first layer; positioning the second layer adjacent the first layer; and at least partially bonding the second layer to the first layer such that the first layer and the second layer are movable in unison from the unexpanded condition to the expanded condition.

In one embodiment, providing the sheet of the first material may comprise providing a sheet of one of a crepe paper, a crinkled paper, a crimped paper, and a corrugated paper. In one embodiment, providing the sheet of the second material may comprise providing a sheet of a recyclable material having a plurality of slits formed therein, wherein the slits expand to form a honeycomb pattern of openings when the second layer is moved to the expanded condition. In one embodiment, the method may further comprise providing a third layer and positioning the third layer such that the second layer is located between the first layer and the third layer. In one embodiment, providing the third layer may comprise providing a sheet of the first material. In one embodiment, providing the third layer may comprise providing a sheet of one of a crepe paper, a crinkled paper, a crimped paper, and a corrugated paper.

In another aspect, an exemplary embodiment of the present disclosure may provide a packaging material comprising a first layer; a second layer located in abutting contact with the first layer; wherein the first layer is comprised of a first material which is selectively expandable; wherein the second layer is comprised of a second material which is selectively expandable; at least one attachment point between the first layer and the second layer; and wherein the first layer and the second layer are movable from an unexpanded condition to an expanded condition.

In one embodiment, part of the at least one attachment point between the first layer and the second layer may remain intact when the first layer and the second layer in the expanded condition. In one embodiment, part of the at least one attachment point between the first layer and the second layer may be detached from one or both of the first layer and the second layer when the first layer and the second layer are in the expanded condition. In one embodiment, the at least one attachment point may break as the first layer and the second layer move to the expanded condition, and wherein the first layer and the second layer separate from one another in a region of the broken at least one attachment point. In one embodiment, the packaging material may further comprise an adhesive remnant of the broken at least one attachment point provided on one or both of the first layer and the second layer when in the expanded condition. In one embodiment, the packaging material may further comprise a third layer which may be selectively movable from an unexpanded condition to an expanded condition, wherein the second layer is interposed between the first layer and the third layer. In one embodiment, the second layer and the third layer may be free of any attachment points therebetween, and wherein the third layer floats free relative to the second layer when the first layer, the second layer, and the third layer are moved from the unexpanded condition to the expanded condition.

In one embodiment, the packaging material may further comprise at least one attachment point between the first layer and the third layer. In one embodiment, the packaging material may further comprise at least two attachment points between the second layer and the third layer, and wherein when the second layer and the third layer are expanded, one or both of the at least two attachment points between the second layer and the third layer is broken. In one embodiment, the packaging material may further comprise an adhesive coating applied to a surface of one or more of the first layer, the second layer, and the third layer, wherein the adhesive coating is activated after the first layer, the second layer, and the third layer have moved to the expanded condition, and wherein the activated adhesive coating secures the first layer, the second layer, and the third layer to one another in the expanded condition.

In another aspect, an exemplary embodiment of the present disclosure may provide a method of fabricating a packaging enclosure from a packaging material comprising providing a first layer of a first material which is selectively expandable; providing a second layer of a second material which is selectively expandable, wherein the second material differs from the first material; securing the first layer and the second layer to one another via at least one attachment point to form the packaging material; and moving the first layer and the second layer of the packaging material from an unexpanded condition to an expanded condition prior to forming the packaging enclosure.

In one embodiment, the method may further comprise retaining part of the at least one attachment point intact when the first layer and the second layer of the packaging material move to the expanded condition. In one embodiment, the method may further comprise detaching part of the at least one attachment point from one or both of the first layer and the second layer when the first layer and the second layer of the packaging material move to the expanded condition. In one embodiment, the method may further comprise separating a region of the first layer from a region of the second layer proximate the detached part of the at least one attachment point. In one embodiment, the method may further comprise extending an adhesive remnant of the detached part of the at least one attachment point into a location between the first layer and the second layer. In one embodiment, the method may further comprise forming the first layer from one of a crepe paper, a crinkled paper, a crimped paper, and a corrugated paper. In one embodiment, the method may further comprise forming the second layer from a recyclable sheet of paper having a plurality of slits formed therein. In one embodiment, the method may further comprise providing a third layer of a selectively expandable material, wherein the selectively expandable material is one of a crepe paper, a crinkled paper, a crimped paper, and a corrugated paper, and positioning the second layer between the first layer and the third layer. In one embodiment, the method may further comprise coating a surface of one or more of the first layer, the second layer, and the third layer with an adhesive; activating the adhesive by one or more of heat, pressure, moisture, and combinations thereof after the first layer, the second layer, and the third layer have moved to the expanded condition; and retaining the first layer, the second layer, and the third layer in the expanded condition with the adhesive which is activated. In one embodiment, the method may further comprise increasing a thickness of the second layer as the second layer is moved to the expanded condition.

In another aspect, an exemplary embodiment of the present disclosure may provide a packaging material comprising a first layer having a first surface and a second surface; a second layer having a first surface and a second surface, wherein the first surface of the second layer is proximate the second surface of the first layer; wherein the packaging material has a thickness measured between the first surface of the first layer and the second surface of the second layer; wherein the packaging material is of a first thickness in a collapsed and rolled condition; wherein the packaging material is of a second thickness in an unrolled and expanded condition; and wherein the second thickness is greater than the first thickness.

In one embodiment, wherein when the packaging material is moved to the unrolled and expanded condition, the first layer may expand in a first direction and the second layer expands in the first direction and in a second direction orthogonal to the first direction. In one embodiment, the packaging material may further comprise a third layer having a first surface and a second surface, wherein the first surface of the third layer is proximate the second surface of the second layer. In one embodiment, wherein when the packaging material is moved to the unrolled and expanded condition, the first layer and the third layer may expand in a first direction, and the second layer expands in the first direction and in a second direction orthogonal to the first direction.

In one embodiment, wherein the first layer and the third layer may comprise one of a crepe paper, a crinkled paper, a crimped paper, and a corrugated paper. In one embodiment, wherein the second layer may comprise a sheet material having a plurality of slits defined therein, and wherein each slit of the plurality of slits may extend from the first surface of the second layer to the second surface of the second layer. In one embodiment, wherein the plurality of slits may open up to form a honeycomb pattern when the second layer expands in the second direction. In one embodiment, wherein each of the first layer and the third layer may comprise a sheet material into which a plurality of undulations are formed, and wherein each undulation of the plurality of undulations may have a wave-like form with an amplitude and a wavelength. In one embodiment, wherein the amplitude may decrease in size when the first layer and the third layer are expanded. In one embodiment, wherein the wavelength may increase in size when the first layer and the third layer are expanded.

In another aspect, an exemplary embodiment of the present disclosure may provide a method of making a packaging material, said method comprising providing a first material of a first construction, wherein the first material is selectively expandable; providing a second material of a second construction adjacent the first material, wherein the second material is selectively expandable; attaching the first material and the second material to one another with at least one attachment point to form a packaging material; retaining the first material and the second material of the packaging material in an unexpanded condition; and rolling the packaging material in the unexpanded condition onto a roll.

In one embodiment, wherein the method may further comprise unrolling a length of the packaging material from the roll; and moving the length of the packaging material to an expanded condition as the length of the packaging material is unrolled. In one embodiment, wherein the method may further comprise retaining a remainder of the packaging material on the roll in the unexpanded condition when the length of the packaging material is unrolled. In one embodiment, wherein the method may further comprise keeping one or more of the at least one attachment points intact as the length of the packaging material is unrolled from the roll and is moved to the expanded condition. In one embodiment, wherein the method may further comprise breaking one or more of the at least one attachment points as the length of the packaging material is unrolled from the roll and is moved to the expanded condition.

In one embodiment, wherein the method may further comprise activating an adhesive coating on one or both of the first material and the second material; and retaining the unrolled length of the packaging material in the expanded condition. In one embodiment, wherein the method may further comprise reducing a thickness of the first material in the length of the packaging material as the length of the packaging material is unrolled from the roll and is moved to the expanded condition; and increasing a thickness of the second material in the length of the packaging material as the length of the packaging material is unrolled from the roll and is moved to the expanded condition. In one embodiment, wherein the method may further comprise placing an additional layer of the first material adjacent the second material, such that the second material is positioned between two layers of the first material in order to form the packaging material.

In one embodiment, wherein the method further comprises unrolling a length of the packaging material from the roll; and moving the length of the packaging material to an expanded condition as the length of the packaging material is unrolled. In one embodiment, wherein the method may further comprise reducing a thickness of the first material in the two layers of the length of the packaging material as the length of the packaging material is unrolled from the roll and is moved to the expanded condition; increasing a thickness of the second material in the middle of the two layers of the length of the packaging material as the length of the packaging material is unrolled from the roll and is moved to the expanded condition; activating an adhesive coating on one or both of the first material and the second material; and retaining the unrolled length of the packaging material in the expanded condition.

In another aspect, an exemplary embodiment of the present disclosure may provide a method of making a packaging enclosure for an article, said method comprising providing a roll of a packaging material, wherein the packaging material is of a first thickness; unrolling a length of the packaging material from the roll; expanding the packaging material as the length of the packaging material is unrolled from the roll; increasing a thickness of the packaging material from the first thickness to a second thickness as the length of the packaging expands; and forming the packaging enclosure from the unrolled length of the packaging material of the second thickness.

In one embodiment, the method may further comprise fabricating the packaging material which is wound onto the roll from at least a first layer of material of a first construction and a second layer of material of a second construction, wherein the second construction is different than the first construction. In one embodiment, wherein the method may further comprise forming the at least first layer of material from one of a crepe paper, a crinkled paper, a crimped paper, and a corrugated paper. In one embodiment, the method may further comprise forming the second layer of material from a sheet of paper having a pattern of a plurality of slits formed therein.

In one embodiment, the method may further comprise attaching the first layer of material and the second layer of material to one another at one or more attachment points to form a fabricated packaging material; and rolling the fabricated packaging material onto a roll. In one embodiment, the method may further comprise providing a third layer of material of a different construction to the second construction; and placing the third layer of material adjacent the second layer of material such that the second layer of material is interposed between the first layer of material and the third layer of material. In one embodiment, the method may further comprise providing the third layer of material from a same first construction as the first layer of material.

In one embodiment, the method may further comprise securing the first layer of material and the second layer of material to one another at at least one attachment point; and keeping the second layer of material and the third layer of material free of any attachment points to one another. In one embodiment, the method may further comprise securing the first layer of material and the third layer of material to one another one or both of before rolling the packaging material onto the roll or after rolling the length of the packaging material from the roll. In one embodiment, the method may further comprise securing one or both of the first layer of material and the third layer of material to the second layer of material at at least one attachment point. In one embodiment, the method may further comprise breaking one or more of the at least one attachment point when the length of the packaging material is moved to the unrolled and expanded condition.

In one embodiment, wherein forming the packaging enclosure includes folding the unrolled length of the packaging material about a fold to form a first side and an opposed second side of the packaging enclosure; and securing edges of the first side and the opposed second side to one another. In one embodiment, wherein the first layer of material forms an exterior surface of the packaging enclosure when the unrolled length of the packaging material is folded. In one embodiment, wherein the method may further comprise inserting the article into an interior cavity bounded and defined by the first side and the opposed second side of the packaging enclosure; and securing free ends of the first side and the opposed second side to one another such that the packaging enclosure surrounds the article.

In one embodiment, the method may further comprise cushioning the article within the interior cavity against impact with the second thickness provided by the unrolled length of the packaging material. In one embodiment, the method may further comprise providing an adhesive coating on a surface of one of the first layer of material and the second layer of material; activating the adhesive coating after unrolling and expanding the length of the packaging material; bonding the first layer of material and the second layer of material to one another with the activated adhesive coating; and maintaining the packaging material at the second thickness while forming the packaging enclosure. In one embodiment, wherein activating the adhesive coating may include subjecting the length of the packaging material to one of heat, pressure, moisture, or combinations of the same after expanding the length of the packaging material.

In one embodiment, wherein when the length of the packaging material is unrolled, the first layer of material may expand in a first direction, and the second layer expands in the first direction and in a second direction orthogonal to the first direction. In one embodiment, wherein the first layer of material may decrease in thickness when expanding in the first direction. In one embodiment, wherein the second layer of material may decrease in width when expending in the first direction and increases in thickness when expanding in the second direction. In one embodiment, the method may further comprise forming a plurality of undulations in the first layer of material. In one embodiment, the method may further comprise forming a plurality of slits in the second layer of material. In one embodiment, the method may further comprise bonding the first layer of material to the second layer of material with an adhesive prior to rolling the first layer of material and the second layer of material onto the roll. In one embodiment, the method may further comprise bonding the first layer of material and the second layer of material to one another with an adhesive when the length of the packaging material is unrolled, expanded, and of the second thickness, and prior to forming the packaging enclosure with the unrolled length of the packaging material.

In another aspect, an exemplary embodiment of the present disclosure may provide a packaging enclosure for an item; said packaging enclosure comprising a packaging material comprising a first layer; a second layer; a third layer, wherein the second layer is interposed between the first layer and the third layer; at least one attachment point is provided between at least the first layer and the second layer; wherein the first layer, the second layer, and the third layer, together are rolled onto a roll in an unexpanded condition and together are of a first thickness; wherein a length of the packaging material unrolled from the roll and moved to an expanded condition is of a second thickness that is greater than the first thickness; wherein the length of the packaging material forms a front and a back of the packaging enclosure while in the expanded condition; and wherein edges of the front and the back are secured to one another such that an interior cavity is bounded by the front and the back, and the interior cavity is adapted to receive the item therein.

In one embodiment, wherein the first layer and the third layer may be comprised of one of a crepe paper, a crinkled paper, a crimped paper, and a corrugated paper. In one embodiment, wherein the first layer and the third layer may include one or more undulations therein that flatten when the length of the packaging material is moved to the expanded condition. In one embodiment, wherein the second layer may comprise a sheet of paper having a plurality of slits formed therein, and wherein the plurality of slits expand to form honeycomb openings in the second layer when the length of the packaging material moved to the expanded condition. In one embodiment, wherein when the length of the packaging material is in the expanded condition, the second layer may be of a greater thickness than either of the first layer and the third layer.

BRIEF DESCRIPTION OF THE DRAWINGS

Sample embodiments of the present disclosure are set forth in the following description, are shown in the drawings and are particularly and distinctly pointed out and set forth in the appended claims. The details of one or more implementations of the presently disclosed packaging material and the packaging enclosure formed therewith are set forth in the accompanying drawings and the following description. Other feature and advantages will be apparent from the description and drawings.

FIG. 10 depicts an exemplary method for implementing the manufacture of the packaging material in accordance with an aspect of the present disclosure;

FIG. 12 depicts an exemplary method for creating a packaging enclosure with the packaging material in accordance with the present disclosure;

FIG. 19A is an enlarged diagrammatic side elevation view of the packaging material showing a first exemplary manner of securing the first layer and the second layer to one another;

FIG. 19B is an enlarged diagrammatic side elevation view of the packaging material showing a second exemplary manner of securing the second layer and the third layer to one another;

FIG. 19C is an enlarged diagrammatic side elevation view of the packaging material showing a third exemplary manner of securing the first layer and the second layer to one another, and of securing the second layer and third layer to one another;

FIG. 22 depicts an exemplary method for implementing the manufacture of the fifth embodiment packaging material in accordance with an aspect of the present disclosure;

Similar numbers refer to similar parts throughout the drawings.

DETAILED DESCRIPTION

Figures 3, 4:
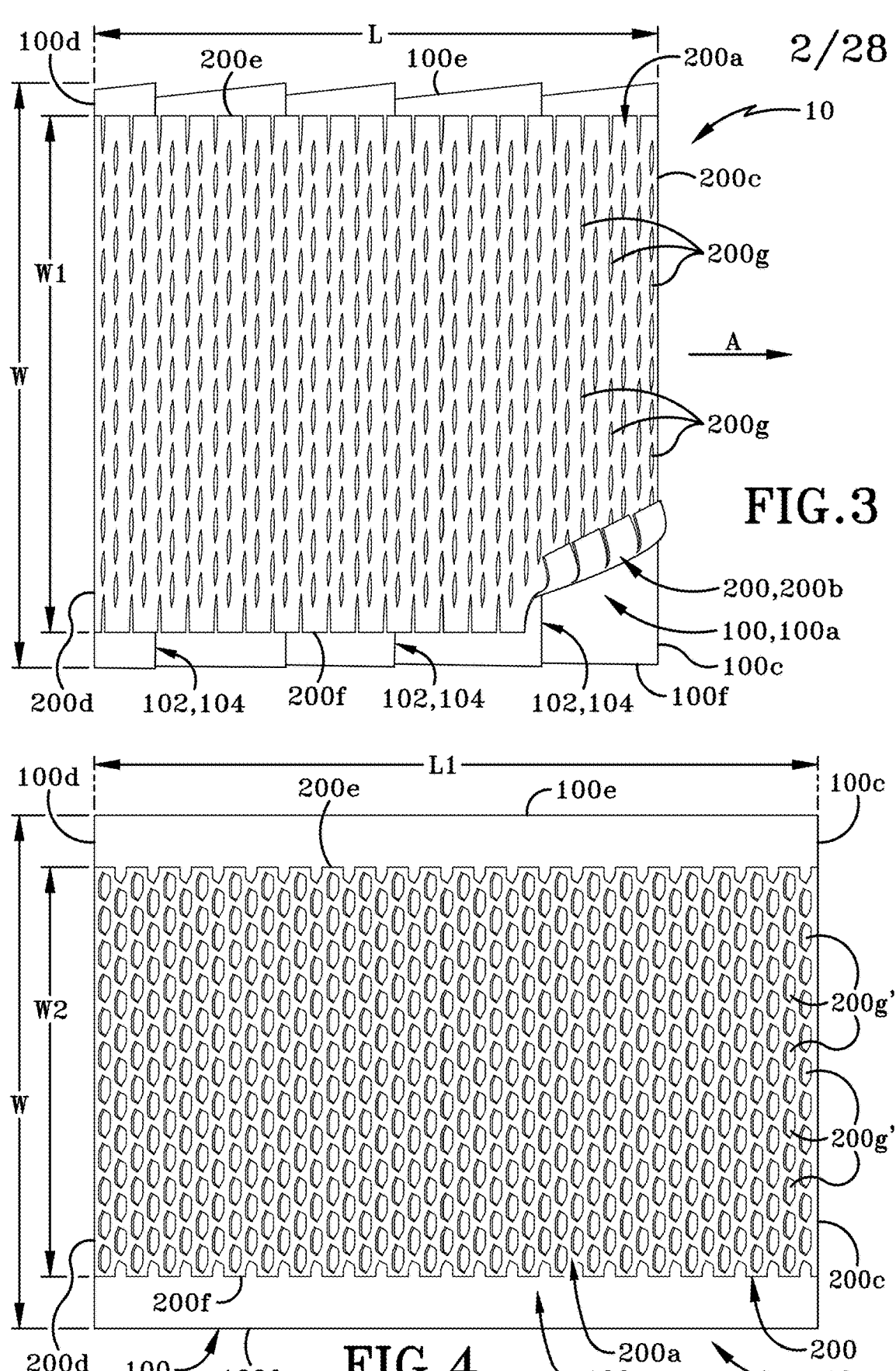
FIG. 3 is a top plan view of a first embodiment of the section of the packaging material showing both the expandable first layer and an expandable second layer, and wherein both the first layer and second layer are in the unexpanded condition.
FIG. 4 is a top plan view of the section of the packaging material of FIG. 3 shown in an expanded condition and illustrating that the expanded second layer shrinks slightly in width when the first layer is expanded.
Figure 5:
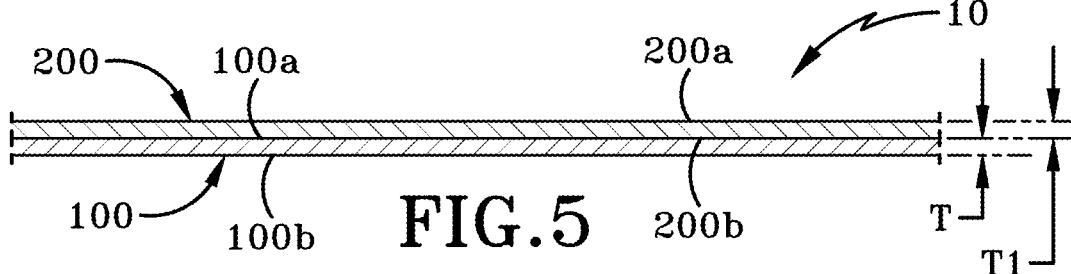
FIG. 5 is a diagrammatic side elevation view of the section of packaging material of FIG. 3 shown in the unexpanded condition.
Figure 6:
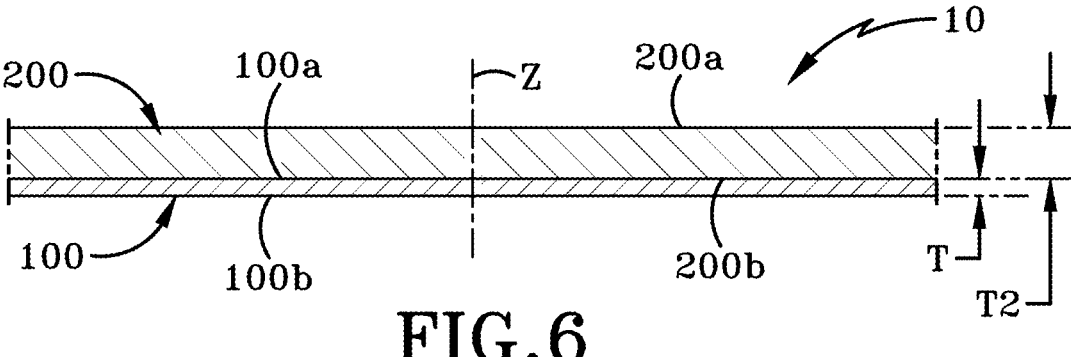
FIG. 6 is a diagrammatic side elevation view of the section of packaging material of FIG. 4 shown in the expanded condition and showing how the second layer has expanded in the Z-direction.
Figure 7:
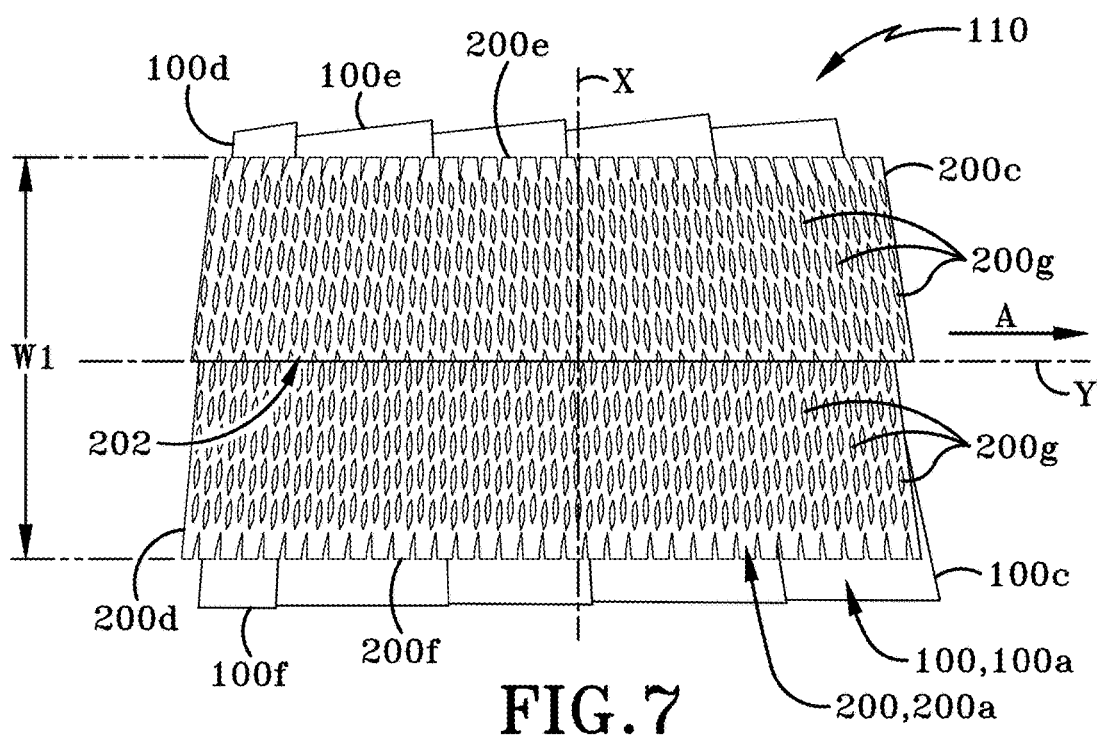
FIG. 7 is a top plan view of a second embodiment of the section of packaging material similar to FIG. 3, wherein both the expandable first layer and the expandable second layer are illustrated in an unexpanded condition, and wherein the second packaging layer includes one or more folds.
Figure 8:
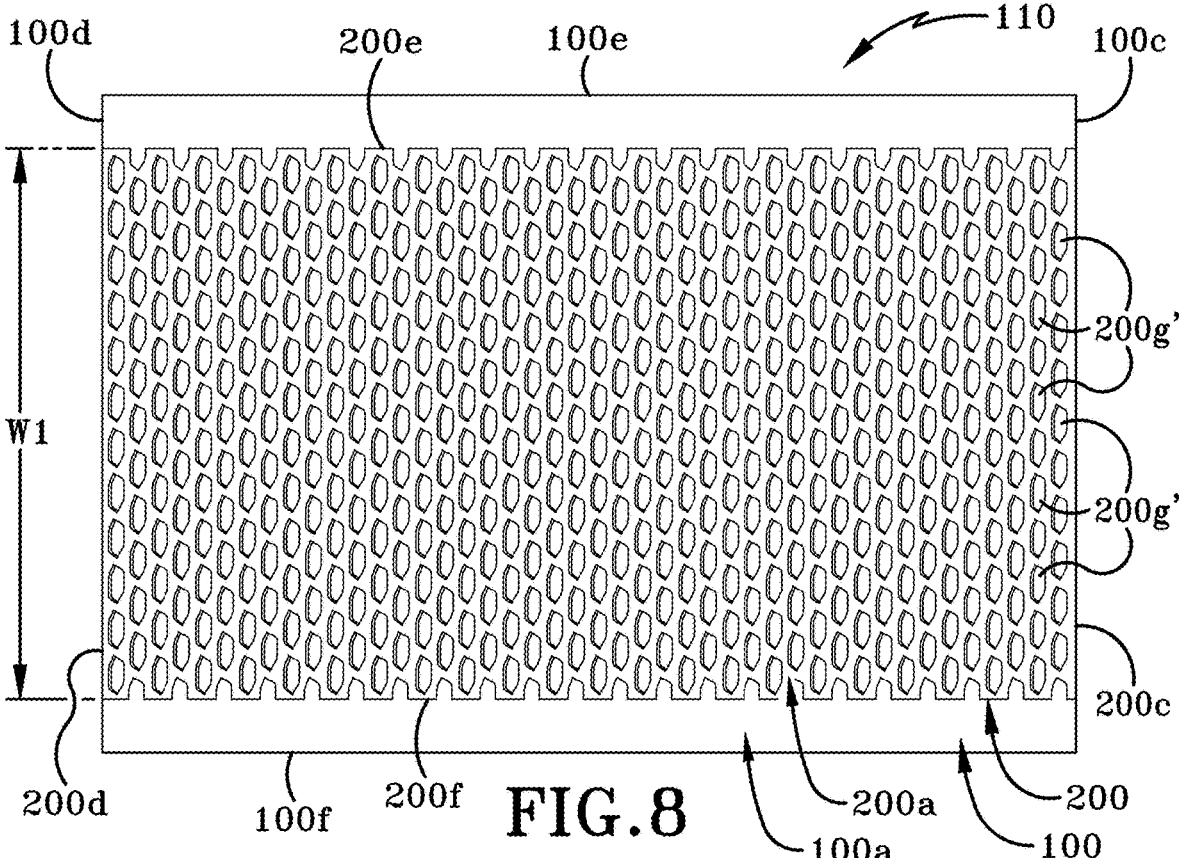
FIG. 8 is a top plan view of the section of packaging material of FIG. 7 shown in the expanded condition, and illustrating that the width of the expanded second layer is substantially unchanged when the first layer is expanded.
Figure 9:
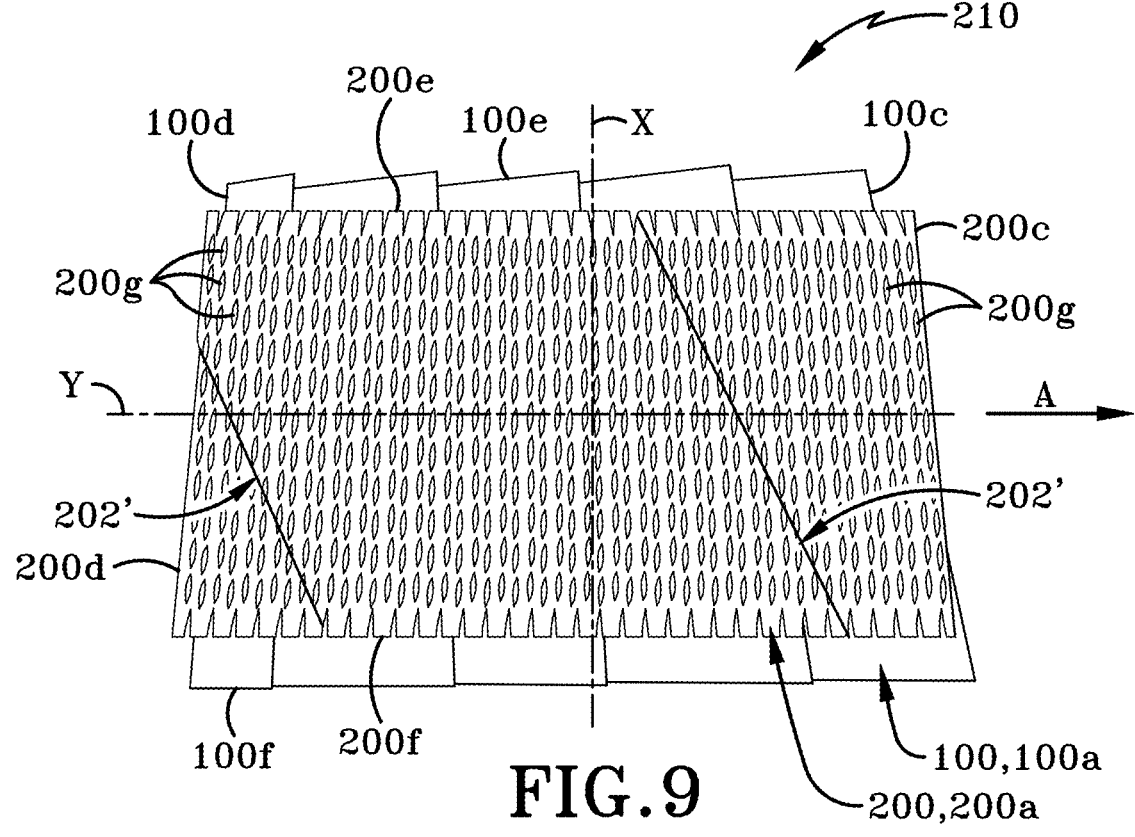
FIG. 9 is a top plan view of a third embodiment of the section of packaging material similar to FIG. 3, wherein both the expandable first layer and the expandable second layer include one or more folds therein, wherein the one or more folds in the second layer are oblique relative to the side edges of the first layer.
Figure 14:
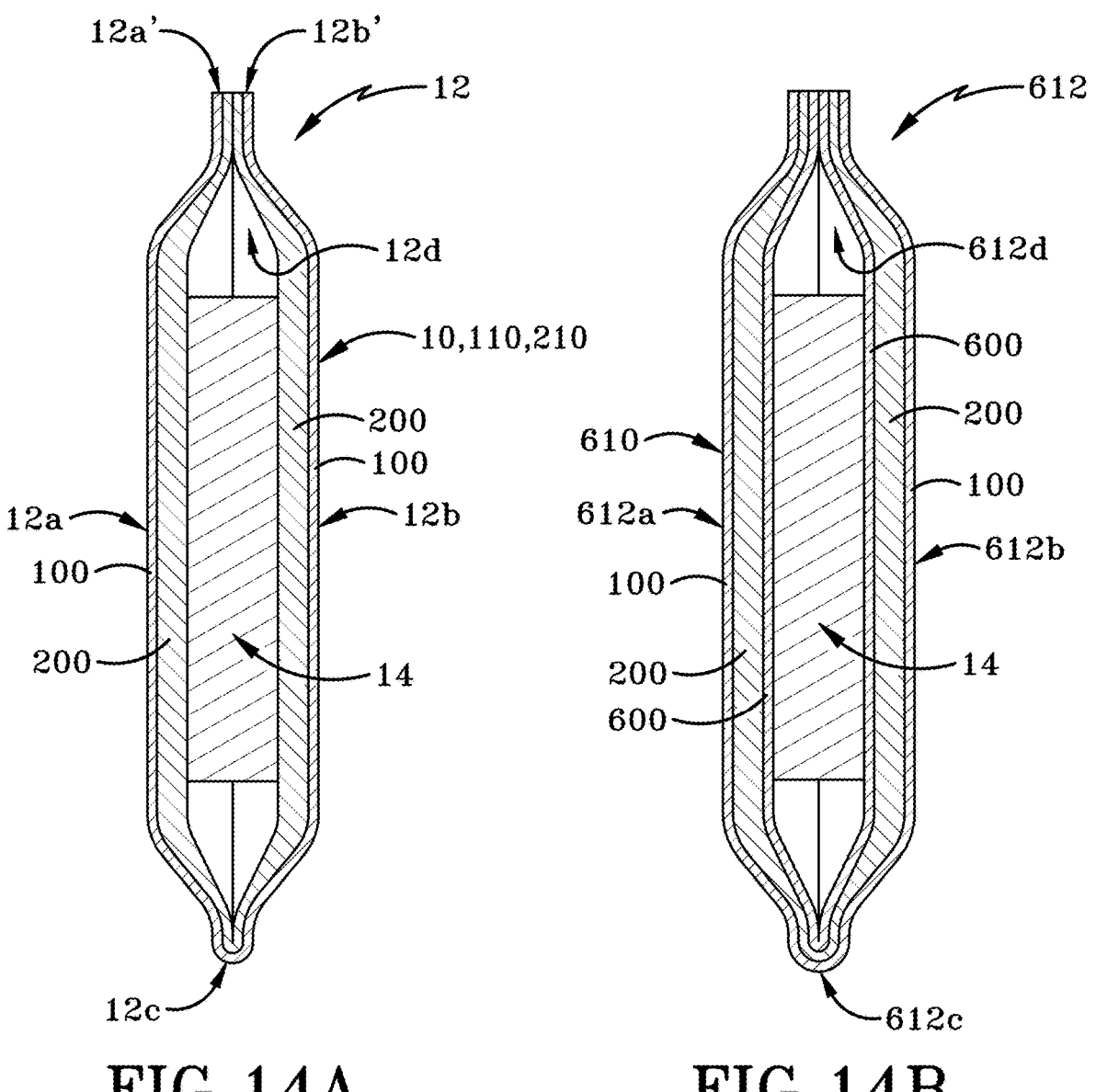
FIG. 14A is a vertical cross-section through the packaging enclosure taken along line 14A-14A of FIG. 13, wherein the packaging material is the first embodiment packaging material of FIG. 3, fabricated from two expandable layers.
FIG. 14B is a vertical cross-section through the packaging enclosure taken along line 14B-14B of FIG. 13, showing a fourth embodiment of the packaging material in accordance with the present disclosure, where the packaging material includes three expandable layers, where the first layer and the third layer are substantially identical to the first layer shown in FIG. 1 and the second layer is substantially identical to the second layer shown in FIG. 3.

Referring to FIGS. 1 through 24, various embodiments of a packaging material in accordance with an aspect of the present disclosure are shown. A first embodiment of the packaging material is illustrated in FIGS. 1 through 6 show a first embodiment of the packaging material, generally indicated at 10 (FIG. 3). FIGS. 7 and 8 show a second embodiment of the packaging material, generally indicated at 110. FIG. 9 shows a third embodiment of the packaging material, generally indicated at 210. FIG. 14A shows a packaging enclosure 12 formed from any of the first, second, or third embodiments of packaging material. FIG. 14B shows a fourth embodiment of packaging material and a packaging enclosure 612 formed therewith which is useful for retaining and protecting an item 14 to be shipped to a remote location. FIGS. 15 through 23 show various aspects of a fifth embodiment of packaging material in accordance with the present disclosure.

Packaging material 10 includes one or more layers which are expandable in order to provide protection to the contents of any packaging enclosure 12, 112 made with packaging material 10. As illustrated in FIG. 3, packaging material 10 includes at least two layers that are operatively engaged with one another. The at least two layers are operatively engaged by being adhered to or otherwise bonded to one another. As illustrated in FIGS. 1 through 14A, the packaging material 10, 110, 210 includes at least an expandable first layer 100 and an expandable second layer 200. Each of these two layers 100, 200 will be discussed in detail hereafter.

Figures 1, 2:
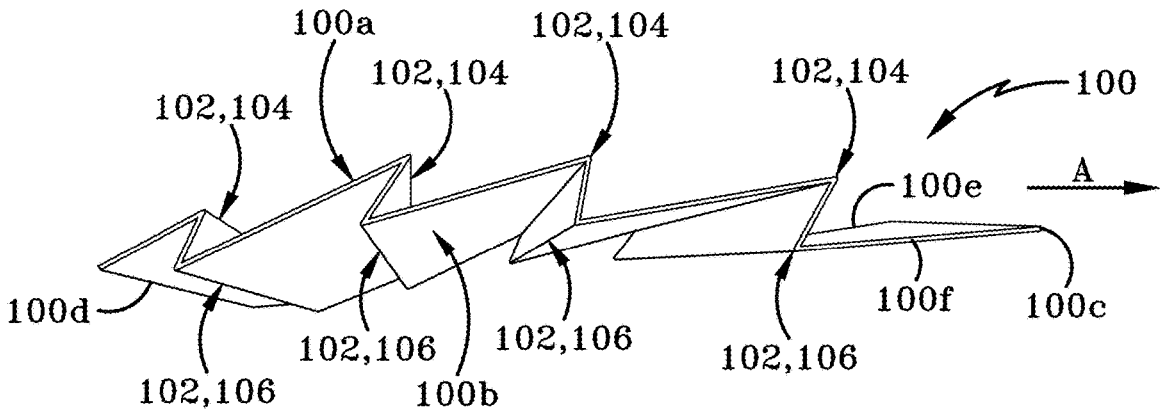
FIG. 1 is a top plan view of an expandable first layer of a section of packaging material in accordance with an aspect of the present disclosure, wherein the first layer is illustrated as including one or more folds and being in an unexpanded condition.
FIG. 2 is a side perspective view of the first layer of the section of packaging material of FIG. 1 showing how the first layer of the packaging material is capable of expanding in length as the one or more folds are unfolded.

FIGS. 1 and 2 show an exemplary piece of first layer 100 used in packaging material 10, 110, 210. First layer 100 is also referred to herein as "substrate layer 100" or "carrier layer 100" and these terms may be used interchangeably herein. First layer 100 is formed of paper products and is substantially solid across its width, length, and thickness. In other words, first layer 100 is free of apertures or slits. Because first layer 100 is comprised of paper-based products, the first layer is able to be paper-recycled after use. As will be discussed hereafter first layer 100 is initially solid and flat/smooth but is folded in an initial step in the production of packaging material 10, 110, 210. FIG. 1 shows first layer 100 after the formation of a plurality of folds 102 therein. When first layer 100 is incorporated into packaging material 10, 110, 210, the first layer 100 will be extended in order to activate second layer 200. FIG. 2 shows first layer 100 being stretched or extended and shows the folds 102 beginning to unfold. When packaging enclosure 14 is formed (as will be described later herein), the first layer 100 returns to its original state, i.e., extended, smooth and free of folds 102. As such, first layer 100 is suitable for forming an exterior layer of a packaging enclosure 12 (FIG. 13) that is fabricated with packaging material 10.

Referring to FIGS. 1 through 6, first layer 100 will now be described in greater detail. First layer 100 includes an upper surface 100a, a lower surface 100b, a first end 100c, a second end 100d, a first side 100e, and a second side 100f.

It should be understood that use of terms such as "upper", "lower", "left", "right", "top", "bottom", "side", and "end" is simply for ease of discussing the various component parts of the packaging materials and packaging enclosures described herein. In particular, these terms are used in reference to the orientation of the components as illustrated particular in the attached figures. These terms should not, however, be narrowly construed since the components described herein may assume a multitude of different positions and orientations when used in the real world.

A longitudinal axis "Y" (FIG. 1) of first layer 100 extends between first end 100c and second end 100d and defines a longitudinal direction. A lateral axis "X" of first layer 100 extends between first side 100e and second side 100f and defines a lateral direction that is oriented at right angles to the longitudinal direction. A vertical axis "Z" (FIGS. 5 and 6) of first layer 100 extends between upper surface 100a and lower surface 100b and defines a vertical direction that is oriented at right angles to each of the longitudinal direction and lateral direction. The vertical direction (or Z-direction) is normal, i.e., oriented at right angles, to the longitudinal direction and the lateral direction.

As discussed earlier herein, first layer 100 is initially smooth and free of folds but prior to forming packaging material 10, a series of folds are formed in first layer 100 in order to reduce the overall length of the layer. In one embodiment, illustrated in FIG. 1, one or more Z-shaped folds 102 are formed in first layer 100 by creating a series of oppositely-oriented creases 104, 106 therein. FIG. 1 shows an exemplary arrangement of first layer 100 in which each crease 104, 106 is oriented generally parallel to lateral axis "X and thereby at right angles to longitudinal axis "Y". Creases 104 are visible when first layer 100 is viewed from above but creases 106 are hidden from view when first layer 100 is viewed from above. When first layer 100 is in this folded or contracted condition, first layer 100 is of a length "L" measured between first end 100c and second end 100d thereof. First layer 100 is also of a width "W" measured between first side 100e and second side 100f. As shown in FIG. 5, first layer 100 is also of a thickness "T" as measured between upper surface 100a and lower surface 100b. As indicated earlier herein, first layer 100 is ultimately returned to an unfolded or expanded condition by stretching or extending (or expanding) first layer 100 and thereby unfolding the various folds 102. Because of the arrangement of the folds 102 illustrated in FIG. 1, when unfolded, first layer 100 is able to stretch, extend, or expand in a first direction oriented parallel to longitudinal axis "Y" and return to its original smooth state and original unfolded length.

It will be understood that in other embodiments (not illustrated herein), the one or more Z-shaped folds may be arranged parallel to longitudinal axis "Y" and in that instance, the first layer 100 is then able to be expanded in a second direction parallel to the lateral axis "X". In yet other embodiments, the first layer may include one or more Z-shaped folds that are oriented oblique to the "Y" axis and/or oblique to the "X" axis and therefore the first layer will be expandable in a direction oblique to one or the other or both of the "Y" axis or "X" axis. In yet other embodiments, multiple differently oriented folds may be formed in the first layer so that first layer is able to expand in one or more directions parallel to longitudinal axis "Y" and/or parallel to lateral axis "X" and or parallel to an axis oblique to the "Y" or "X" axis. It will be understood that the number, orientation, and arrangement of the folds will be selected to suit the particular type of packaging enclosure to be fabricated with the packaging material and the particular packaging equipment that is to be utilized to form the packaging enclosure with the packaging material.

It will further be understood that in other embodiments (not illustrated herein) a different folding pattern other than the illustrated Z-shaped folding pattern may be utilized to initially reduce the overall length and/or width of the first layer. Any suitable folding pattern and orientation of the differently configured folds may be utilized to reduce the overall length and/or width of the first layer 10. It will further be understood that in other embodiments, not illustrated herein), first layer will be configured in such a way as to be expandable without the provision of one or more folds therein.

Referring now to FIGS. 3 and 4, second layer 200 is illustrated in conjunction with the unexpanded first layer 100. Second layer 200 may also be referred to herein as "cut-patterned layer 200" or "core layer 200". These terms may be used interchangeably herein. Similar to first layer 100, second layer 200 is comprised of a paper-based product and as such is paper-recyclable.

In some aspects, as described above, the packaging material is paper-based. However, in other aspects, materials other than paper are contemplated for use in packaging material 10. For example, materials such as poly film, polymer film, resin-based film, plastic, TYVEK®, metal fiber composites, fiberglass, etc. (TYVEK is a registered trademark of DUPONT SAFETY & CONSTRUCTION, INC. of Wilmington, Delaware, US), which are used in combination with paper-based materials and/or each other to achieve packaging material 10 with desired features or meeting particular specifications (e.g. for manufacture or assembly). In these other embodiments, one or both of first layer 100 and second layer 200 may be formed from a paper-based product or from a material other than paper. In order to ensure that packaging material 10, 110, 210 and thereby the packaging enclosure formed therewith is fully recyclable, it is preferable that paper-based materials are used for all of the at least two layers of the packaging material in accordance with the present disclosure.

Second layer 200 has an upper surface 200a, a lower surface 200b (FIGS. 5 and 6), a first end 200c, a second end 200d, a first side 200e, and a second side 200f. FIG. 3 illustrates an arrangement where first end 100c of first layer 100 is aligned with first end 200c of second layer 200. Similarly, second end 100d of first layer 100 is aligned with second end 200d of second layer 200. FIG. 3 further illustrates an arrangement where first side 100e of first layer 100 is located a distance outwardly beyond first side 200e of second layer 200f and second side 100f of first layer 100 is located a distance outwardly beyond second side 200f of second layer 200. It will be understood that this arrangement is exemplary only and that both ends 100c, 100d and sides 100e, 100f of first layer 100 may be aligned with both ends 200c, 200d and sides 200e, 200f of second layer 200. In yet other embodiments, not shown herein, one or more of the ends 200c, 200d, and/or sides 200e, 200f of second layer 200 may extend outwardly beyond the associated end and/or side of first layer 100. In other words, the length and width of the first layer 100 and second layer 200 will be selected based upon the particular application in which packaging material 10 is to be utilized and how the packaging material 10 needs to be fabricated in order to fabricate the desired packaging enclosure.

Referring still to FIGS. 3 and 4, a plurality of slits 200g is cut into second layer 200. Each slit 200g extends between upper surface 200a and lower surface 200b. The plurality of slits 200g is arranged to form a pattern on second layer 200. The pattern is a regular pattern that distributes the slits 200g uniformly over the length and width of second layer 200b. In other embodiments, the pattern of slits is not regular or uniform over the length of width of the second layer but may be located in particular regions where structural strength ultimately is desired. Any suitable pattern of slits 200g may be utilized in second layer 200 based on the end application of the packaging enclosure that is to be fabricated from packaging material 10, 110, 210. The pattern of slits 200g illustrated in FIGS. 3 and 4 is exemplary of one possible pattern of slits 200g suitable for use in packaging material 10 but other suitable patterns of slits or apertures may be adopted instead.

FIGS. 3 and 7 show second layer 200 in an initial unexpanded condition. In this unexpanded condition, second layer 200 is of a length "L" that is substantially identical to the length "L" of first layer 100. Second layer 200 also is of a width "W1". In some embodiments, as illustrated in FIG. 3, the width "W1" is less than the width "W" of first layer 100 such that a border region (unnumbered) of first layer 100 extends laterally outwardly beyond first and second side edges 200e, 200f of second layer 200. In other embodiments, not illustrated herein, the width "W1" of second layer 200 is equal to the width "W" of first layer 100 or is greater than the width "W" of first layer 100.

FIG. 5 shows that the thickness (i.e., height) of first layer 100 is indicated as the thickness "T". The thickness of the unexpanded second layer 200 is indicated as the thickness "T1." In some embodiments, as illustrated in FIG. 5, the thicknesses "T" and "T1" are substantially equal in size but in other embodiments, not illustrated herein, the thickness "T1" of second layer 200 may be less than or more than the thickness "T" of first layer 100.

Second layer 200 is bonded or adhered to first layer 100 in any suitable manner that will allow first layer 100 to activate second layer 200 and thereby allow both first layer 100 and second layer 200 to move from an unstretched or unexpanded condition to an expanded condition. In particular, when a force in the direction "A" (FIGS. 1 and 2) is applied to at least the first layer 100, then first layer 100 will expand, stretch or extend longitudinally from length "L" to length "L1" in the direction "A". It will be understood that the first layer 100 stretches or expands in a plane (from first side 100e to second side 100f) in the direction "A". Expansion of first layer 100 activates second layer 200 and the second layer 200 will similarly be caused to expand longitudinally in a plane from length "L" to length "L1" in the direction "A".

First layer 100 is therefore a substrate layer or carrier layer to which one or more other expanding layers (such as second layer 200) are bonded or adhered, and this substrate layer or carrier layer has the ability to activate the one or more other expanding layers, causing them to expand.

When second layer 200 expands in response to the force and extends in the direction "A", the plurality of slits 200g (FIG. 3) will elongate longitudinally and open up, causing air pockets 200g' (FIG. 4) to be created in second layer 200 where the slits 200g were previously located. Second layer 200 not only expands in the Y-direction with first layer 100 but will also expand in the Z-direction (FIG. 6). Each air pocket 200g' adopts a three-dimensional geometric shape as the second layer 200 expands in the Z-direction. Stated differently, when second layer 200 expands longitudinally, the second layer 200 also increases in height and the thickness thereof increases from a thickness "T" to a thickness "T2" (FIGS. 5 and 6). First layer 100 remains of an unchanged thickness "T" upon longitudinal expansion of first layer 100. It will be understood that the geometric shape of the air pockets 200g' is determined by the original shape of the slits 200g cut into second layer 200. For example, each air pocket 200g' may be hexagonal in shape when viewed from above, or ovoid, elliptical, diamond-shaped, octagonal, rectangular cuboid, or of any other desired configuration.

The second layer 200, i.e., the cut-patterned layer 200 is suitable for forming an inside layer of a packaging enclosure 12 (FIG. 14A) fabricated with packaging material 10. Second layer 200 provides protection for the contents of the packaging enclosure inasmuch as the expanded second layer 200 provides compressive strength to the packaging enclosure and exhibits flexibility or cushioning to torsion. The expanded second layer 200 also conforms around objects retained within the packaging enclosure 12, as will be later described herein.

Referring still to FIGS. 1 and 4, and as discussed above, first layer 100 is configured to be pulled or extended in at least a first direction (e.g., in two planes such as X, Y, or X and Y) when a pulling force is applied thereto. When a pulling force in the direction "A" is applied to at least first layer 100, first layer 100 will expand longitudinally in the direction "A", parallel to the longitudinal axis "Y". The Z-shaped folds 102 in first layer 100 will unfold and the creases 104, 106 will flatten out. Substantially simultaneously, second layer 200 will be activated and will expand longitudinally in the direction "A", and will further expand vertically in the Z-direction as the plurality of slits 200g open up. When first layer 100 is in the fully unfolded or expanded condition as in FIG. 4, first layer 100 is of the same width "W" as when first layer 100 was in the folded or unexpanded condition (FIG. 1) but the length of first layer 100 has increased from length "L" to length "L1". As is illustrated in FIG. 4, the fully unfolded or expanded first layer 100 is free of any creases 104, 106 or folds 102.

The second layer 200 when fully expanded is also of the length "L1" but the width of second layer 200 has shrunk to the width "W2" (FIG. 4). Stated differently, the cut-patterned layer 200 may shrink substantially in width when the packaging material 10 is expanded creating a width mismatch between the cut-patterned layer 200 and the substrate layer 100 to which the second layer 200 is adhered or bonded. Referring to FIGS. 7 and 8, and in order to compensate for the reduction in width during expansion of the second layer 200, the cut-patterned layer 200 is formed and/or cut such that extra material is available in the width thereof. In other words, the cut-patterned layer 200 is provided with a width that is greater than the width "W" of the substrate layer 100 such that, when packaging material 110 is stretched or expanded, the cut-patterned layer 200 maintains a width "W1" approximate to the apparent width "W1" of the second layer 200 prior to expansion thereof. FIGS. 7 and 8 show second layer 200 of packaging material 110 being provided with a width that is greater than the width "W" of the first layer 100. The additional width is initially accommodated by forming one or more folds 202 in second layer 200. FIG. 7 shows one fold 202 formed in second layer 200. Each of the one or more folds 202 is substantially identical to the one or more folds 102 formed in first layer 100 (see FIGS. 1 and 2). As such, each fold 202 is a Z-shaped fold formed by making two oppositely oriented creases in second layer 200, where the two creases are substantially identical to creases 104 and 106 illustrated in FIG. 2. In other embodiments, the one or more folds 202 (like folds 102) may be differently configured from being Z-shaped. As many folds 202 will be provided in second layer 200 to overcome the width shrinkage issue.

FIG. 7 shows that the single fold 202 formed in second layer 200 is oriented parallel to longitudinal axis "Y" and therefore at right angles to lateral axis "X". Fold 202 is therefore oriented at right angles to the folds 102 in first layer 100. In particular, fold 202 is oriented parallel to the direction in which first layer 100 and second layer 200 are to be expanded. In other embodiments, the one or more folds 202 may be oriented the same as or different to the folds 102 in first layer 100.

FIG. 7 shows that the initial width of second layer 200 in the unexpanded packaging material is the width "W1". The fold 202 provides sufficient extra material in second layer 200 that when packaging material 110 is expanded, the final width of second layer 200 will remain as width "W1". As second layer 200 expands longitudinally and vertically in response to that first layer 100 being pulled in the direction "A", the fold 202 will unfold and flatten out as the second layer 200 shrinks laterally. The end result of the fold 202 unfolding and flattening out is that second layer 200 remains of the width "W1" (FIG. 8) while increasing in thickness to thickness "T2". It will therefore be understood that second layer 200 is originally only apparently of the width "W1". The second layer 200 is actually wider than the width "W1". It will be understood that other than the provision of the one or more folds 202 and the original increased width, all other structures and functions of the second layer 200 in packaging material 110 are identical to those of second layer 200 as described above with respect to FIGS. 1 to 4 and packaging material 10. First layer 100 as illustrated in FIGS. 7 and 8 is identical in structure and function to first layer 100 described earlier herein and illustrated in FIGS. 1-4.

While second layer 200 has been disclosed herein as including one or more folds 202 therein, in other embodiments (not illustrated herein) second layer 200 may be made from a material that is expandable without the need for any folds to be formed therein.

It will be noted that first layer 100, i.e., substrate layer 100, preferably remains wider than the second layer's effective width prior to and post expansion of the packaging materials 10 in order to maintain a border on either side of second layer 200. The border region extends between the first side 100e and first side 200e of first and second layers 100, 200 and between second side 100f and second side 200f of first and second layers 1001, 200. These border regions are utilized in the formation of the packaging enclosure, as will be described later herein.

In some embodiments, not illustrated herein, a line a weakness may be formed in one or both border regions of packaging material 10, 110, and 210. The line of weakness will be oriented parallel to longitudinal axis "Y" and provides a region on the eventual packaging enclosure 12 that a user can utilize to tear open the sealed packaging enclosure to access the contents therein.

Referring now to FIG. 9, a third embodiment of a packaging material in accordance with the present disclosure is illustrated, generally indicated as packaging material 210. Packaging material 210 comprises a first layer 100 that is identical in structure and function to first layer 100 illustrated in FIGS. 1-6. Second layer 200 differs from the second layer 200 illustrated in FIGS. 1 to 4 in that in this third embodiment, the second layer 200 is initially of a greater length than the length "L" of the first layer 100 and second layer 200, and is also of a greater width than the width "W1" of second layer 200. The extra length and width of second layer 200 is accommodated in one or more folds 202' formed therein. Folds 202', like folds 202, are Z-shaped and formed in an identical manner to folds 202. However, the folds 202' differ from the folds 202 formed in the second layer 200 illustrated in FIGS. 7 and 8 in their orientation. As described above, folds 202 are arranged generally parallel to longitudinal axis "Y" of the section of packaging material 110. In packaging material 210, however, the folds 202' are oriented oblique to longitudinal axis "Y" (and therefore are also oriented oblique to lateral axis "X").

When first layer 100 of packaging material 210 is expanded in the direction "A", the one or more folds 102 in first layer 100 and the one or more folds 202' in second layer 200 will unfold and flatten out. The width "W1" and length "L1" of second layer 200 will remain apparently unchanged as packaging material 210 expands in the Z-direction because the extra material in the folds 202' compensates for the shrinking of second layer 200 as the second layer 200 expands vertically. The configuration of second layer 200 in packaging material 200 therefore compensates for shrinkage of second layer 200 in a longitudinal direction and in a lateral direction as the second layer 200 expands longitudinally in the Y-direction and vertically in the Z-direction.

It will be understood that, in other embodiments, the folds 202' will not be Z-shaped, but like folds 102 may be differently configured and differently oriented from what is illustrated in FIG. 9.

It will further be understood that the locations of the one or more folds 102, 202, and 202' in the associated first layer 100 and second layer 200 may be different from what is illustrated in FIGS. 1-9. It will be understood that any desired number of folds 102, 202, and 202' may be formed at any desired position and/or orientation and/or arrangement to suit the application of the packaging method and the apparatus in which packaging material 10, 110, 210 is to be fabricated into a packaging enclosure.

Referring to FIGS. 1-9, second layer 200 will be adhered to or bonded to first layer 100 in each of the packaging materials 10, 110, 210. Second layer 200 may be attached to first layer 100 adjacent a perimeter of second layer 200. Adhesion may be completed in such a way as to avoid inhibiting the unfolding of folds 102 provided in first layer 100. Adhesion adjacent the perimeter of second layer allows the substrate folds 102 and any cut-patterned layer folds 202, 202' to readily unfold as the packaging material is stretched, and further allows the second layer 200 to expand vertically as illustrated in FIG. 8. Adhesion between first layer 100 and second layer 200 may be achieved with adhesive materials, coatings, mechanical means, pressure and/or heat, or any combination thereof.

Figure 11:
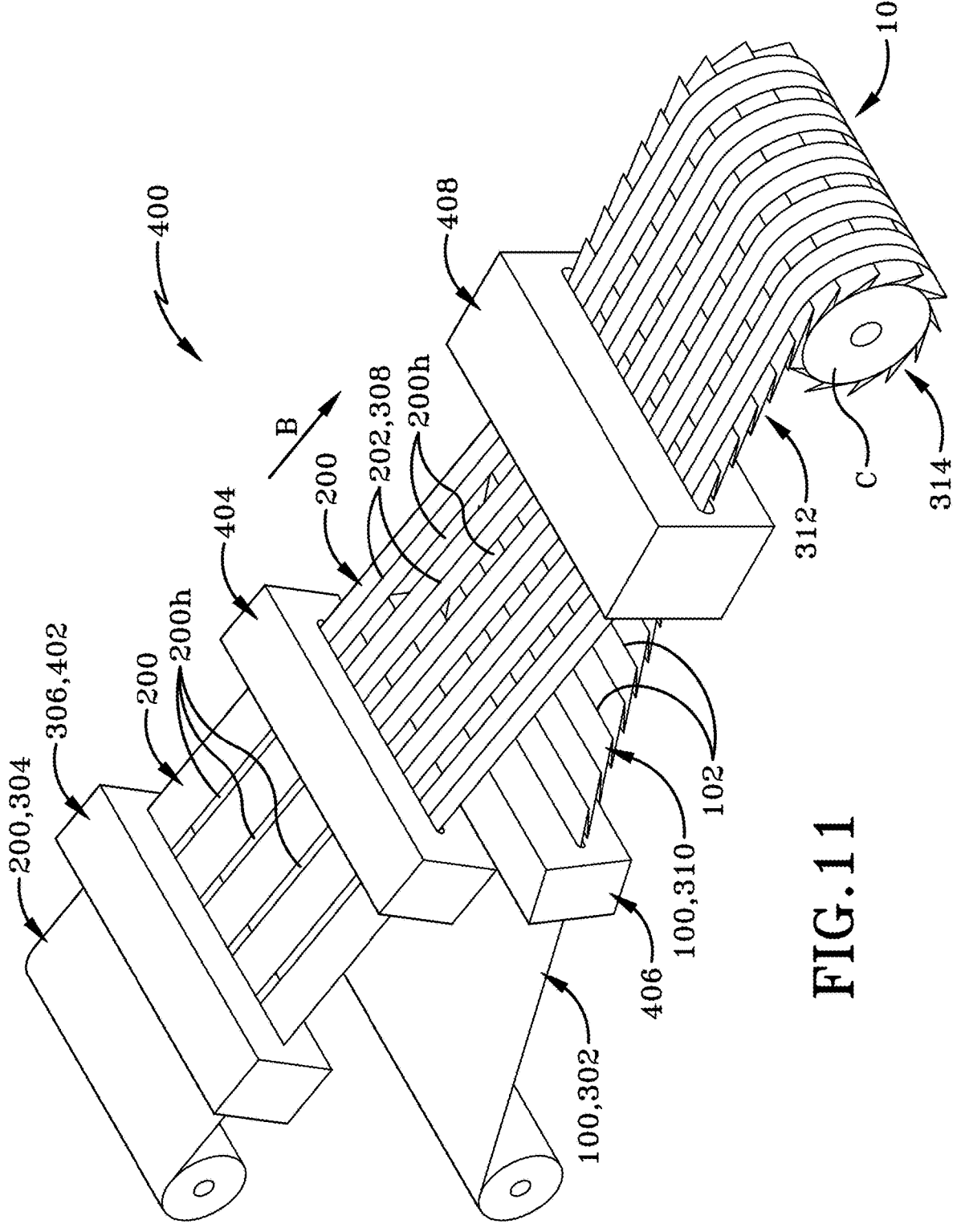
FIG. 11 illustrates an exemplary manufacturing apparatus for the packaging material in accordance with an aspect of the present disclosure.
Figure 13:
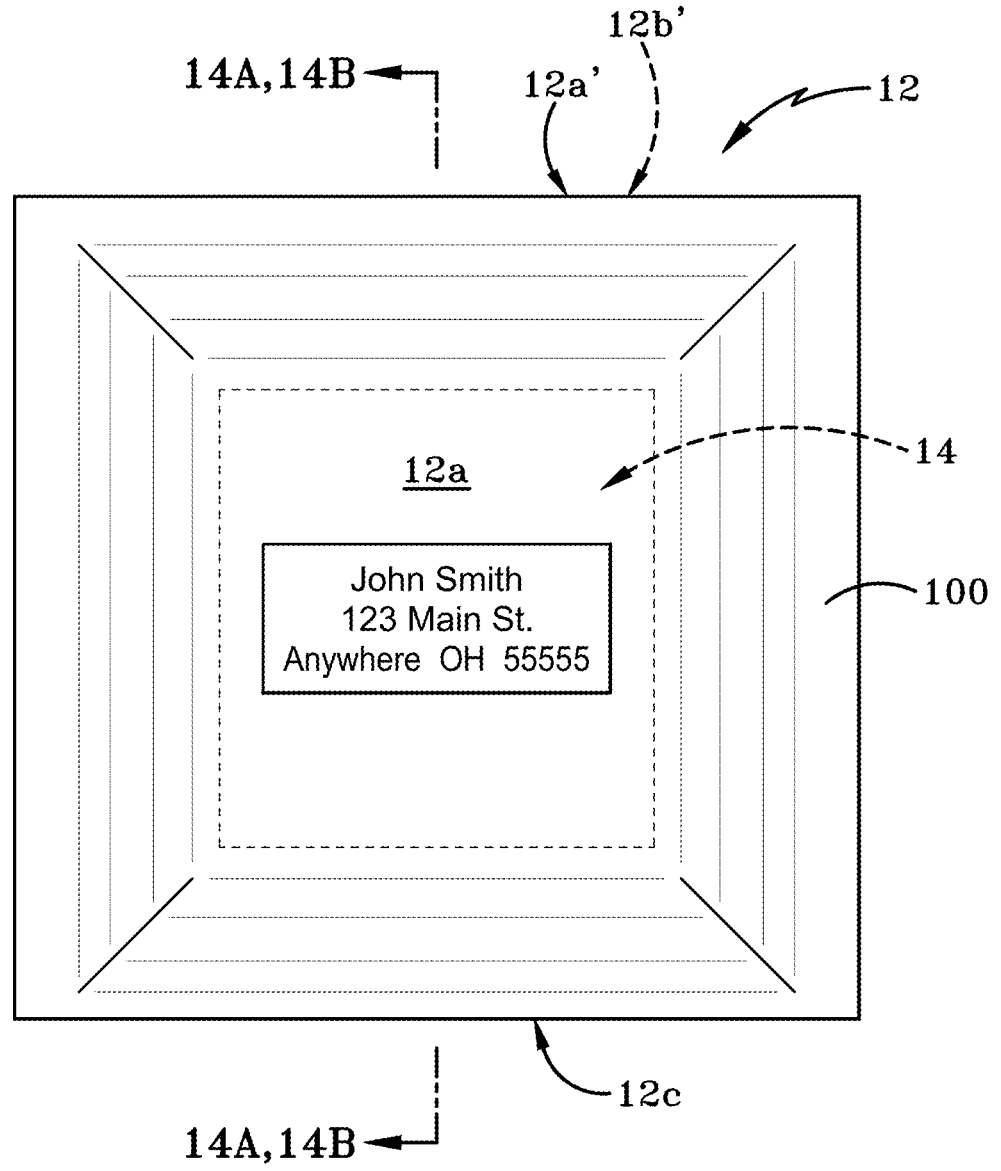
FIG. 13 is a diagrammatic front elevation view of the packaging enclosure made with the packaging material in accordance with the present disclosure.

FIGS. 10 and 11 depict an exemplary method and exemplary apparatus for implementing manufacture of a roll of packaging material 10, 110, 210 in accordance with one or more aspects of the present disclosure. The method and apparatus couples first layer 100 and second layer 200 to form the roll of packaging material 10, 110, 210. The exemplary method is illustrated in FIG. 10 and is generally indicated as method 300. An exemplary apparatus for performing the method 300 is illustrated in FIG. 11 and is generally indicated as apparatus 400.

At 302 in FIGS. 10 and 11, a product is received that is configured to comprise the substrate layer (i.e., first layer 100) of the packaging material 10, 110, and 210. This substrate layer 100 is a paper-based product in one aspect of the present disclosure. In one aspect, the first layer may be kraft paper, for example.

At 304, a product is received that is configured to comprise the cut-patterned layer (i.e., second layer 200) of the packaging material 10, 110, and 210. This second layer 200 is a paper-based product in one aspect of the present disclosure. In one aspect, the second layer may be kraft paper or corrugate for example.

At 306, the exemplary apparatus forms slits 200g (FIG. 3) in second layer 200. The slits 200g are not illustrated in FIG. 11 for clarity of illustration. In other embodiments, second layer 200 may be pre-processed by cutting slits 200g in kraft paper or corrugate and then the pre-processed second layer 200 is introduced into the exemplary apparatus in order to couple the second layer 200 to first layer 100.

FIG. 11 illustrates that the second layer 200 is cut longitudinally into narrower width lines that are oriented parallel to a direction of feed "B" of second layer 200 and such that a gap 200h is defined between adjacent lines. It will be understood that in other embodiments the second layer 200 may not be cut into narrower lines.

At 308, one or more folds 202 are formed into the second layer 200, i.e., the cut-patterned layer. The one or more folds are Z-shaped folds or another configuration of fold that allows second layer 200 to be fed into and move through the exemplary apparatus. The Z-folds may be located at various positions along the length of the second layer 200 such as oscillating across the width of second layer 200. The one or more folds 202 are arranged parallel to the longitudinal axis "Y" of the second layer 200 and thereby parallel to the feed direction "B" of the second layer 200.

In other embodiments, instead of folds 202 being formed in second layer 200, one or more folds 202' may be formed in second layer 200, where the folds 202' are arranged oblique to the longitudinal axis "Y" and thereby to the feed direction "B". In yet other embodiments (not illustrated herein), one or more folds may be formed in second layer 200 that are oriented at right angles to the longitudinal axis "Y" and thereby to the feed direction "B". As described earlier herein, second layer 200 is capable of expanding in the Z-direction, and thereby increasing in thickness, in response to being pulled, i.e., stretched.

At 310, the substrate layer 100 is folded into one or more folds 102. The one or more folds 102 are Z-shaped folds or another configuration of fold that allows first layer 100 to be fed into and move through the exemplary apparatus. The Z-folds 102 may be located at various positions along the length of the first layer 100. The one or more folds 102 may be arranged perpendicular to the longitudinal axis "Y" of the first layer 100 and thereby perpendicular to the feed direction "B" (FIG. 11). The feed direction "B" is identical to the direction "A" in which packaging material 10, 110, 210 will ultimately be expanded as illustrated in FIGS. 1, 3, 5, and 9.

As described above, the substrate layer 100 is a raw material, such as kraft paper, that is folded by the exemplary apparatus 400. In other embodiments, the substrate layer 100 may be pre-processed by forming folds 102 therein and is then fed into the exemplary apparatus for coupling with second layer 200.

At 312 the first layer 100 and second layer 200 are bonded to one another. In one embodiment first layer 100 and second layer 200 may be bonded near the first and second sides 200e, 200f of second layer 200. In one embodiment adhesive is not placed along the Z-shaped folds 102, 202, 202' so that these regions of the first layer 100 and/or second layer 200 can readily unfold when packaging material 10, 110, 210 is stretched.

At 314, first layer 100 and second layer 200, which are now coupled and bonded to one another, are wrapped around a roll core "C". Multiple lines of coupled material, i.e., packaging material 10, 110, and 210 may be wrapped around the core "C". The wrapped rolls of packaging material 10 110, 210 may be further processed such as being cut into individual rolls each containing a single smaller line. In other embodiments, instead of being wrapped around the core "C", the packaging material may be formed into sheets or sleeves, or may be configured in any other manner.

FIG. 11 illustrates an apparatus 400 that may perform the method 300 depicted in FIG. 10. The second layer 200 is introduced into apparatus 400 and passes through a cutting mechanism 402 which cuts the pattern of slits 200g therein as described earlier herein. The second layer 200 at this point is unexpanded and so the slits 200g are "at rest" and are not opened up to form air pockets, i.e., apertures 200g'. After moving through the cutting mechanism 402, the second layer 200 may also be referred to as the cut-patterned layer 200. The cutting mechanism 402 may also remove sections of the cut-patterned layer 200, thereby leaving the gaps 200h between elongate lines of cut-patterned layer 200. It will be understood that although the figure illustrates four sections of layer 200 being removed, in other embodiments fewer than four sections or more than four sections of layer 200 may be removed. As described earlier herein, in some embodiments, sections of the cut-patterned layer 200 may not be removed therefrom and in these instances the cutting mechanism 404 will only cut slits 200g in second layer 200.

Referring still to FIG. 11, the sectioned cut-patterned layer 200 is fed through a folding mechanism 406 which introduces one or more folds 202 into each elongate line of second material 200. The folds 202 are oriented parallel to the direction of feed or travel "B". The substrate layer 100 is fed through a second folding mechanism 406 that introduces one or more folds 102 into substrate layer 100. As illustrated in the figure, the folds 102 are oriented substantially perpendicular to the direction of feed or travel "B".

The cut-patterned layer 200 and substrate layer 100 are fed into a bonding mechanism 408 which couples the two layers to one another. Bonding between the two layers 100, 200 may be accomplished through the application of adhesive, heat and/or pressure or utilizing any other mechanism or substance. The bonded layers 100, 200 (whether cut into lines or fabricated without lines) may then be collected onto the roll or core "C". In some embodiment, the smaller lines may be wound onto separate smaller rolls (not shown). In other instances, as discussed earlier herein, the packaging material may, instead, be cut into sheets.

It will be understood that various steps 302 through 312 of method 300 may be performed in a different order and that, accordingly, the various mechanisms 402, 404, 406 408 of apparatus 400 will be differently arranged to suit the order of steps 302 through 312.

FIGS. 12 through 14B illustrate the manufacture of an exemplary packaging enclosure 12 having one or more expandable layers, utilizing an exemplary method indicated at 500. In some aspects, the method 500 is implemented by an apparatus (not shown) that provides customized sizing for packaging enclosures 12. In these aspects, the packaging enclosure 12 is customized in shape and size to retain and protect an item, object or article 14 within an interior cavity of the packaging enclosure 12, as will be described later herein. The item, object, or article 14 may also be referred to herein as the contents of the packaging enclosure.

In method 500, in step 502 the packaging material 10, 110, 210 with one or more expandable layers 100, 200 therein is received. The packaging material 10, 110, 210 may be provided on as a roll of material wound around a core "C" as in FIG. 11. The roll of packaging material 10, 110, 210 wound onto the core "C" may be provided to a packaging apparatus particularly configured to take a length of the packaging material, expand the one or more expandable layers 100, 200 and then form packaging enclosure 12 (FIG. 14A) therewith.

After the packaging material 10, 110, 210 is received as at 502 in method 500, at 504, the substrate layer 100 (i.e., first layer 100) is stretched or expanded longitudinally in a direction "A" (FIGS. 1 through 6) to unfold the one or more folds 102 formed therein. The stretching or expansion of the first layer 100 or substrate layer 100 is illustrated in FIGS. 1 and 2.

At 506, the cut-patterned layer 200 (i.e., second layer 200) is moved from an unexpanded condition to an expanded condition (such as is illustrated in FIGS. 3 and 4; or as illustrated in FIGS. 7 and 8 if folds 202 are present). The cut-patterned layer 200 is expanded as a result of the first layer 100 being expanded. As the cut-patterned layer 200 expands longitudinally, the layer 200 also expands in the Z-direction and thereby increases in height or thickness (as illustrated in FIGS. 7 and 8). The expansion of the cut-patterned layer 200 opens the slits 200g to form air pockets 200g'. The cut-patterned layer 200 expands longitudinally with the substrate layer 100 as the substrate layer 100 expands. If folds 202 are provided in cut-patterned layer 200, then folds 202 will unfold as the cut-patterned layer 200 expands, giving the cut-patterned layer 200 additional width. The expansion of second layer 200 gives structural strength to packaging material 10, 110, and 210.

At 508, a length of a packaging material 10, 110, 210 is determined for packaging a particular item, object, or article 14. The length may be determined automatically by a machine or manually by a person. The length is customizable based on the dimensions of the item, object, or article 14 to be enclosed within the packaging enclosure 12. In other embodiments, the length of the packaging material 10, 110, 210 may be a standard length that is utilized in all packaging enclosures. The standard length will be utilized regardless of the item, object, or article 14 to be packaged.

The length of the packaging material is folded generally in half to form a front 12a and a back 12b (FIG. 14A) of what will ultimately becoming packaging enclosure 12. Front 12a and back 12b are folded about a fold 12c (FIG. 14A). Front 12a terminates in a free end 12a' remote from fold 12c. Similarly, back 12b terminates in a free end 12b' remote from fold 12c.

At 510 in method 500 (FIG. 12), a bonding agent is applied to interior surfaces of the front 12a and back 12b of the length of the packaging material being used to fabricate the packaging enclosure 12. First layer 100 in some embodiments 10, 110, 210 may include adhesive properties (e.g. a coating or an adhesive) in order to enable closure of the packaging enclosure 12 formed with packaging material 10, 110, 210. As an example, a coating may be present on the upper surface 100a of the first layer 100, particularly on the border regions that extend outwardly beyond the first and second sides 200e, 200f of second layer 200. The coating may bond in response to heat, pressure, and/or moisture, or a combination thereof. In various embodiments, a heat-sensitive coating may create and enclosure through a process done by hand or with the use of an apparatus designed for this purpose, or any combination thereof. The bonded front 12a and back 12b of packaging enclosure 12 bound and define an interior cavity 12d within which the item, object, or article 14 is received.

Once the side edges of the packaging enclosure 12 are bonded to one another and the item, object, or article 14 is received within the interior cavity 12d, the upper regions of front 12a and back 12b are bonded to one another to close off access to interior cavity 12d.

In other embodiments, not illustrated herein, two separate lengths of packaging material may be cut to suit the dimension of the item, object, or article 14 to be contained within the packaging enclosure 12. The two cut lengths are then bonded along a bottom edge and along opposed side edges (i.e., border regions of first layer 100) and to thereby form the interior cavity 12d into which the item, object, or article 14 is to be inserted. Ultimately, the two lengths of packaging material are sealed to one another along a top edge to enclose the item, object, or article 14 within the interior cavity of the packaging enclosure.

As is evident from FIG. 14A, the expanded second layer 200 contacts the item, object, or article 14 and protects the same from impact during shipping.

Referring now to FIG. 14B, there is shown an alternative packaging enclosure 112 that is formed from a fourth embodiment of a packaging material in accordance with the present disclosure, generally indicated at 610. Packaging material 610 comprises three layers, namely first layer 100, second layer 200, and a third layer 600. Third layer 600 is substantially identical in structure and function to first layer 100 and is arranged to be bonded or adhered to an opposite surface of second layer 200 relative to first layer 100 and in such a way that the first layer 100, second layer 200, and third layer 600 are able to be readily expanded. When the three layered packaging material 610 is expanded and formed into a packaging enclosure 612, a first region of the packaging material forms the front 612a of the packaging enclosure 612. A second region of the expanded packaging material forms the back 612b of the packaging enclosure 612b. Preferably, a predetermined length of the packaging material is folded along a fold 612c to form front 612a and back 612*b* but in other embodiments two separate sections of packaging material may be bonded along a bottom edge and along opposed border regions proximate the side edges of first layer 100. The two separate sections of packaging material are ultimately bonded or adhered to one another along a top edge thereof. First layer 100 becomes the exterior surface of the packaging enclosure 612 to which a mailing label (not numbered in FIG. 14B but similar to the label shown in FIG. 13) is applied. Third layer 600 becomes an inner liner that bounds and defines the interior cavity 612*d* of packaging enclosure 112. Second layer 200 is a structurally strong and protective layer that aids in protecting the item, object, or article 14 during shipping.

It will be understood that in other embodiments, more than three layers may be provided in the packaging material that will ultimately be formed into customized packaging. More than one layer identical or similar to first layer 100 may be utilized in such packaging material. Furthermore, more than one layer identical or similar to second layer may be utilized in such packaging material.

In one aspect, the present disclosure is directed to a paper-based packaging system in which a packaging apparatus, machine or person can form a customized package (e.g., an envelope) or enclosure that is customized to an item, object, or article that is to be shipped to a consumer.

The second layer 200 of the packaging material 10, 110, 210 utilized in the packaging system in accordance with an aspect of the present disclosure comprises a filler material that elongates longitudinally (and/or laterally) when stretched or pulled. The filler material also elongates vertically, increasing in height or thickness but may shrink longitudinally or laterally as it expands vertically. The filler material includes a plurality of slits that open up and form air pockets therein as the filler material expands vertically. The filler material, i.e., second layer 200 may be initially cut to a length and/or width that is greater than the substrate layer 100 to which the second layer 200 is adhered or bonded. The additional length and/or width may be accommodated in one or more folds formed in the second layer 200. As the second layer 200 is stretched and expands longitudinally or laterally, and vertically, the folds in the second layer 200 unfold and therefore this layer 200 appears not to shrink during expansion of the packaging material.

In one aspect, a paper-based packaging material includes at least two layers. In some instances, the packaging material includes two layers, which may include a substrate layer 100 that is pulled or extended in at least a first direction (the X-direction or the Y-direction) that is effective to cause a second layer 200 of the packaging material to expand in at least a third direction (i.e., the Z-direction). In such instances, the second layer of material may also contract in a second direction (the X-direction or the Y-direction) which may include the direction normal (i.e., at right angles) to at least the first direction in which the first layer 100 is pulled.

For example, the paper-based packaging material may include two layers, with a liner (e.g., an expanding layer) and an outside solid paper so that when a packaging enclosure 12 is formed, the outside is smooth paper and the inside is the second layer 200 which forms a liner that is expanded in the Z-direction and includes a plurality of air pockets.

In some aspects, the paper-based packaging material may include at least three layers 100, 200, and 600 (FIG. 14B). The at least three layers may include an inner solid paper layer 100, an outer solid paper layer 600, and an expanding core layer 200 disposed between the inner and outer layers of solid paper. Alternatively, or additionally, the paper based packaging material 10, 110, 210, may include one or more expanding core layers 200 (e.g. of the same or different types of expansion coefficients oriented in a same direction or in different directions. In other words, some of the one or more core layers may have a different pattern of slits 200*g* cut therein and therefore produce different shape and sizes of air pockets 200*g'* therein and or which may expand to various different thicknesses based on the patterns of slits formed therein. The inner and outer layers 100, 600 may be of a similar type or weight of paper or they may be of different types of weights of paper. The different types or weights of paper used for inner and outer layers 100, 600 may provide different levels of packaging protection, durability, or the like.

In various aspects, a packaging apparatus may manipulate the paper-based packaging material 10, 110, 210 in various combinations of one or more directions to cause an increase in thickness or Z-height of the second layer 200 and other similar core layers.

In some instances, a substrate layer 100 (or 600) is pulled and extended in one direction to cause expansion of a liner 100 (or 600) and/or core layer 200 in thickness.

In some aspects, the direction of pull on the substrate layer 100 (or 600) to cause expansion of the core layer 200 may be east or west or north or south or a combination thereof either simultaneously or sequentially. In other words, the direction of the folds in the substrate layer 100 and liner layer 600 relative to the core layer 200 could be in the same direction or in different directions relative to one another.

Some example embodiments of paper-based packaging material in accordance with aspects of the present disclosure include a) a substrate layer (e.g., inner, intermediate, or outer paper-based layer that is solid and/or folded) and an expanding layer 200 that may form a liner of a packaging enclosure; b) a first substrate layer, a first expanding liner, and a second expanding layer (in any order); c) a first substrate layer, a first expanding liner, a second expanding layer, and a second substrate layer (in any order); d) a first substrate layer, a first expanding liner, a second substrate layer, a second expanding layer, and a third substrate layer (in any order); and e) a first substrate layer (inner), a first expanding liner, a second substrate layer (middle), a second expanding layer, and a third substrate layer (outside), wherein the layers may be folded or oriented in the same direction or in different directions.

In some aspects, the paper-based packaging material 10, 110, 210 may be formed into a roll (as illustrated in FIG. 11), or into sheets or the like. As such, the packaging material 10, 110, 210 is suitable for various levels of packaging automation or preforming into any size or shape of enclosure or envelope. For example, a retailer may receive a roll of the paper-based packaging material 10, 110, 210 which may be formed, on site, into any suitable shape and size of envelope for the products that the retailer sells.

In some aspects, the filler or core material, i.e., second layer 200, may elongate longitudinally but may shrink laterally or may elongate laterally and shrink longitudinally. In some aspects, the length and or width of the second layer 200 may be increased and the second layer 200 may be folded accordingly to compensate for the lateral or longitudinal shrinking of the layer 200 when stretched.

In some aspects, the paper-based packaging material is formed such that the material can feed a machine with a minimum amount of air.

In some aspects, an inner or outer layer (100 or 600) is folded such that the layer is able to expand when stretched or pulled in the X-direction or Y-direction.

In some aspects, the core or inner layer 200 is formed and/or cut such that extra material is available for width (or length), depending on the direction in which the substrate layer 100 is to be pulled. In other words, the inner or core layer 200 may have a dimension greater than the substrate layer 100 or liner 600 such that when the core layer 200 is stretched so as to increase in height (or thickness), i.e., is expanded in the Z-direction), the excess width (or length) of the core layer 200 maintains an approximate width of the substrate layer 10 when pulled or extended from one end.

In some aspects, the filler, core, or inner layer 200 is overlaid or disposed on a liner layer 100, 600 that is solid folded paper. In some aspects, the filler layer 200 is attached at points along an edge of the liner layer 100, 600, allowing the liner layer 100, 600 to be pulled in an X-direction or a Y-direction.

When the liner layer 100, 600 is pulled or expanded, the filler or core layer 200 expands across the liner layer 100, 600, which is effective to cause the filler or core layer 200 to expand in the Z-direction. In some aspects, the filler layer 200 may be folded differently from the liner layer 100, 600 (e.g., diagonally). This arrangement causes expansion of the filler layer 200 when the liner layer 100, 600 is expanding in the X-direction or the Y-direction.

As discussed earlier herein, the terms "substrate layer" and "carrier layer" used herein refer to a layer to which one or more other layers are adhered or bonded and which has an ability to activate at least one of those one or more other layers, causing it to expand. It should be understood that although the first layer 100 (or substrate or carrier layer 100) is disclosed herein as including one or more folds that enable the first layer to be selectively expanded or extended, in other embodiments, the first layer may be gathered or crinkled or include tabs and nodes that allow the paper to be expanded in one or more directions without the provision of folds.

It will further be understood that packaging material 10 instead of being pulled in only a first direction "A" (as in FIG. 1), the packaging material may be pulled in a combination of different directions, either concurrently or sequentially. In order to enable packaging material 10 to expand in a combination of different directions, at least the first layer will be provided with a combination of folds that are oriented and arranged in such a way that the enable expansion of at least the first layer in these various different directions.

The second layer 200 is a product that elongates when stretched. In one aspect, the second layer 200 will elongate longitudinally. In one embodiment, the second layer 200 has a pattern of cuts formed therein (i.e., the cut-patterned layer). The cut-patterned layer 200 elongates when stretched (i.e., expanded) but may shrink in width, as it elongates. The cut-patterned layer 200 is adhered to the substrate layer 100. The dimensions of the cut-patterned layer is longer than, equal to, or smaller than the substrate layer 100.

First layer 100 is configured to be pulled or extended in at least a first direction (e.g., in two planes such as X, Y, or X and Y) that is effective to cause the second layer 200, or the cut-patterned layer, of the packaging material 10 to expand into at least one plane (e.g. Z-direction). The cut-patterned layer 200 has the benefit of creating structural strength in the packaging material 10 once the packaging material 10 is moved from an unexpanded condition to an expanded condition. The cut-patterned layer 200 may contract in a second direction (X or Y), which may include the direction normal to the first direction in which the substrate layer 100 is pulled or extended. To compensate for any such contraction, the cut-patterned layer 200 may include extra material that extends when the cut-patterned layer 200 is pulled into the expanded configuration. In other embodiments (not illustrated herein), the second layer 200 may be configured or manufactured such that the second layer 200 is able to expand in the Z-direction without undergoing contraction in the X-direction and/or Y-direction.

In some aspects, packaging material 10 includes two layers adhered to one another.

Packaging material 10 may be configured to enable flexibility for package size and to facilitate shipping of bulk rolls of the packaging material 10 when in an unexpanded condition. Preferably, packaging material 10 is formed from material that are recyclable. In one embodiment, each of the one or more layers in packaging material 10 is made from entirely recyclable materials. One suitable material for use as each of the one or more layers is paper.

Referring now to FIGS. 15 to 18B there is shown a fifth embodiment of a packaging material in accordance with the present disclosure, generally indicated at 710. Packaging material comprises a first layer 701, a second layer 703, and a third layer 705. Second layer 703 is substantially identical in structure and function to second layer 200 except for certain features which will be described later herein. The first layer 701 and third layer 705 may be referred to herein as substrate layers, outer and inner layers, or as layers which have a plurality of undulations formed therein (as will be described hereafter).

When packaging material 710 is formed into a packaging enclosure, first layer 701 will form an outer layer of the packaging enclosure and third layer 705 will form an inner layer of the packaging enclosure or vice versa. Second layer 703 will form a middle layer of the packaging enclosure and will be sandwiched between first layer 701 and third layer 705. The configuration of packaging enclosure will be described later herein. In accordance with an aspect of the present disclosure, each of the first layer 701, second layer 703, and third layer 705 of packaging material 710 is movable between an unexpanded condition and an expanded condition. The expansion of the various layers of the packaging material 710 will be described further later herein.

In accordance with an aspect of the disclosure first layer 701 and third layer 703 substantially identical in structure to one another. First layer 701 and third layer 705 are both formed of a sheet material, particularly a recyclable paper material, and more particularly from a fully recyclable paper material. Since first layer 701 and third layer 705 are substantially identical, the configuration of first layer 701 will be discussed with reference to FIGS. 15 to 16B but it will be understood that the description applies equally to third layer 705.

Figures 15, 16:
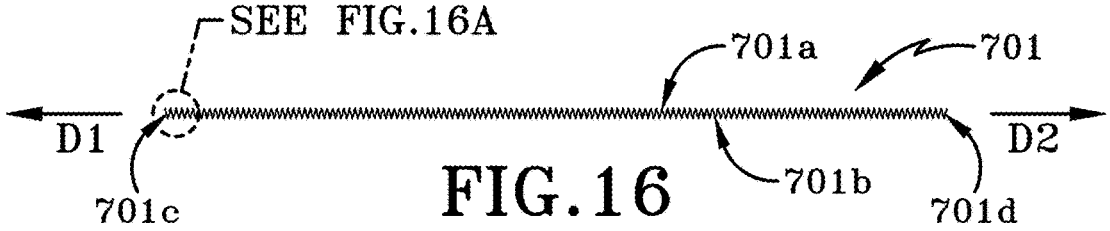
FIG. 15 is a top plan view of a first layer of a fifth embodiment of packaging material in accordance with an aspect of the present disclosure.
FIG. 16 is a diagrammatic side elevation view of the first layer of the packaging material taken along line 16-16 of FIG. 15.

FIG. 15 shows a top plan view of a piece of sheet material which forms the first layer 701 of packaging material 710. The sheet material is a recyclable paper material having a plurality of undulations formed therein. Suitable sheet materials for first layer 701 include but are not limited to materials such as crepe paper, crinkled paper, crimped paper, or corrugated paper. In other words, the paper sheet material has undergone a treatment method which results in a rippling, three-dimensional texture being formed in the paper. During treatment, the sheet material contracts, is creased, compressed, or corrugated in such a way as to form a plurality of small folds or wrinkles. The small folds or wrinkles comprise alternating peaks and valleys. The peaks may also be referred to herein as ridges and the valleys may also be referred to herein as grooves, or troughs. The pattern of alternating ridges and valleys in first layer 701 may be somewhat irregular, as in crepe paper, or somewhat more regular, as in crinkled paper or corrugated paper. The peaks and valleys may be generally V-shaped in configuration (as depicted diagrammatically in FIGS. 16A and 19A-19C, or the peaks and valleys may be more rounded and generally U-shaped. In other embodiments, the peaks and valleys in first layer 701 a combination of V-shaped and U-shaped features.

The alternating peaks and valleys formed in any one of the crepe paper, crinkled paper, crimped paper, or corrugated paper, used as first layer 701, will be referred to hereinafter as "undulations".

Figure 16A:
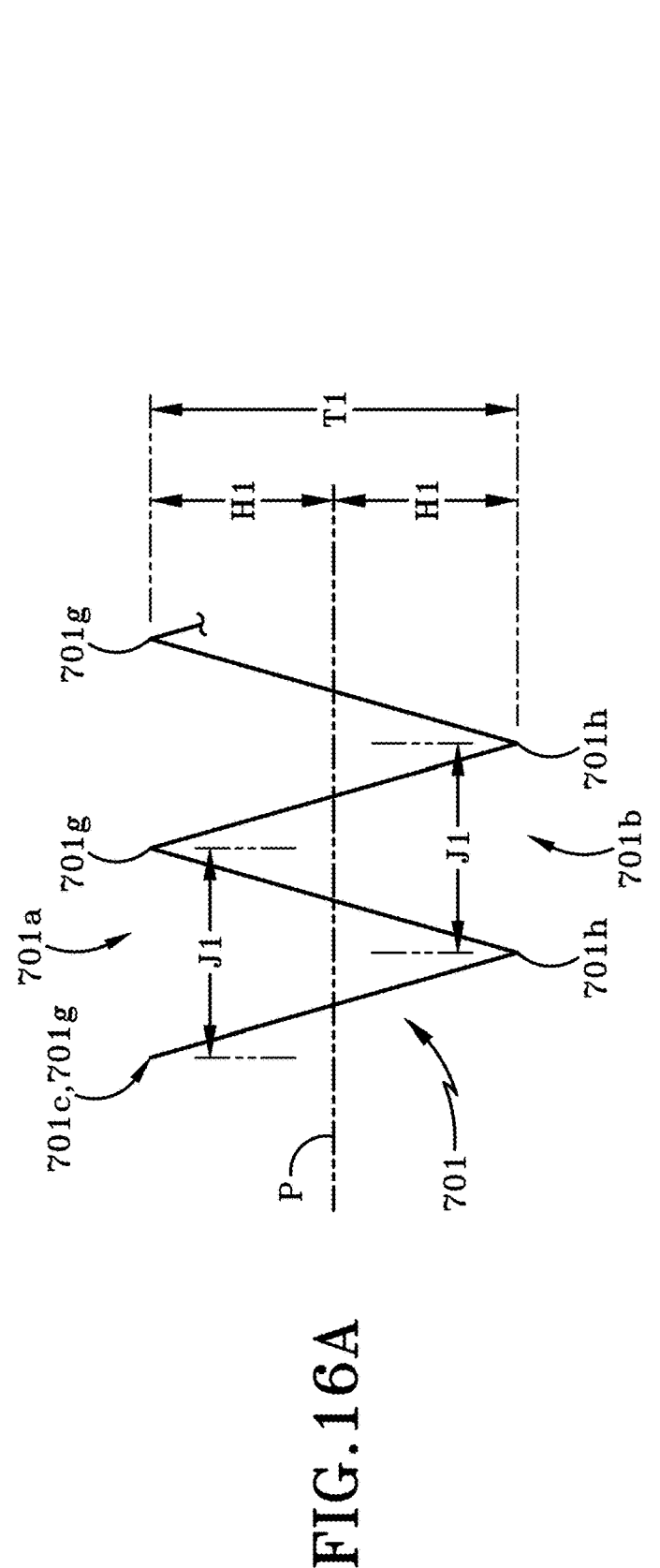
FIG. 16A is an enlarged diagrammatic side elevation view of a section of the first layer of the packaging material of FIG. 16 shown in an unexpanded state.
Figure 16B:
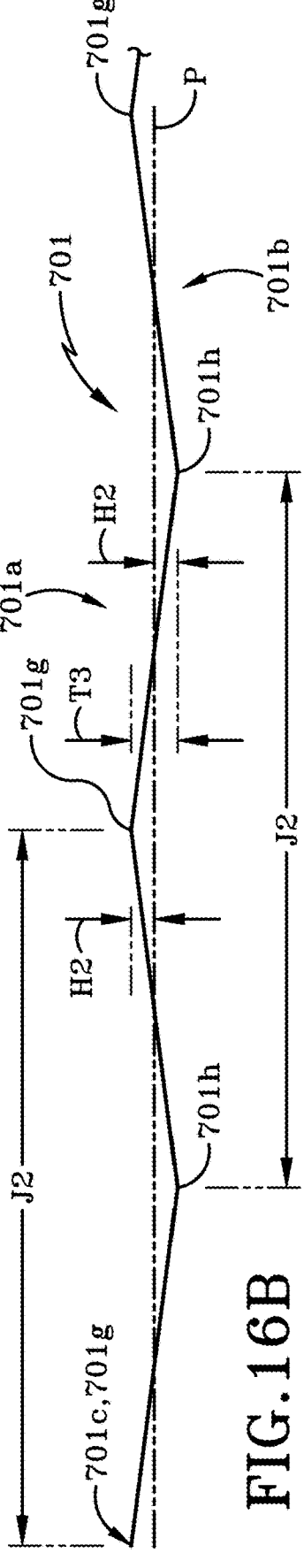
FIG. 16B is an enlarged diagrammatic side elevation view of the section of the first layer of the packaging material of FIG. 16 shown in an expanded state.

Referring still to FIGS. 15 through 16B, the sheet material of first layer 701 has an upper surface 701a, a lower surface 701b, a first end 701c, a second end 701d, a first side 701e, and a second side 701f. First layer 701 is of a length "L2" measured between first end 701c and second end 701d and is of a width "W3" measured between first side 701e and second side 701f. First layer 701 has a longitudinal axis "Y" extending between and orthogonal to first end 701c and second end 701d. First layer 701 further includes a lateral axis "X" extending between and orthogonal to first side 701e and second side 701f. Longitudinal axis "Y" is orthogonal, i.e., at ninety degrees, relative to lateral axis "X".

FIG. 16A shows an enlarged diagrammatic view of a section of first layer 701 in an unexpanded state while FIG. 16B shows an enlarged diagrammatic view of the same length of first layer 701 in an expanded state. FIG. 16A shows first layer 701 having a plurality of undulations formed therein with the undulations comprising alternating peaks 701g and troughs 701h. The undulations are of an amplitude or height "H1" measured relative to a plane "P" located generally midway between the peaks 701g and troughs 701h. It should be noted that the undulations in first layer 701 are extremely small in amplitude. In one embodiment, the height "H1" (i.e., amplitude) of the undulations is of from about _____ up to about _____ when first layer 701 is in an unexpanded condition. It will be understood that the undulations formed in first layer 701 may be of generally similar amplitude "H1" relative to one another. In other embodiments, the amplitude of the undulations may be irregular, meaning that some peaks and valleys in the first layer 701 may be larger in amplitude than other peaks and valleys therein.

The undulations in first layer 701 are also closely spaced relative to one another when first layer 701 is in an unexpanded condition. The spacing between successive peaks 701g or successive troughs 70h is measured as a wavelength. FIG. 16A shows the wavelength of the undulations measured between successive peaks 701g or successive troughs 701h is indicated as "J1". In one embodiment, the wavelength "J1" may be from about _____ up to about _____ when first layer 701 is in the unexpanded condition. It will be understood that the wavelength "J1" may be of a generally constant size across first layer 701, but in other embodiments, the wavelength between adjacent peaks may vary in size across the first layer 701.

Referring again to FIGS. 15 and 16, first layer 701 is capable of being expanded in one or both of a first direction "D1" and in a second direction "D2" parallel to the longitudinal axis "Y". In order to expand the first layer 701 longitudinally in the first direction "D1", the first end 701c of first layer 701 is pulled in the direction "D1". In order to expand the first layer 701 longitudinally in the second direction "D2", the second end 701d of first layer 701 is pulled in the direction "D2". Obviously, if only the first end 701c is to be moved in the first direction "D1", the opposite second end 701d must be held stationary in order for the overall length of the first layer 701 to expand in length. Similarly, if only the second end 701d is to be moved in the second direction "D2", then the opposite first end 701c of first layer 701 must be held stationary to increase the length thereof. Force is required to be applied to one or both of first end 701c and second end 701d in order to move the same in the associated direction "D1" or "D2".

When first layer 701 is expanded in either the first direction "D1" or the second direction "D2", or both of the first and second directions "D1" and "D2", the wavelength between successive peaks 701g or successive troughs 701h in first layer 701 increases from wavelength "J1" (FIG. 16A) to wavelength "J2" in FIG. 16B. As first layer 701 expands, the amplitude of the undulations in first layer 701 decreases in height from the amplitude "H1" (FIG. 16A) to the amplitude "H2" (FIG. 16B). In some instances, first layer 701 may be expanded to a point where the wave-like undulations effectively disappear from first layer 701 and the first layer 701 becomes substantially planar or flat.

Figure 17:
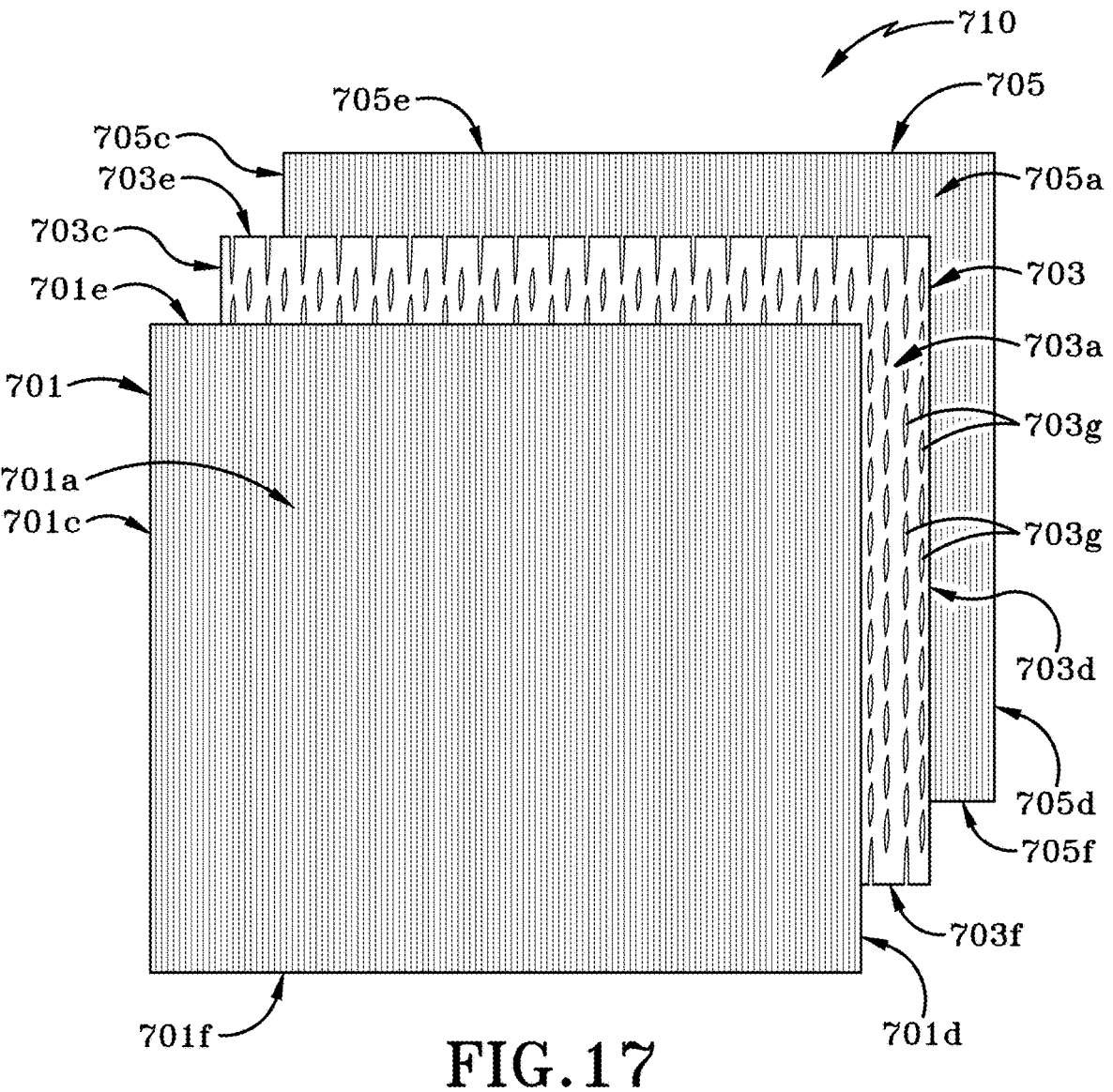
FIG. 17 is a partially exploded top plan view of the packaging material formed from a first layer, a second layer, and a third layer of a sheet material.

FIGS. 17 to 17C show how the three layers 701, 703, 705 of sheet material are assembled with one another to form packaging material 710. The three layers 701, 703, 705 are arranged so that second layer 703 is positioned between first layer 701 and third layer 705 (FIG. 17C). As illustrated, first layer 701, second layer 703, and third layer 705 are all of substantially the same length and width. The first layer 701 and third layer 705 have been discussed above.

Second layer 703 is formed from a sheet material, preferably a paper material, particularly a recyclable paper material. Second layer 703 is of substantially the same constructions as second layer 200 (FIG. 3) described earlier herein. As shown in FIG. 17, second layer 703 has an upper surface 703a and a lower surface 703b (FIG. 19B), a first end 703c, a second end 703d, a first side 703e, and a second side 703f. Although not shown in FIG. 17, it will be understood that second layer 703 has a longitudinal axis, similar to longitudinal axis "Y" of first layer 701, extending between and orthogonal to first end 703c and second end 703d. Second layer 703 also has a lateral axis, similar to lateral axis "X" of first layer 701, extending between and orthogonal to first side 703e and second side 703f of second layer 703.

As is evident from FIG. 17, second layer 703 includes a plurality of slits 703g therein with the slits 703g being cut into the paper material in a pattern. Each slit 703g extends between the upper surface 703a of second layer 703 and the lower surface 703b thereof. The pattern of slits 703g in second layer 703 is substantially identical to the pattern of slits 200g provided in second layer 200 (FIG. 3).

Second layer 703 is selectively expandable longitudinally, i.e., parallel to the longitudinal axis thereof, by pulling first end 703c thereof in a first direction (identical to direction "D1" in FIG. 15), or by pulling second end 703d in a second direction (identical to direction "D2" in FIG. 15), or by pulling each of first and second ends 703c, 703d in the respective first direction "D1" and second direction "D2". When second layer 703 is expanded, the slits 703g open up and form air pockets 703g' (FIG. 21B) within second layer 703 in a substantially identical to the honeycomb pattern of air pockets formed in the expanded second layer 200 (FIGS. 3 and 4). Second layer 703 may be referred to herein as a core layer, cushioning layer, or a cut-patterned layer of packaging material 710.

As indicated earlier herein, third layer 705 is substantially identical to first layer 701. Third layer 705 has an upper surface 705a (FIG. 17) and a lower surface 705b (FIG. 19A), a first end 705c, a second end 705d, a first side 705e, and a second side 705f. Third layer 705 is selectively expandable longitudinally by pulling first end 705c thereof in a first direction (identical to direction "D1" of first layer 701 in FIG. 15), or by pulling second end 705d thereof in a second direction (identical to direction "D2" in FIG. 15), or by pulling each of first and second ends 705c, 705d in the respective first direction "D1" and second direction "D2". When third layer 705 is expanded the amplitude of the undulations therein will decrease in size from an amplitude "H1" to an amplitude "H2" as discussed with respect to first layer 701. Additionally, expansion of third layer 705 will cause the wavelength of the undulations therein to increase from a wavelength "J1" to a wavelength "J2", similar to first layer 701.

When packaging material 710 is assembled, second layer 703 is positioned between first layer 701 and third layer 705 such that upper surface 703a of second layer 703 is adjacent lower surface 701b of first layer 701 and lower surface 703b of second layer 703 is adjacent upper surface 705a of third layer 705. This is shown in FIG. 17. The three layers of the packaging material 710 may be secured to one another in a variety of different ways. FIGS. 18A to 18D show a sample of exemplary ways in which first layer 701, second layer 703, and third layer 705 may be secured to one another to form packaging material 710. In particular, the exemplary ways of securing first layer 701, second layer 703, and third layer 705 together are suitable to ensure that the three layers of packaging material 710 will move from an unexpanded condition to an expanded condition substantially in unison with one another. It will be understood that FIGS. 18A to 18D are by no means exhaustive of the various ways in which the three layers 701, 703, and 705 may be operatively engaged with one another. It will therefore be understood that other securing arrangements might be adopted without departing from the scope and spirit of the present disclosure.

There are a number of different ways in which first layer 701, second layer 703 and third layer 705 are secured to one another. The three layers 701, 703, 705 may be secured to one another by one of continuous application of adhesive and intermittent application of adhesive. The continuous application of adhesive may include application of one or more substantially continuous lines of adhesive being deposited between one of the first and third layers 701, 705 and second layer 703, or between first and third layers 701, 705. The intermittent application of adhesive may include application of a plurality of discrete dots or beads of adhesive being placed at specific intervals apart from one another between one of the first and third layers 701, 705 and second layer 703, or between first and third layers 701, 705. A combination of continuous lines of adhesive and intermittent dots of beads of adhesive may be applied between one of the first and third layers 701, 705 and second layer 703, or between first and third layers 701, 705. The lines of adhesive and/or dots or beads of adhesive may be provided in any location or in pattern between any selected two of the three layers. The adhesive is applied in such a way that it is possible for the layers of the packaging material to be moved from an unexpanded condition to an expanded condition in unison. The type of adhesive applied between any of the two layers of packaging material 710 may be of any suitable type including but not limited to adhesives which react to one or both of heat and pressure.

Figure 18A:
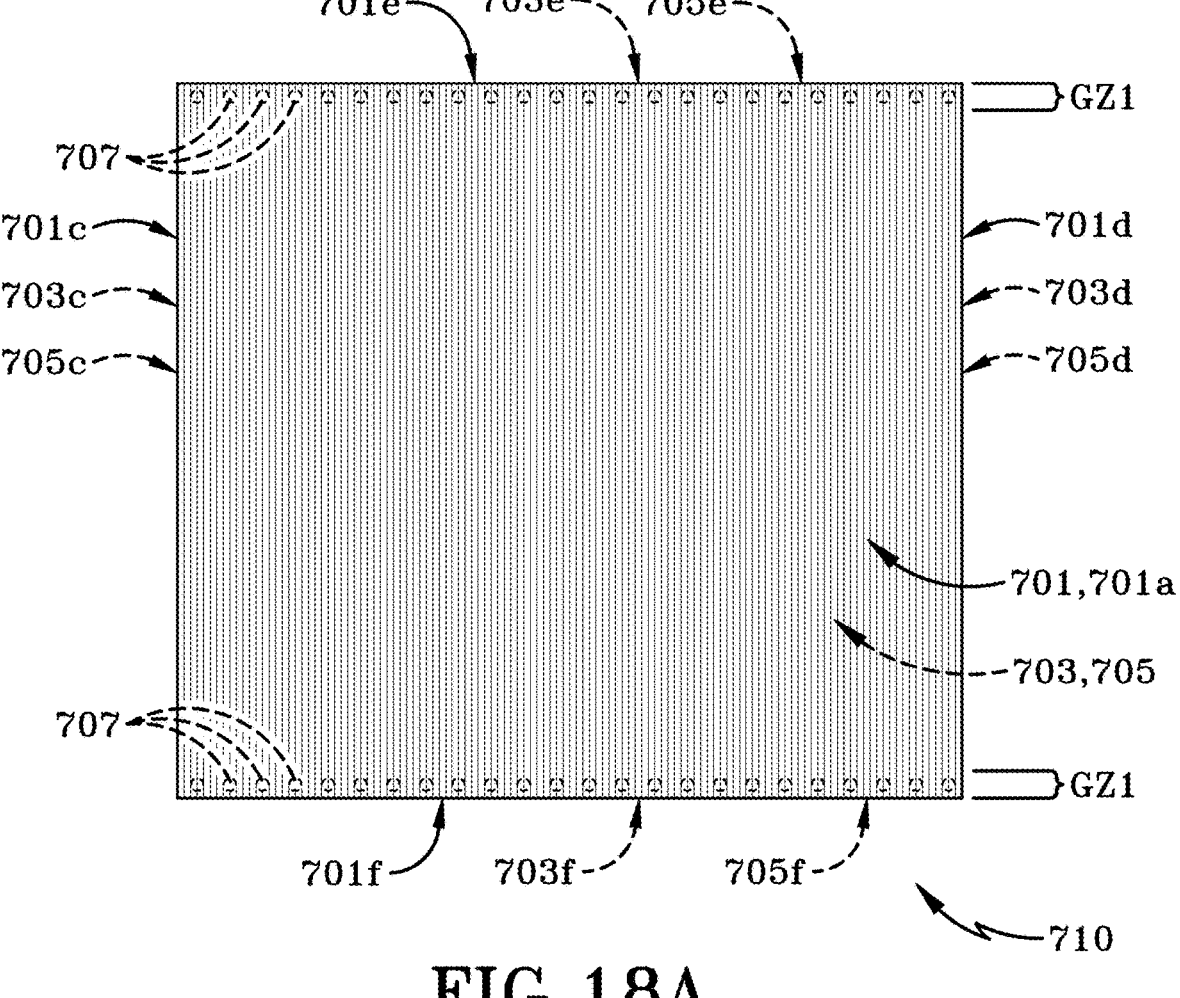
FIG. 18A is a top plan view of the packaging material in accordance with the present disclosure shown in an unexpanded condition and showing a first exemplary manner of securing the layers of the packaging material to one another.

FIG. 18A shows a first exemplary manner of applying adhesive to the layers 701, 703, 705 to form packaging material 710. FIG. 18A shows a first glue zones "GZ1" a short distance inwardly from each of the first side 701e and second side 701f of first layer 701. The first glue zones "GZ1" includes a plurality dots of adhesive 707 which are applied at regular intervals from one another and arranged substantially parallel to the first and second sides 701e, 701f of first layer 701. The first glue zones "GZ1" also include substantially continuous lines of adhesive 709 provided between the row of adhesive dots 707 and the associated first or second side 701e, 701f of first layer 701.

Figure 18B:
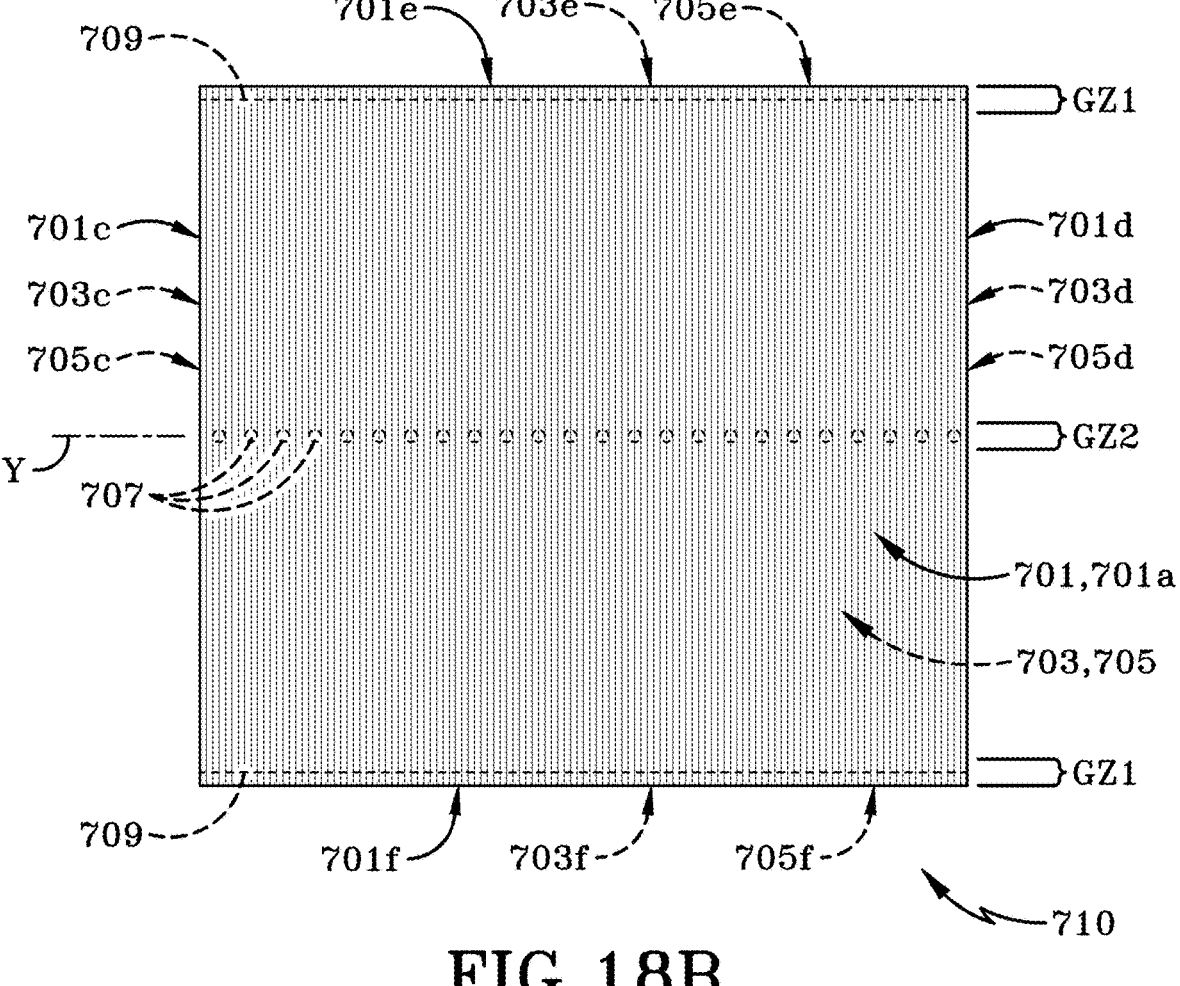
FIG. 18B is a top plan view of the packaging material in accordance with the present disclosure shown in an unexpanded condition and showing a second exemplary manner of securing the layers of the packaging material to one another.

FIG. 18B shows a second exemplary manner of applying adhesive to the layers 701, 703, 705 to form packaging material 710. FIG. 18B shows a first glue zone "GZ1" a short distance inwardly from each of the first side 701e and second side 701f of first layer 701 and a second glue zone "GZ2" extending along an imaginary centerline of the packaging material 710. The imaginary centerline is oriented substantially parallel to the longitudinal axis "Y" of first layer 701. In this example, the first glue zone "GZ1" only includes substantially continuous lines of adhesive 709 a distance inwardly from the associated first or second side 701e, 701f of first layer 701. The second glue zone "GZ2" includes two rows of adhesive dots 707 arranged parallel to one another and spaced a short distance laterally from one another. It will be understood that one or both rows of adhesive dots 707 in the second glue zone "GZ2" may be replaced with continuous lines of adhesive 709. It will further be understood that the continuous lines of adhesive 709 in the first glue zones "GZ1" may be replaced with one or more rows of adhesive dots 707.

Figure 18C:
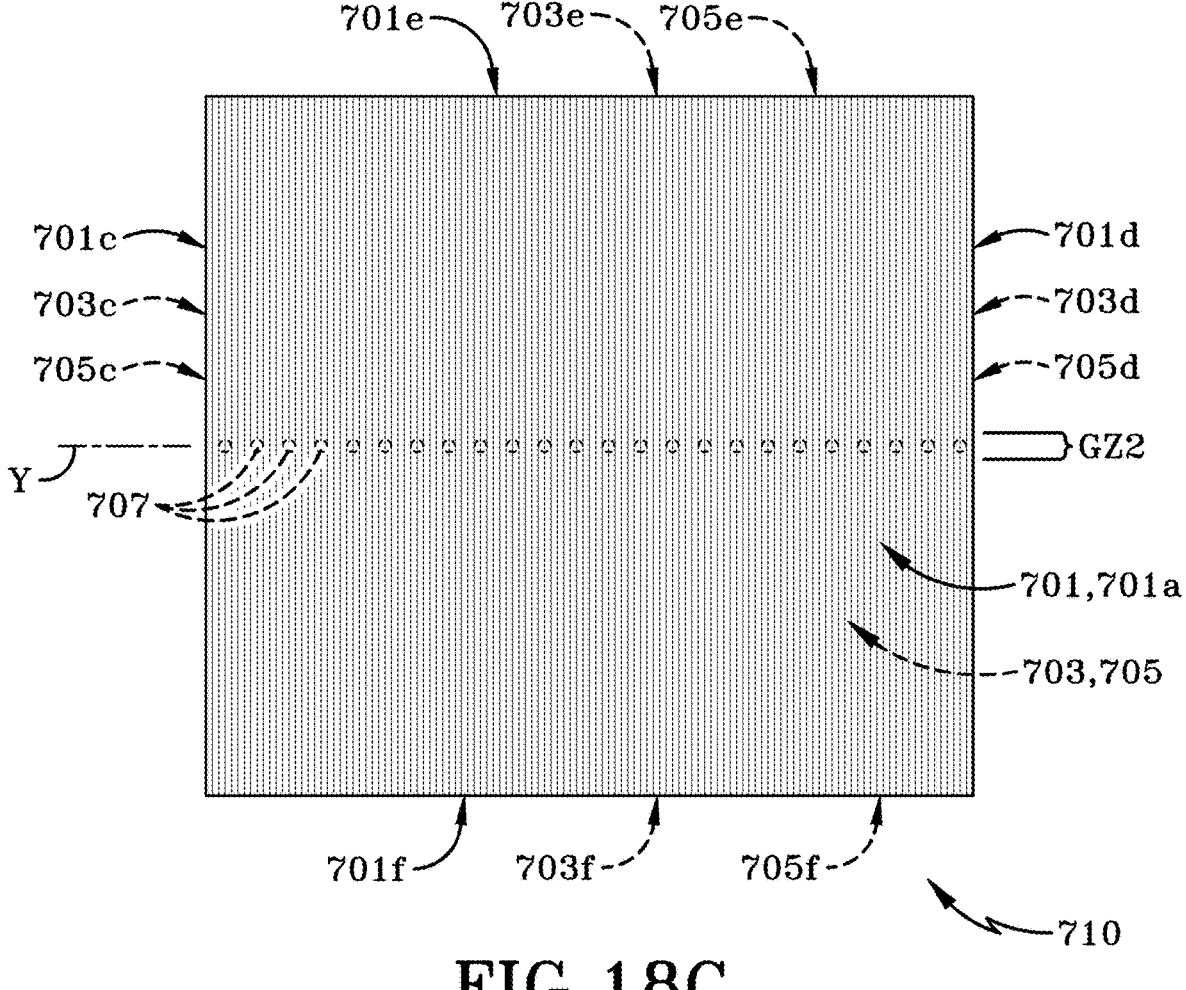
FIG. 18C is a top plan view of the packaging material in accordance with the present disclosure shown in an unexpanded condition and showing a third exemplary manner of securing the layers of the packaging material to one another.

FIG. 18C shows a third exemplary manner of applying adhesive to the layers 701, 703, 705 to form packaging material 710. FIG. 18C shows a second glue zone "GZ2" extending along a midline of the packaging material 710. In this example, the second glue zone "GZ2" includes two rows of adhesive dots 707 arranged parallel to one another and spaced a short distance laterally from one another. There are no glue zones proximate the first and second sides 701e, 701f of the first layer 701. It will be understood that one or both rows of adhesive dots 707 in the second glue zone "GZ2" may be replaced with continuous lines of adhesive 709.

Figure 18D:
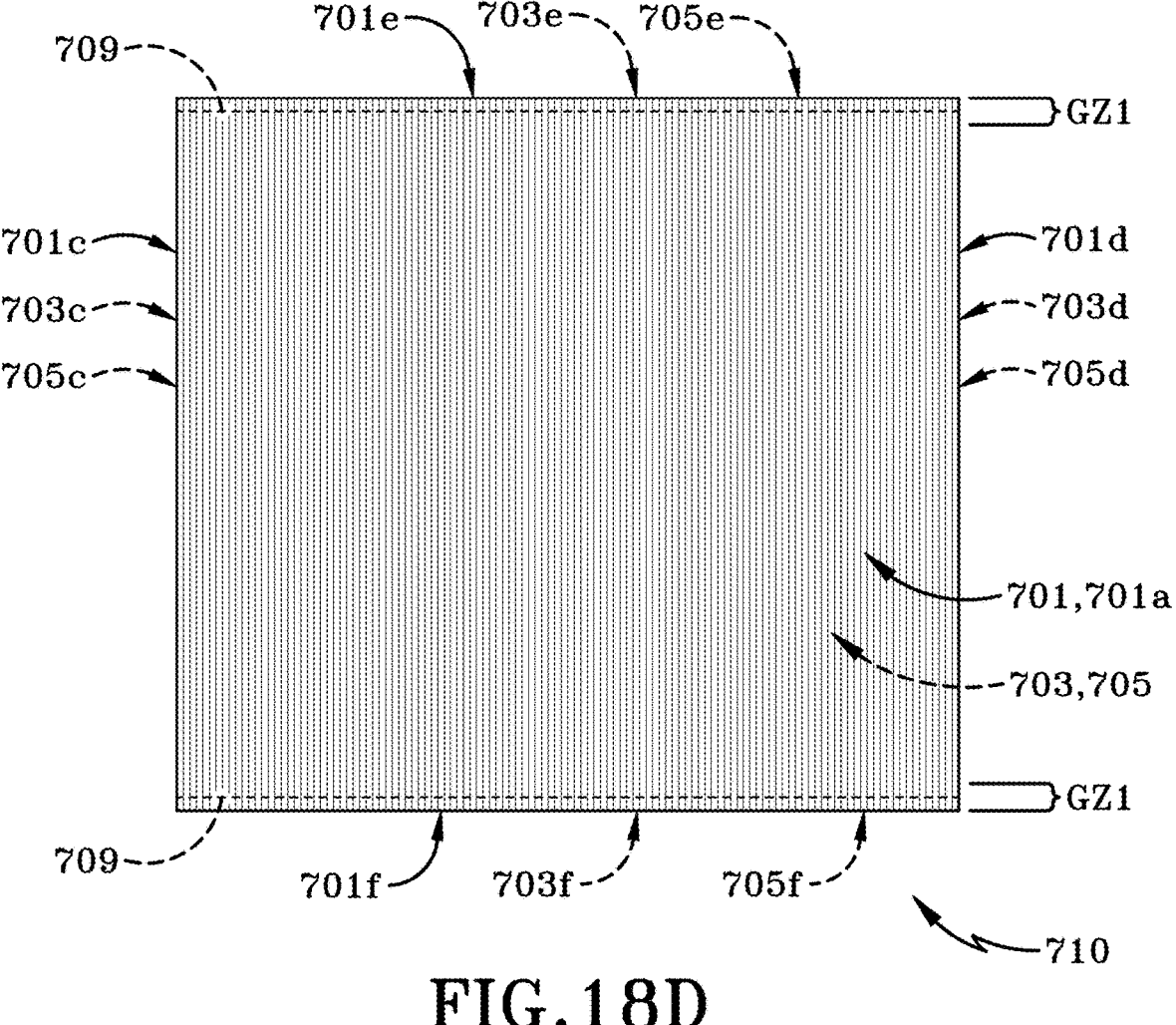
FIG. 18D is a fragmentary top plan view of the packaging material in accordance with the present disclosure shown in an unexpanded condition and showing a first exemplary manner of securing the layers of the packaging material to one another.

FIG. 18D shows a fourth exemplary manner of applying adhesive to the layers 701, 703, 705 to form packaging material 710. FIG. 18D shows a first glue zone "GZ1" a short distance inwardly from each of the first side 701e and second side 701f of first layer 701. In this example, the first glue zone "GZ1" only includes substantially continuous lines of adhesive 709 a distance inwardly from the associated first or second side 701e, 701f of first layer 701. There is no second glue zone located along the midline of the first layer 701. It will be understood that the continuous lines of adhesive 709 in the first glue zones "GZ1" may be replaced with one or more rows of adhesive dots 707.

Figures 19A, 19B, 19C:
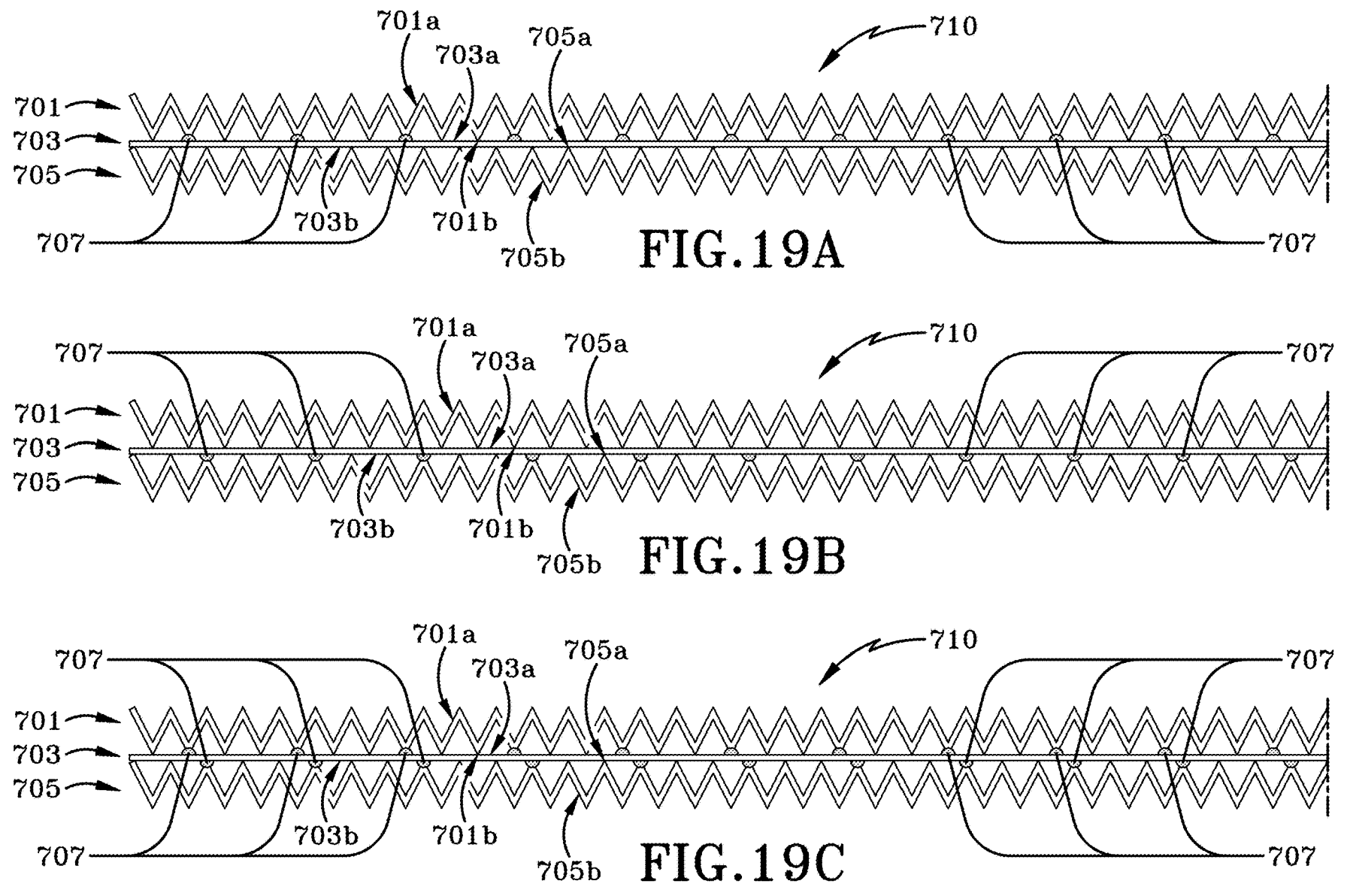

FIGS. 19A to 19C show different examples of how adhesive dots 707 may be applied between the layers 701, 703, 705 of packaging material 710. FIG. 19A shows that adhesive dots 707 may be applied at intervals between a lower surface 701b of first layer 701 and an upper surface 703a of second layer 703. FIG. 19B shows that adhesive dots 707 may be applied at intervals between a lower surface 703b of second layer 703 and an upper surface 705a of third layer 705. FIG. 19C shows that adhesive dots 707 may be applied at intervals between a lower surface 701b of first layer 701 and an upper surface 703a of second layer 703 and between a lower surface 703b of second layer 703 and an upper surface 705a of third layer 705. The adhesive dots 707 between first layer 701 and second layer 703 are longitudinally offset relative to the adhesive dots 707 between second layer 703 and third layer 705. In other embodiments not illustrated herein, the adhesive dots 707 between first layer 701 and second layer 703 will not be longitudinally offset relative to the adhesive dots between second layer 703 and third layer 705.

It should be understood that the lines of adhesive 709 may be applied between the various layers in much the same way as is illustrated in FIGS. 19A to 19C. For example, one or more lines of adhesive 709 may be applied between first layer 701 and second layer 703, or between second layer 703 and third layer 705, or between first layer and second layer 703 and between second layer 703 and third layer 705.

It will also be understood that in certain instances the second layer 703 may not extend for the entire lateral distance between first side 701*e* of first layer 701 and second side 701*f*. In these embodiments, lines of adhesive 709 and/or adhesive dots 707 may be applied between first layer 701 and third layer 705.

Figure 20A:
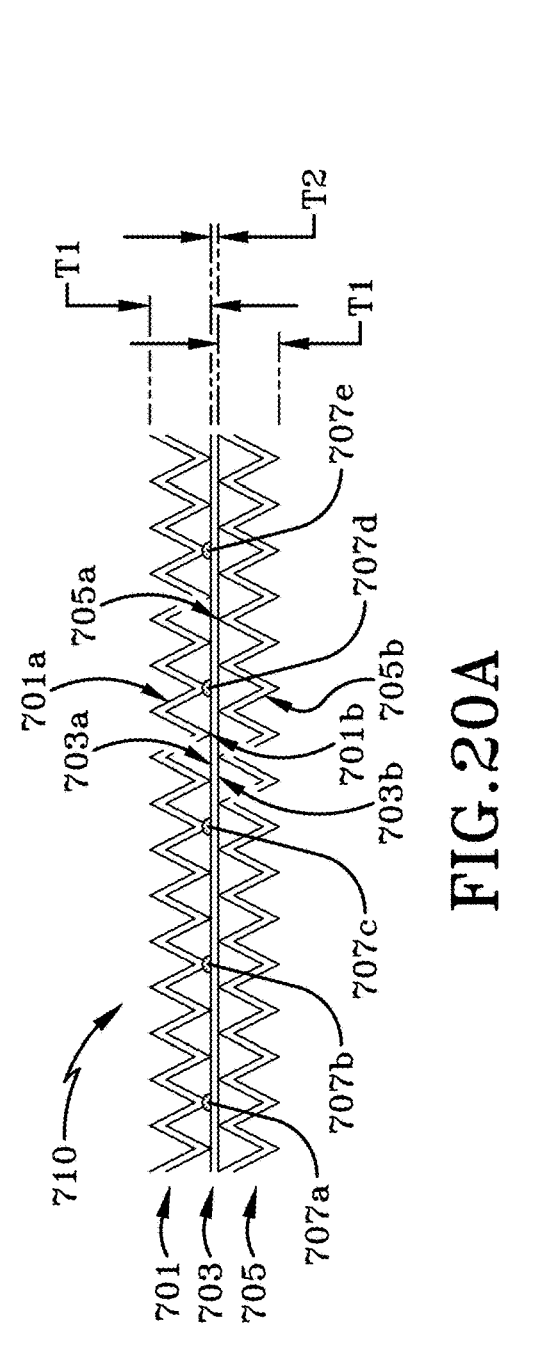
FIG. 20A is an enlarged diagrammatic side elevation view of the packaging material with the first and second layers secured to one another and the packaging material being in an unexpanded condition.
Figure 20B:
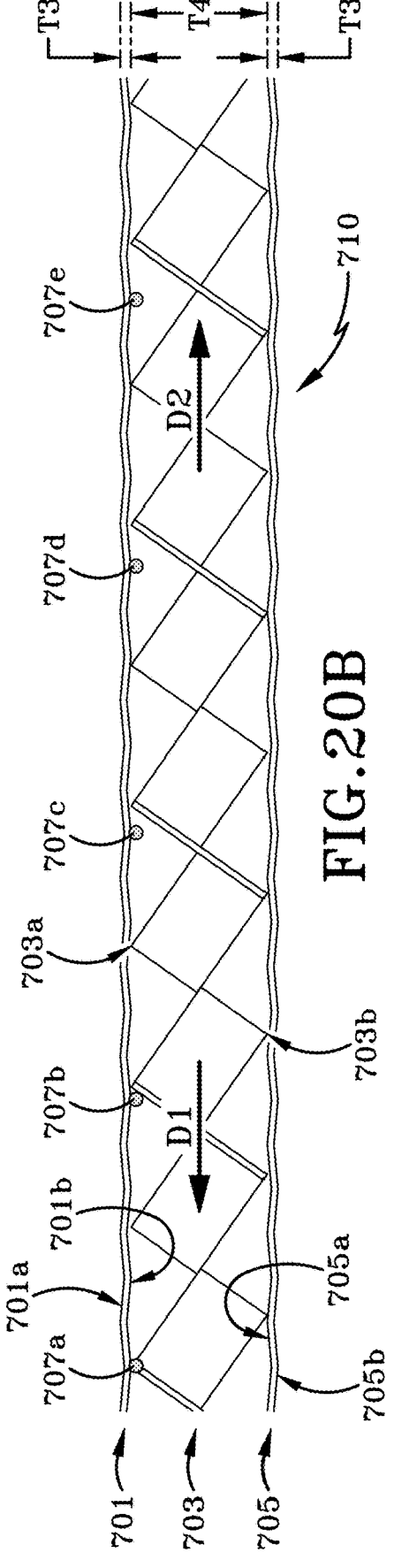
FIG. 20B is an enlarged diagrammatic side elevation view of the packaging material with the first and second layers secured to one another and the packaging material being in an expanded condition.

FIGS. 20A and 20B show what happens to the adhesive dots 707 provided between first layer 701 and second layer 703 when packaging material 701 is moved from the unexpanded condition (FIG. 20A) to the expanded condition (FIG. 20B). FIG. 20A shows that in the unexpanded condition, first layer 701 includes the plurality of undulations described earlier herein and the first layer 701 is of a first thickness "T1" measured between the upper surface 701*a* taken at a peak of the undulations and the lower surface 701*b* taken at a valley of the undulations. Similarly, third layer 705 includes the plurality of undulations described earlier herein and the third layer 705 is also of a first thickness "T1". The first thickness "T1" of third layer 705 is measured between the upper surface 705*a* taken at a peak of the undulations and the lower surface 705*b* taken at a valley of the undulations. Second layer 702 is of a second thickness "T2" measured between the upper and lower surfaces thereof. A plurality of adhesive dots is applied between the upper surface of second layer 703 and the lower surface 70*b* of every third valley of first layer 701. The figure shows adhesive dots 707*a*, 707*b*, 707*c*, 707*d*, and 707*e* connecting first layer 701 and second layer 703 to one another.

FIG. 20B shows packaging material 710 expanded in the direction "D1" and in the direction "D2". The expansion causes the amplitude of the undulations in first layer 701 and third layer 705 to decrease and simultaneously causes the wavelength of those undulations to increase. The end result is that the overall thickness of each of the first layer 701 and third layer 705 decreases from the first thickness "T1" to the third thickness "T3". As the packaging material 710 expands, the slits in the second layer 703 open up to create the honeycomb pattern and the second layer expands in the "Z" direction, i.e., vertically with respect to the orientation of FIG. 20B. As a consequence, the thickness of second layer 703 increases from the second thickness "T2" to the fourth thickness "T4". The pattern of slits 703*g* in second layer 703 is such that when second layer 703 is moved from the contracted or unexpanded condition (shown in FIGS. 20A and 21A) to an expanded condition (shown in FIGS. 20B and 21B), second layer 703 forms a honeycomb-like configuration as the slits 703*g* open and expand. This has previously been described herein with respect to the second layer 200 shown in FIGS. 1-5. As with the previous embodiments of packaging material described herein, once packaging material 710 is moved to the expanded condition, second layer 703 provides the benefit of creating structural strength in packaging material 710. The expanded second layer 703 gives packaging material 710 a degree of resistance against being crushed, thereby enabling a packaging enclosure made from packaging material 710 to better withstand impact forces typically experienced during mailing and delivery of packaging enclosures.

FIG. 20B also shows that some of the adhesive dots maintain the connection between first layer 701 and second layer 703. For example, adhesive dot 707*a* remains fully connected to each of first layer 701 and second layer 703. Adhesive dot 707*b* is partially connected to each of first layer 701 and second layer 703. The adhesive dots 707*c*, 707*d*, and 707*e* only adhere to lower surface 701*b* of first layer 701. The purpose of the adhesive dots 707*a* through 707*e* is to help ensure the layers of the packaging material 710 move in unison between an unexpanded condition and an expanded condition. It is not necessary for the adhesive dots to all maintain their connection with both of the first layer 701 and second layer 703 because after expansion, heat and pressure will be applied to the margins of the various layers to retain the packaging material 710 in the expanded condition. This will be explained later herein.

It should be noted in FIGS. 20A and 20B that there is no adhesive connection between second layer 703 and third layer 705. Although not illustrated in these figures, there may be adhesive connection directly between first layer 701 and third layer 705 (particularly along first and second sides 701*e*, 705*e* and 701*f*, 705*f*). When packaging material 701 is moved to the expanded condition in the directions "D1" and "D2", first layer 701 and third layer 705 will move in unison with one another to the expanded condition and first layer 701 and second layer 703 will move in unison with one another, but second layer 703 will "float" relative to third layer 705.

Figure 21A:
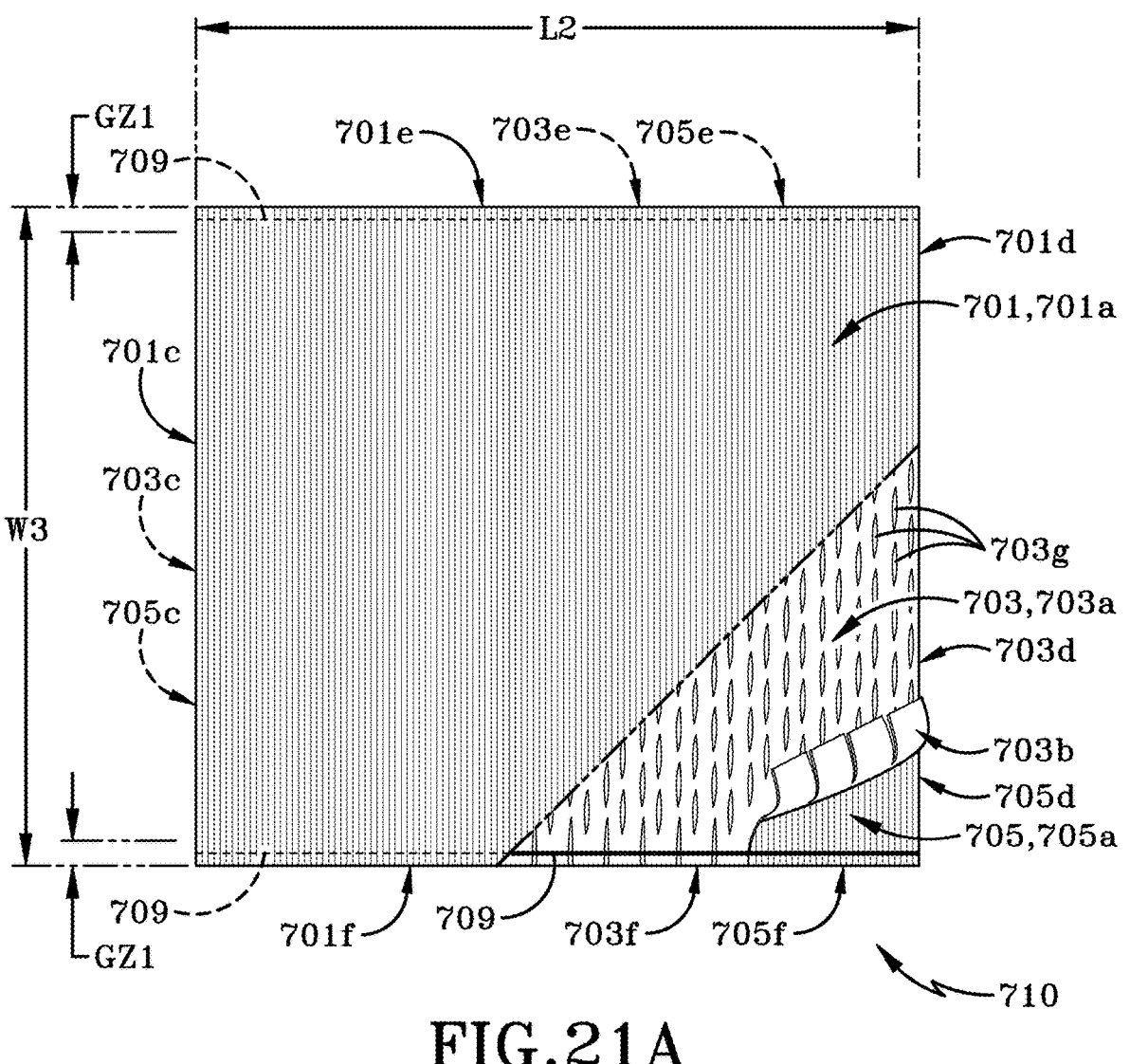
FIG. 21A is a partially fragmented top plan view of the packaging material shown in a unexpanded condition.
Figure 21B:
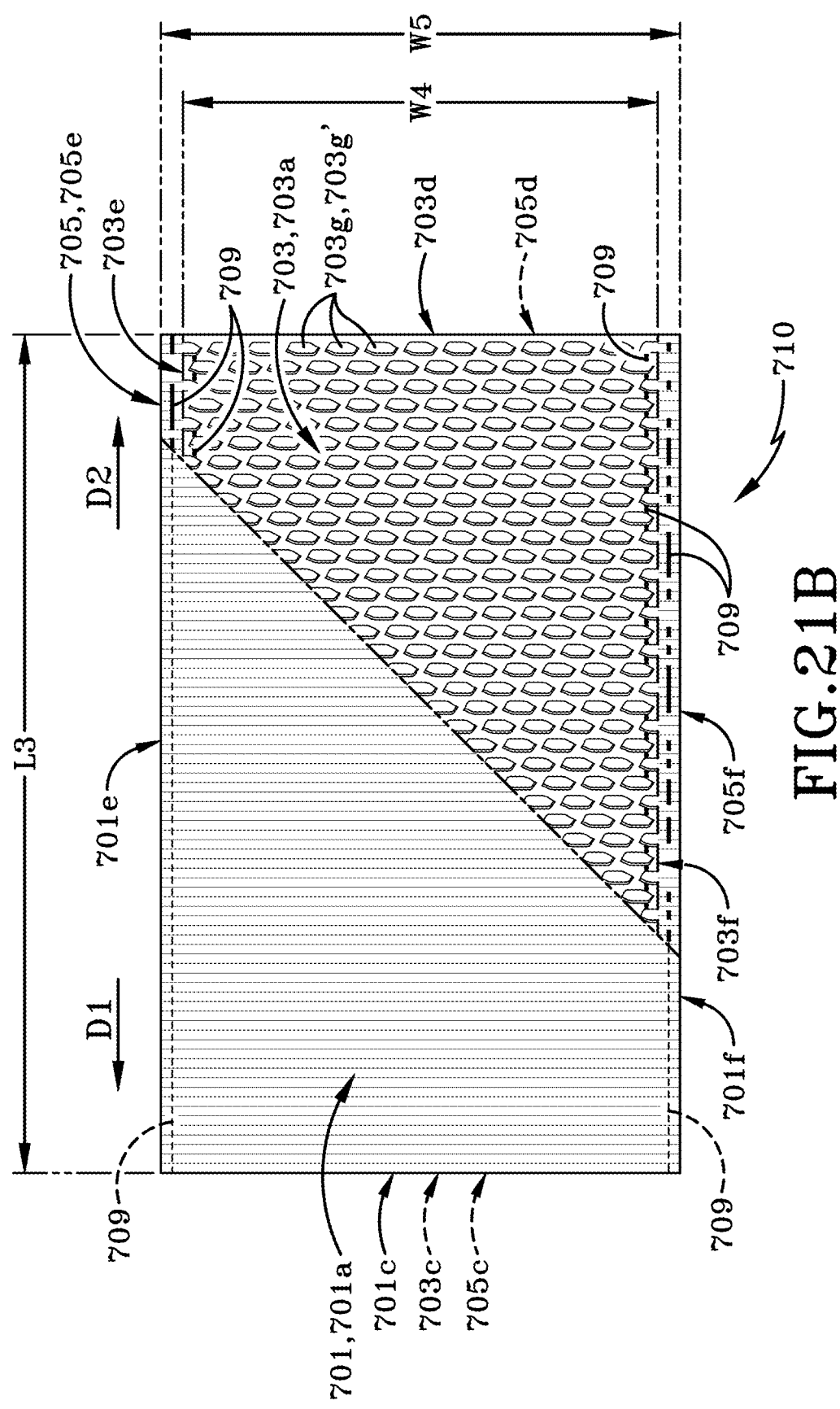
FIG. 21B is a partially fragmented top plan view of the packaging material of FIG. 21a shown in an expanded condition.

FIGS. 21A and 21B show the packaging material in the unexpanded condition (FIG. 21A) and in the expanded condition (FIG. 21B). In the unexpanded condition the first layer 701, second layer 703, and third 705 are adhered to one another along a first glue zone "GZ1". A first glue line 709 secures first layer 701 and third layer 705 to one another. A second glue line secures first layer 701, second layer 703, and third layer 705 to one another. In this view, the second layer of the packaging material 710 terminate a short distance inwardly away from each of the first side 701*e* and second side 701*f* of first layer 701. As a result, the width of first layer 701 and third layer 705 is indicated as width "W3" and the width of second layer 703 is indicated as width "W4". The length of the packaging material 710 is indicated as length "L2".

FIG. 21B shows that packaging material 710 has been expanded by applying force sufficient to pull opposing ends thereof in the directions "D1" and "D2". The overall length of the packaging material 710 has increased from length "L2" to length "L3". As the various layers expand to the new length "L3", the overall width of each of the layers 701, 703, 705 shrinks. In particular, the overall width of the packaging material 710 shrinks from width "W3" to width "W5". As the various layers 701, 703, 705 shrink, some of the adhesive in the adhesive lines 709 in first glue zone "GZ1" will maintain contact between the associated first and third layers 701, 705 and/or between first and second layers 701, 703 and/or between second and third layers 703, 705. Other parts of the adhesive lines 709 will break as the width of the packaging material 710 shrinks.

Figure 23:
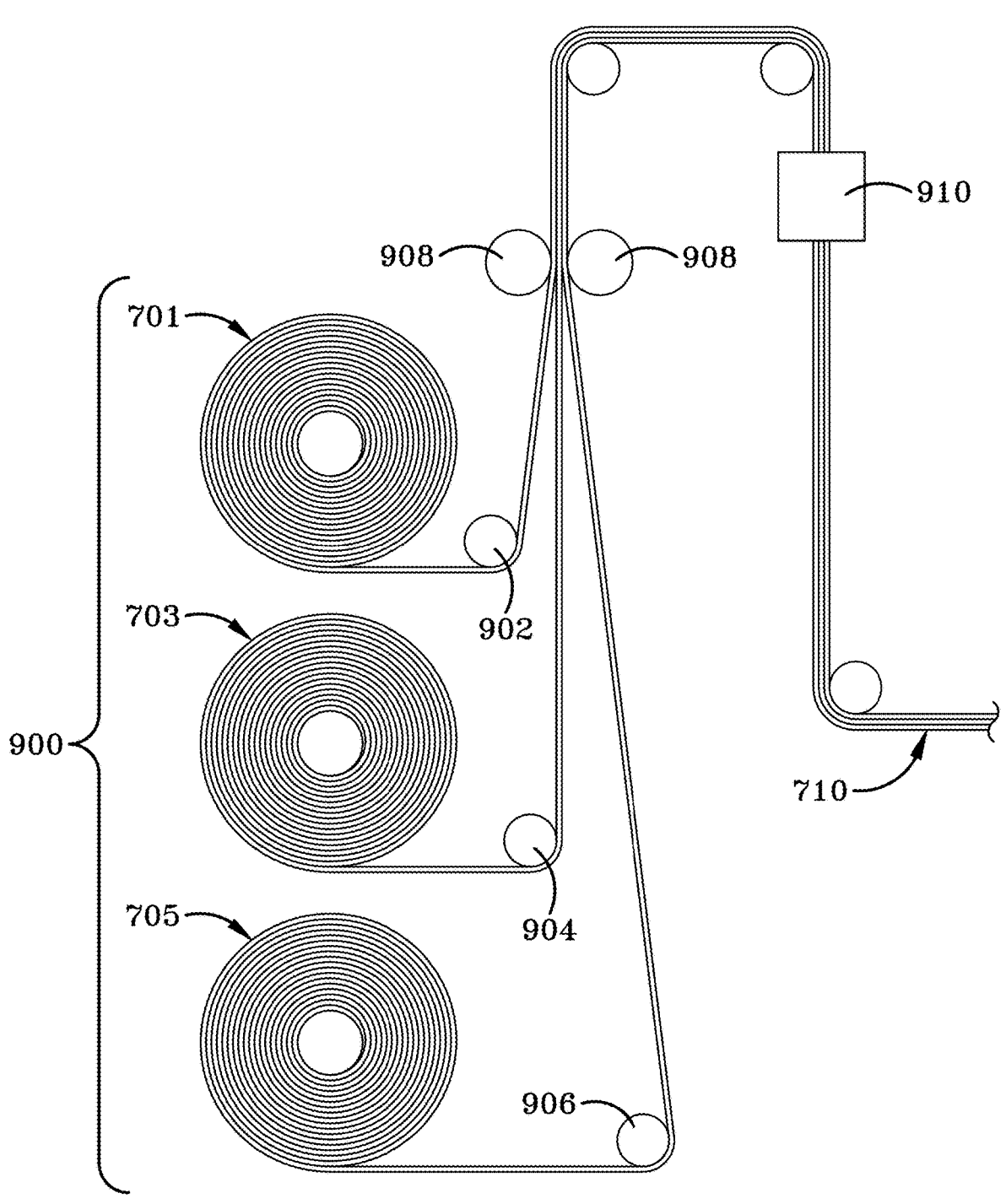
FIG. 23 illustrates an exemplary manufacturing apparatus for the fifth embodiment packaging material in accordance with an aspect of the present disclosure.
Figure 25:
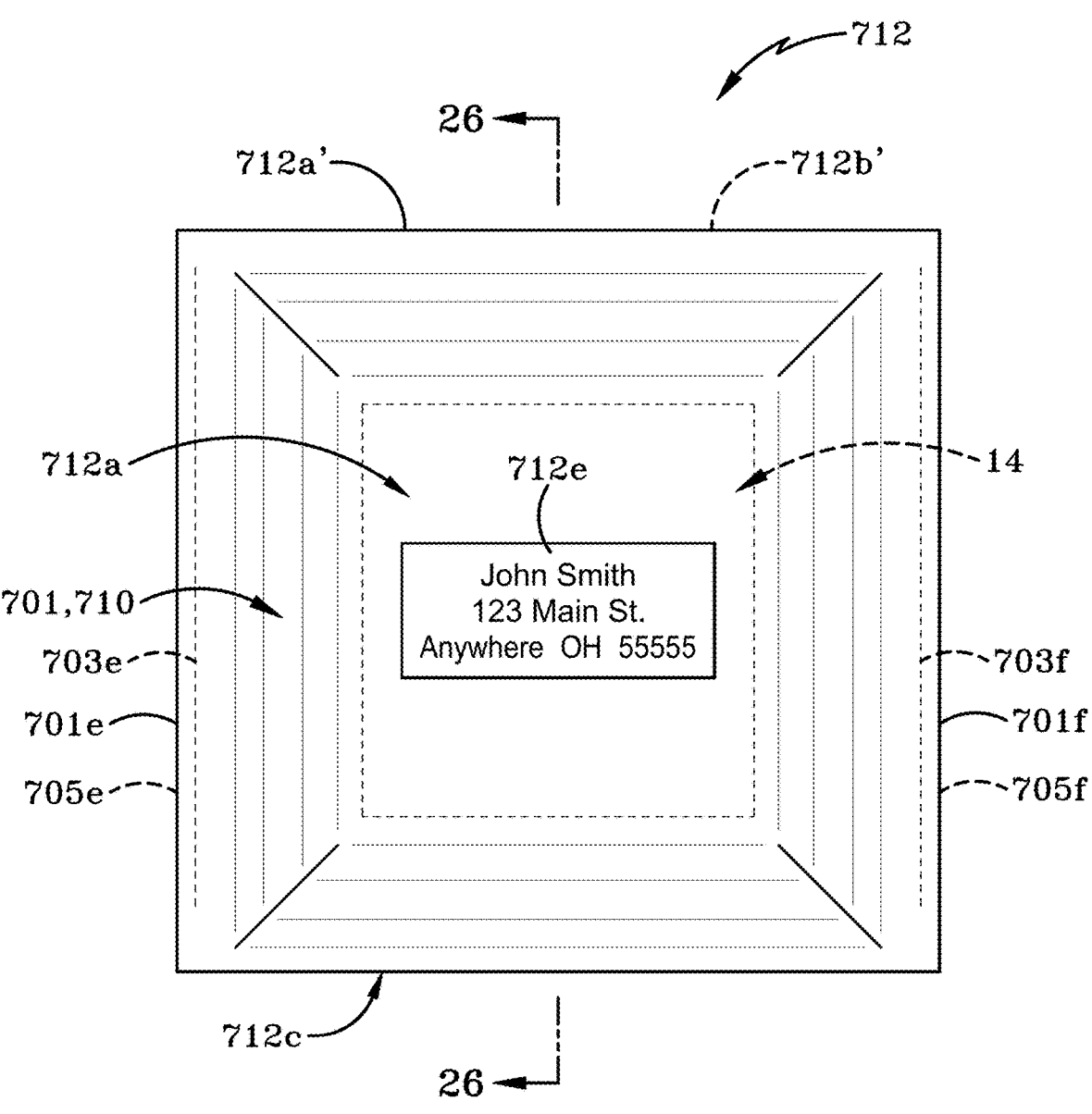
FIG. 25 is a diagrammatic front elevation view of a packaging enclosure made with the packaging material of FIGS. 17 to 21 and in accordance with the present disclosure.

FIGS. 22 and 23 depict an exemplary method (FIG. 22) and exemplary apparatus (FIG. 23) for implementing manufacture of packaging material 710 in accordance with one or more aspects of the present disclosure. The method and apparatus uses first layer 701, second layer 703, and third layer 705 to form packaging material 710 which is subsequently used to form a packaging enclosure 712 (FIG. 25). The exemplary method illustrated in FIG. 22 is generally indicated as method 800. The exemplary apparatus for performing the method 800 is illustrated in FIG. 23 and is generally indicated as apparatus 900.

It will be understood that in some instances, packaging material 710 may be produced and then rolled into a roll. During fabrication of the packaging enclosure 712, which will be described layer herein, a length of the packaging material 710 will be withdrawn from the roll of packaging material and then be manipulated to create the packaging enclosure 712 around a product 14 (FIGS. 21 to 23). In other instances, the packaging material 710 may be formed at one end of an assembly line in which packaging enclosure 712 is being produced. In other words, the packaging material 710 is formed by coupling the first layer 701, second layer 703, and third layer 705 and is then not rolled up into a roll but is instead fed directly into equipment for forming the packaging enclosure 712.

At 802 of the method 800 illustrated in FIGS. 22 and 23, a product is received and utilized as the first substrate of the packaging material 710. In one embodiment, the product to be used as the first substrate layer is first layer 701. Alternatively the product to be used as the first substrate layer is third layer 705. In either instance, the first substrate layer is a paper-based product, particularly a recyclable paper-based product, in accordance with an aspect of the present disclosure. In either instance, the first layer 701 (or third layer 705) is one of a crepe paper, a crinkled paper, a crimped paper, a corrugated paper, or any other type of paper which has a plurality of undulations formed therein, particularly relatively small undulations. Furthermore, the first substrate layer 701 or 705 is of a configuration which is selectively movable from an unexpanded or contracted condition to an expanded condition.

At 804, the method 800 further includes receiving a product configured to be a cut-patterned layer of the packaging material 710. The cut-patterned layer comprises a paper-based product, particularly a recyclable paper-based product in accordance with one aspect of the present disclosure. In one aspect, the paper-based product is a kraft paper or a corrugated paper. At 806 of method 800, sections of the paper-based product are removed therefrom or cuts are made in the paper-based product to form a plurality of slits 703g therein and thereby producing the cut-patterned layer. The cut-patterned layer comprises a second layer 703 for incorporation into packaging material 710. It will be understood that in other embodiments the step 806 may be omitted from the method and the cut-patterned layer or second layer 703 received in step 804 may be pre-processed by cutting slits 703g in kraft paper or corrugate and then introducing that pre-processed layer into the exemplary apparatus 900 in order to couple the second layer 703 to the substrate layer 701 or 705.

At 808 in FIG. 22, a product is received to be utilized as a second substrate layer of the packaging material 710. The product to be used as the second substrate layer is the other of first layer 701 and third layer 705 which is not received in step 802 as the first substrate layer. The second substrate layer is a paper-based product, particularly a recyclable paper-based product, in accordance with an aspect of the present disclosure. The other of the first layer 701 and third layer 705 to be used as the second substrate is one of a crepe paper, a crinkled paper, a crimped paper, a corrugated paper, or any other type of paper which has undulations formed therein and is selectively expandable. In one embodiment, the first substrate layer and the second substrate layer are of substantially identical materials construction.

At 810 in FIG. 22, the method includes coupling or bonding the cut-patterned layer to one or both of the first substrate layer and the second substrate layer. In other words, the method includes coupling the second layer 703 to one or both of first layer 701 and third layer 705. This can be done by applying an adhesive between the second layer 703 and one or both of first layer 701 and third layer 705. As discussed earlier herein, the adhesive may be applied in substantially continuous lines or discrete dots, or in any other suitable and desired pattern of adhesive application. Additionally, as discussed earlier herein, the adhesive may be applied in any desired manner and at any desired location between the layers being bonded. For example, the adhesive may be applied as discrete dots 707 along a central glue zone "GZ2" or as lines 709 applied proximate first or second ends 701e, 703e, 705e, or 701f, 703f, 705f in glue zone "GZ1". The adhesive is applied to enable the coupled or bonded layers to be movable in unison from a contracted condition to an expanded condition.

At 812, the method optionally includes coupling or bonding the first substrate layer and the second substrate layer to one another and capturing the cut-patterned layer therebetween. In other words, at 812, the method optionally includes coupling the first layer 701 and third layer 705 to one another and capturing the second layer 703 therebetween. For example, the side regions of first layer 701 and third layer 705 may extend laterally outwardly beyond the first end 703e and second end 703f of second layer 703. The side regions of first layer 701 and third layer 703 may be secured together through periodic adhesive application in the side regions. The adhesive used for bonding the side regions and free ends of first layer 701 and third layer 705 to one another to form packaging material 710 therewith may be any suitable adhesive. In one embodiment, one or both of first layer 701 and third layer 705 include an adhesive coating thereon which may be a water-based, heat activated adhesive. This coating is used to operatively engage at least the first layer 701 and 705 to one another. While second layer 703 is captured between first layer 701 and third layer 705, the second layer 703 may only be physically secured to one of these first layer 701 and third layer 705 and therefore may "float" relative to the other of the first layer 701 and third layer 705 as the packaging material 710 is moved from a collapsed or contracted condition to an expanded condition.

FIG. 23 illustrates an apparatus 900 that may be utilized to perform the method 800 depicted in FIG. 22. Each of the first layer 701, second layer 703, and third layer 705 is provided as a roll of paper material of the nature and configuration described previously herein. A length of each of the first layer 701, second layer 703, and third layer 705 is unrolled from the respective roll, passes around an associated roller 902, 904, 906, and the lengths of the three layers are aligned with one another, and are then passed between a pair of rollers 908. Although not illustrated in FIG. 23, it will be understood that prior to the three layers passing through rollers 908 the various layers 701, 703, 705 are coupled or bonded together as previously discussed herein. Bonding may be accomplished through the application of adhesives which may be heat and/or pressure sensitive, or by utilizing any other mechanism or substance. For example, an adhesive may be applied between a region of first layer 701 and a region of second layer 703 (or between a region of second layer 703 and a region of third layer 705). Additionally, an adhesive may be applied between regions of first layer 701 and third layer 705.

Applying adhesives as determined and then passing the lengths of the layers 701, 703, 705 through at least rollers 908 and any other needed processes will bond first, second, and third layers to one another as previously described in method 800. For example, the adhesive used to bond first layer 701 and second layer 703 to one another may be a heat-activated adhesive. If this is the case, the aligned layers 701, 703, 705 may be fed through a heating component 910 of the apparatus 900 to activate said adhesive to bond the three layers as earlier described so as to form packaging material 710. The packaging material 710 is subsequently rolled up onto another roll and then be shipped to facilities for making packaging enclosures or to warehouse facilities which ship product therefrom. Alternatively, instead of shipping rolls of packaging material to a remote facility, the packaging material 710 may be fabricated in real time in a facility which ships high volumes of product, for example. It will be understood that various steps 802 through 812 of method 800 may be performed in a different order. If this is the case then the apparatus 900 may be differently arranged to suit the order of the method steps 802 through 812.

Figure 24:
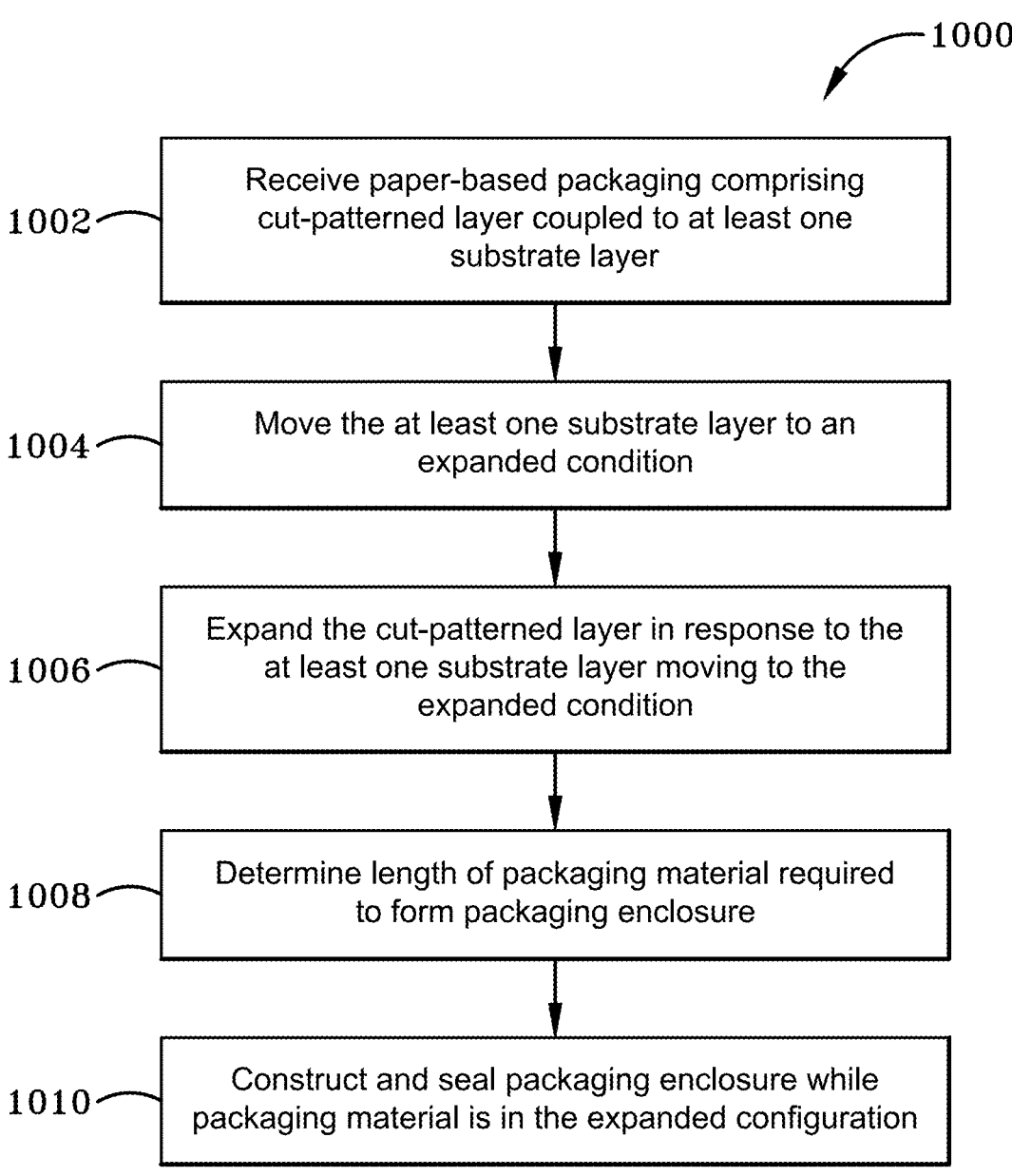
FIG. 24 depicts an exemplary method for creating a packaging enclosure with the fifth embodiment packaging material in accordance with the present disclosure.
Figure 26:
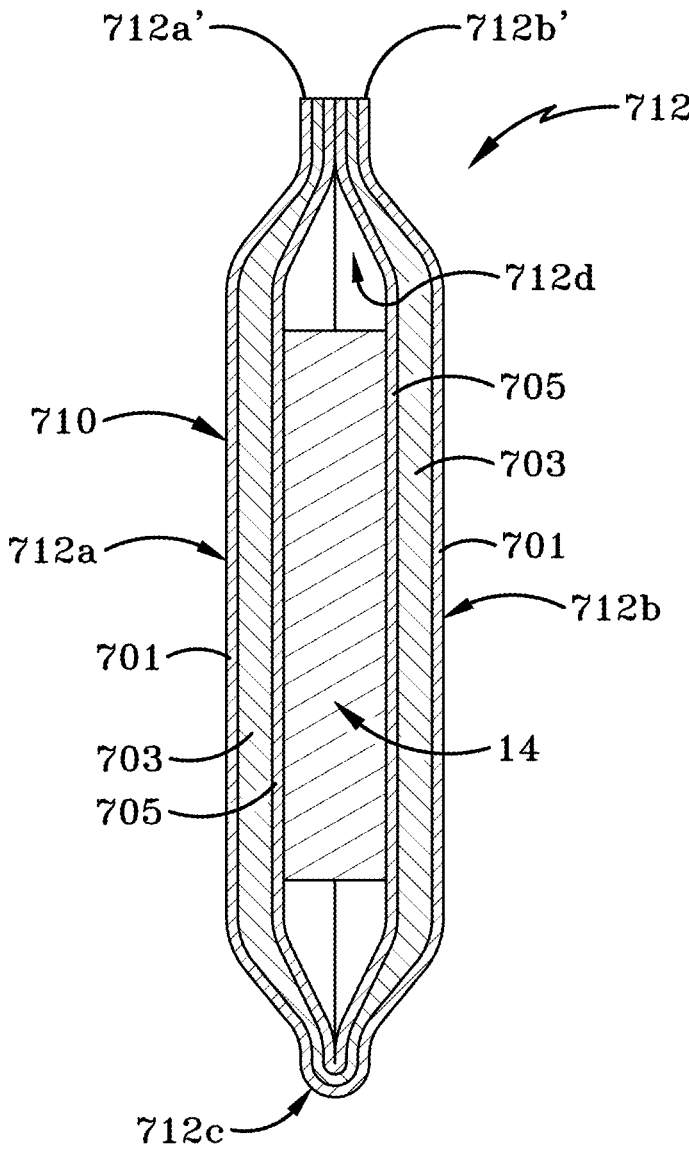
FIG. 26 is a vertical cross-section through the packaging enclosure taken along line 26-26 of FIG. 25.

FIGS. 24 to 26 depict a method 1000 for forming an exemplary packaging enclosure 712 from the packaging material 710. Method 1000 may be implemented by an apparatus (not shown) which provides customized sizing for packaging enclosures 712 formed from packaging material 710. The packaging enclosure 712 is customized in shape and size to receive and protect any desired item, object, or article therein.

In step 1002 of method 1000, the packaging material 710 with the cut-patterned layer 703 coupled or bonded to at least one of the first and second substrate layers 701, 705 is received for forming the packaging enclosure 712 therewith. The packaging material 710 may be provided on as a roll of material wound around a core (not shown) or the layers which comprise packaging material 710 may be coupled or bonded to one another immediately prior to the fabrication of the packaging enclosure 712 such as by apparatus 900.

At 1004 in method 1000, force is applied to packaging material 710 to move the packaging material from a contracted condition to an expanded condition. Method step 1004 may therefore involve force being applied to one or both of the first substrate layer 701 and second substrate layer 705 is stretched or expanded longitudinally. Method step 1004 may alternatively involve applying force to a region of packaging material 710, i.e., to the bonded first, second, and third layers 701, 703, 705. For example, force may be applied by a piece of machinery to first layer 701 or third layer 705 to move the same in the first direction "D1" (FIG. 21B) and/or in the second direction "D2". Alternatively, force may be applied simultaneous to first, second and third layers 701, 703, 705 or to any one or more layers to move the same in one or both directions "D1" and "D2".

The movement in one or both directions "D1", "D2" causes packaging material 710 to expand longitudinally, i.e., parallel to longitudinal axis "Y" (FIG. 15) to an expanded condition. The stretching or expansion of the first layer 701 and third layer 705 from a contracted condition to an expanded condition is illustrated in FIGS. 20A and 20B and in FIGS. 21A and 21B. The longitudinal expansion of packaging material 710 results in a decrease in an amplitude of one or more undulations of each of the first layer 701 and third layer 705 and an increase in a wavelength of those undulations. The decrease in the amplitude of the undulations from "H1" to "H2" and the increase in the wavelength from "J1" to "J2" is illustrated in FIGS. 16A and 16B. The longitudinal expansion of packaging material 710 also results in a decrease in a thickness of first layer 701 and third layer 705. The decrease in thickness from a thickness "T1" to a thickness "T3" is illustrated in FIGS. 16A and 16B, and in FIGS. 20A and 20B.

At 1006 of the method 1000, the cut-patterned layer (i.e., second layer 703) caused to move from an unexpanded condition to an expanded condition (such as is illustrated in FIGS. 20A and 20B, and in FIGS. 21A and 21B). The cut-patterned layer 703 moves to the expanded condition as a result of movement of the first layer 701 and/or third layer 705 to the expanded condition. In particular, the cut-patterned layer 703 expands as a result of the expansion of the particular one of the first layer 701 and third layer 705 to which the layer 703 is adhesively bonded.

As the cut-patterned layer 703 expands longitudinally (FIG. 21A) with first layer 701 and/or third layer 705, the second layer 703 also expands in the Z-direction, i.e., orthogonally to longitudinal axis "Y". The expansion of second layer 703 ds in the Z-direction results in an increases in height or thickness of second layer 703 from a thickness "T2" to a thickness "T4" (FIGS. 20A and 20B). The expansion of the cut-patterned layer 703 opens the slits 703g therein and thereby forms a honeycomb of air pockets 703g' (FIGS. 21A and 21B). The expansion of second layer 703 in the Z-direction gives structural strength to packaging material 710.

At 1008 of method 1000, a length of a packaging material 710 is determined for packaging a particular item, object, or article 14. The length may be determined automatically by a machine or manually by a person. The length is customizable based on the dimensions of the item, object, or article 14 to be enclosed within the packaging enclosure 712 which is to be fabricated from packaging material 710. In other embodiments, the length of the packaging material 710 may be a standard length that is utilized in all packaging enclosures. In the latter instances the standard length will be utilized regardless of the item, object, or article 14 to be packaged. The step 1008 may be performed after step 1002 of receiving the packaging material 710 and prior to moving the at least one substrate layer to an expanded condition in step 1004. Alternatively, the step 1008 may be performed after the steps 1004 and 1006 of the method.

In a step 1010 of method 1000, the selected length of the packaging material 710 is constructed into a packaging enclosure 712 (FIGS. 25 and 26). Step 1010 is performed when packaging material is already in an expanded configuration (i.e., as shown in FIGS. 20A and 21A). It should be noted that as the packaging material 710 is pulled to expand the layers 701, 703, 705, the packaging material is simultaneously treated with heat to activate a heat-activated adhesive coating provided on first layer 701 and third layer 705. Activation of this adhesive coating causes the first layer 701, second layer 703, and third layer 705 to bond to one another while in the expanded condition. After activation of the adhesive coating, the packaging material will remain in the expanded condition for the duration of the fabrication, sealing, and subsequent shipping of the packaging enclosure 712.

It will be understood that in addition to treating the expanding or expanded packaging material with heat to cause the adhesive coating to second first layer 701, second layer 703, and third layer 705 to bond to one another, moisture, and, or pressure, and/or combinations of heat, moisture, and pressure may be used to activate the adhesive coating.

In order to construct packaging enclosure 712, the length of the packaging material 710 is folded generally in half to form a front 712a and a back 712b (FIG. 23) of what will ultimately becoming packaging enclosure 712. Front 712a and back 712b are folded about a fold 712c (FIG. 26). Front 712a terminates in a free end 712a' remote from fold 712c. Similarly, back 712b terminates in a free end 712b' remote from fold 712c.

As a sub step of step 1010, a bonding agent is applied to interior side surfaces of the front 712a and back 712b of the length of the packaging material 710 being used to fabricate the packaging enclosure 712. To this end, at least third layer 705 may include an adhesive coating (as described hereafter) or an adhesive may be applied in a border region of third layer 705 proximate each of the first end 705e and second end 705f. As an example only, an adhesive coating may be present on the lower surface 705b (FIGS. 19A to 19C) of the third layer 705, particularly on the border regions thereof. When packaging material 710 is folded generally in half, the coating on the opposing interior surfaces of the border region of third layer 705 may be bonded to one another in response to application of heat, pressure, moisture, or combinations thereof. The creation of the packaging enclosure 712 may be accomplished through a process done by hand by a human operator or with the use of an apparatus designed for this purpose, or a combination thereof.

When packaging material 710 is folded about fold 712c, the adhesive coating or adhesive enables the interior surfaces of the front 712a and back 712b of the enclosure to be bonded to one another, thereby forming a pocket or interior cavity 712d in the packaging enclosure. The pocket may be formed around the article 14 during construction of the packaging enclosure 712 or the article 14 may be inserted into the pocket after construction of packaging enclosure 712. In particular, the third layer 705 bounds and defines the interior cavity 712d of packaging enclosure 712 while first layer 701 forms an outer layer of packaging enclosure 712. Second layer 703, because of its expansion in the Z-direction, forms a cushioning layer which effectively surrounds the article 14 to be shipped within packaging enclosure 712.

As a further sub step of step 1010 of method 1000, once the border regions of the third layer 705 of the packaging enclosure 712 are bonded to one another and the item, object, or article 14 is received within the interior cavity 712d, the free ends 712a' and 712b' of front 712a and back 712b of packaging enclosure 712 are bonded to one another. This latter step closes off access to interior cavity 712d. A mailing label 712e (FIG. 25) may be applied to an exterior surface of the front 712a of packaging enclosure 712 in any suitable way such as through adhering a separate label thereto or by printing or writing the mailing address directly onto front 712a.

In other embodiments, not illustrated herein, the packaging enclosure 712 is constructed differently. For example, two separate lengths of packaging material 710 may be cut to suit the dimensions of the item, object, or article 14 to be contained within the packaging enclosure 712. The two cut lengths of packaging material 710 are expanded and then bonded along a bottom edge and opposed side edges (i.e., border regions of third layer 705) and thereby form the interior cavity 712d into which the item, object, or article 14 is to be inserted. Ultimately, the two lengths of packaging material are sealed to one another along a top edge to enclose the item, object, or article 14 within the interior cavity 712d of the packaging enclosure 712.

As is evident from FIG. 26, regardless of how the packaging enclosure 712 is actually constructed, the expanded third layer 705 forms an interior layer which directly contacts the item, object, or article 14, the expanded second layer 703 protects the item, object or article 14 from impact during shipping, and the expanded first layer 701 forms an outer layer of the packaging enclosure 712 which further protects the article 14 and provides a place for a mailing label to be applied.

Figure 27:
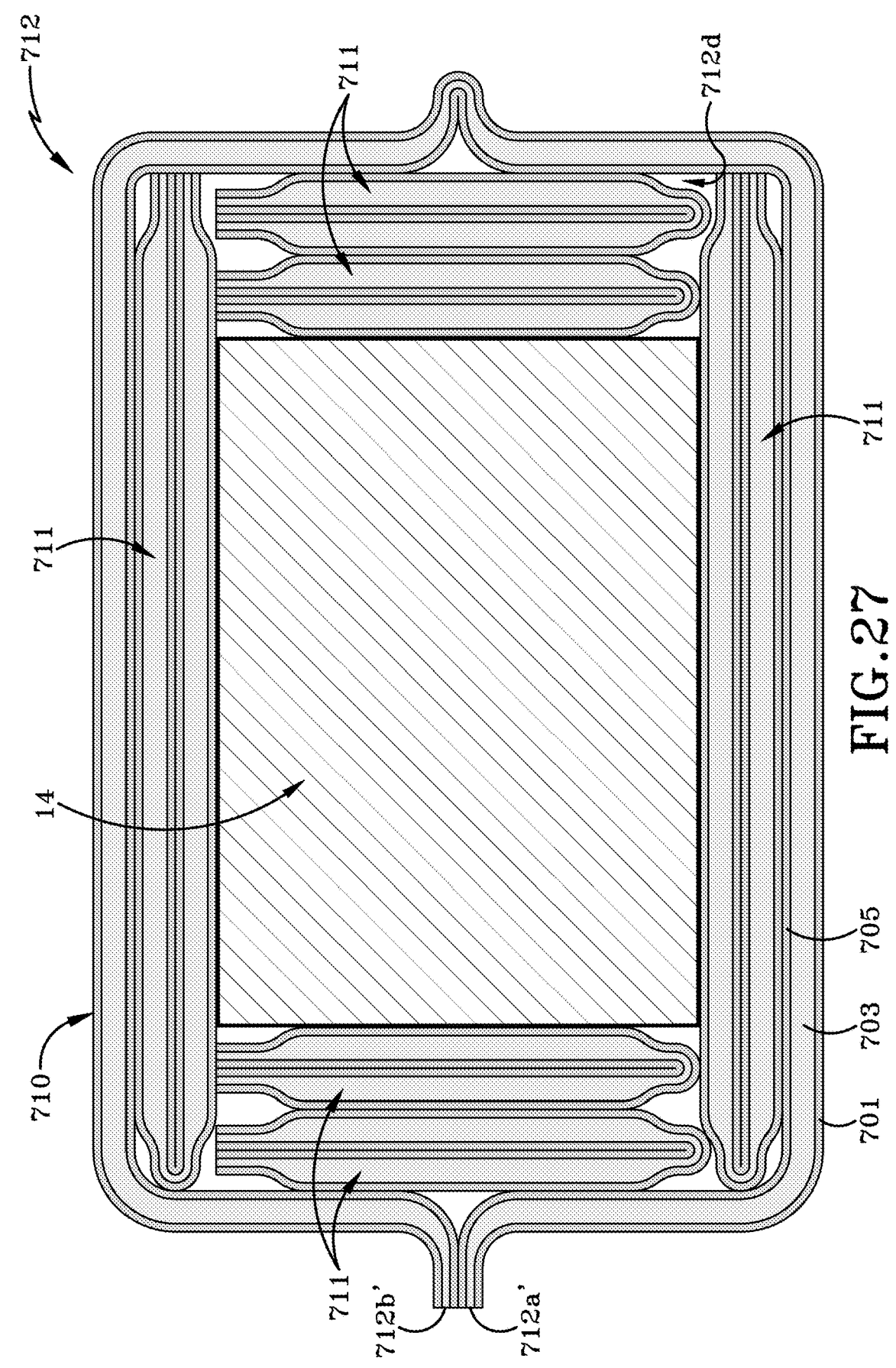
FIG. 27 is a cross-sectional view of the packaging enclosure similar to that of FIG. 26 including a plurality of packaging sleeves fabricated in an substantially identical manner to the packaging enclosure itself.

FIG. 27 shows a packaging enclosure 712 which not only includes the article 14 but also includes a plurality of packing sleeves 711. Packing sleeves 711 may be of any desired size and may be used to replace "packing peanuts". Each packing sleeve 711 is formed in a substantially identical manner to how packaging enclosure 712 is fabricated. In other words, a length of the packaging material 710 is expanded, folded in half to form a front 711a, and a back 711b which meet at a fold 711c. Border regions of the innermost third layer 705 are bonded to one another to form a pocket or interior cavity but no item, object or article 14 is inserted into the interior cavity. The folded length of the packaging material 710 is cut free from the rest of the packaging material and free ends 712a', 712b' of the folded packaging material are bonded to one another. In some instances, a volume of air may be purposefully trapped within the interior cavity of the packing sleeve 711 as it is being formed to add additional shock-absorbing capabilities to the packing sleeve 711. In other instances, the air may be evacuated from the interior cavity prior to sealing free ends 712a' and 712b' to one another.

FIG. 27 shows a plurality of packing sleeves 711 are inserted into interior cavity 712d of packaging enclosure 712. Packing sleeves 711 may be positioned under, on either side, and above the item, object or article 14 received within the interior cavity 712d of packaging enclosure 712 prior to the free ends 712a' and 712b' being bonded to one another.

Figure 28:
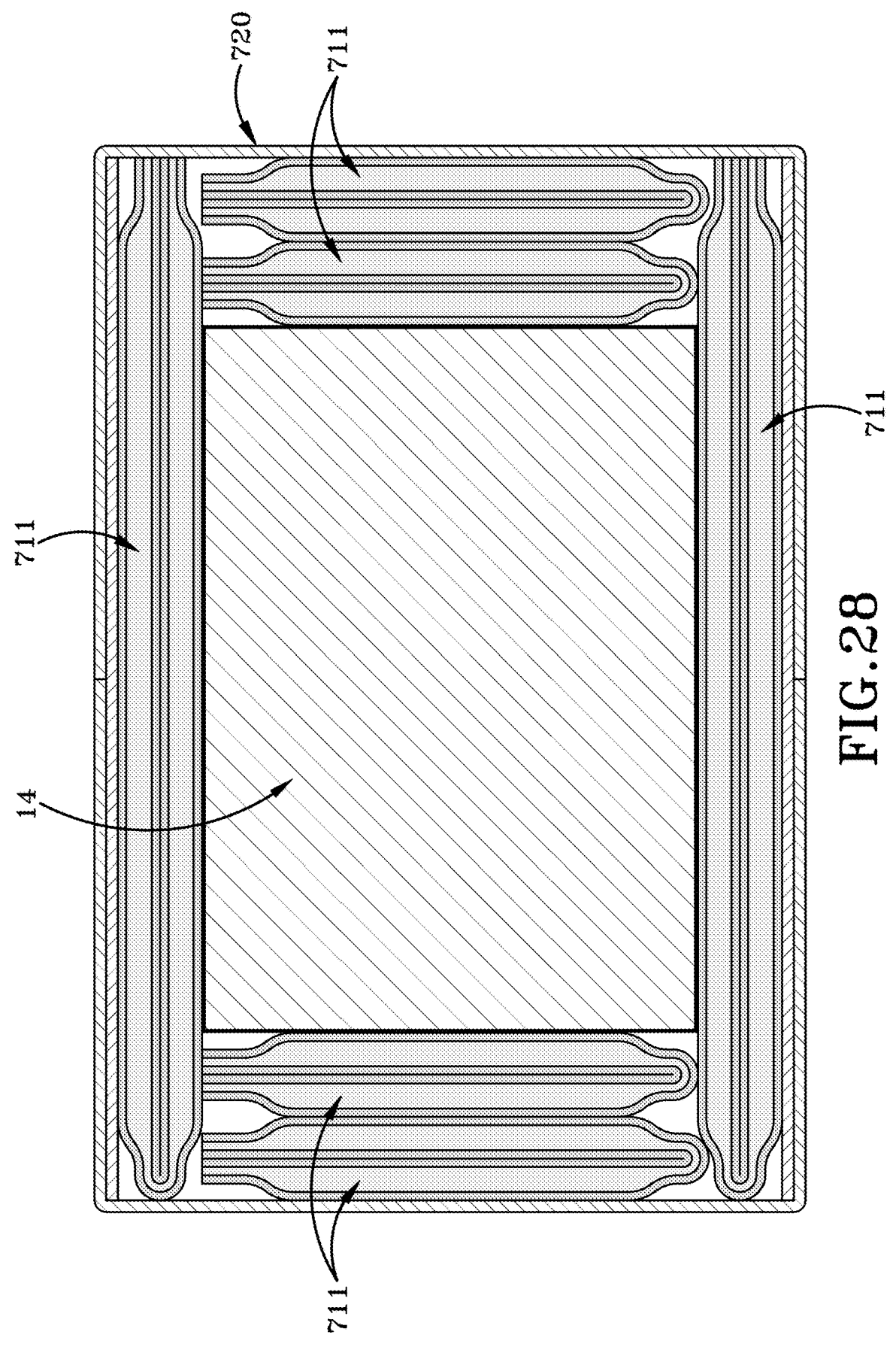
FIG. 28 is a cross sectional view through a packaging box which includes a plurality of packaging sleeves fabricated from the packaging material disclosed in FIGS. 17 to 21.

FIG. 28 shows a plurality of packing sleeves 711 being positioned about an item, object, or article 14 which is placed in a box 720 for shipping. In this particular instance the packing sleeves 711 may be constructed in different lengths to suit the shape of the particular box 720 being used to ship the item, object, or article 14. As many packing sleeves 711 as necessary may be used to cushion the item, object, or article 14 within box 720.

It will be understood that while packaging material 710 has been described herein as having a first layer 701, a second layer 703 and a third layer 705, in other embodiments, more than three layers may be provided in the packaging material in accordance with the present disclosure. In these other embodiments, more than one layer identical or similar to first layer 701 and third layer 705 may be utilized. Additionally or alternatively, more than one layer identical or similar to second layer 703 may be utilized in such other embodiments of the packaging material in accordance with the present disclosure.

In one aspect, the present disclosure is directed to a paper-based packaging system in which a packaging apparatus, machine or person can form a customized package (e.g., an envelope) or enclosure that is customized to the dimensions of an item, object, or article that is to be shipped to a consumer.

The second layer 703 of the packaging material 710 utilized in the packaging system in accordance with an aspect of the present disclosure comprises a filler material that elongates longitudinally when stretched or pulled to an expanded condition The filler material also elongates vertically, increasing in height or thickness. The second layer 703 may shrink laterally and/or longitudinally as it expands vertically. The filler material includes a plurality of slits that open up and form air pockets therein as the filler material expands vertically.

In one aspect, the paper-based packaging material 710 includes at least three layers. The packaging material includes at least one substrate layer 701, 705 that is pulled or extended longitudinally in at least a first direction "D1" and/or "D2" that is effective to cause the second layer 703 of the packaging material 710 to expand in at least a third direction (i.e., the Z-direction).

In some aspects, the paper-based packaging material 710 may include at least three layers 701, 703, 705 including two paper layers which include a plurality of undulations formed therein, and an expanding core layer 703 disposed between the inner and outer layers with undulations. Alternatively, or additionally, the paper based packaging material 710, may include one or more expanding core layers 703 (e.g. of the same or different types of expansion coefficients oriented in a same direction. In other words, some of the one or more core layers may have a different pattern of slits 703g cut therein and therefore produce different shape and sizes of air pockets 703g' (FIG. 21B) therein and or which may expand to various different thicknesses based on the patterns of slits formed therein. One or more expanding core layers (i.e., second layers 703) may be bonded to first layer 701 and one or more expanding core layers may be bonded to third layer 705 but the core layers bonded to first layer 701 may be free of connections to the core layers bonded to third layer 705.

The first and second layers 701, 705 may be of a similar type or weight of paper or they may be of different types of weights of paper. The different types or weights of paper used for first and second layers 701, 705 may provide different levels of packaging protection, durability, or the like.

In various aspects, a packaging apparatus may manipulate the paper-based packaging material 710 in various combinations of one or more directions "D1", "D2" in order to cause an increase in thickness or the Z-height of the second layer 703 and other similar core layers.

In some aspects, the paper-based packaging material 710 may be formed into a roll or cut into sheets. As such, the packaging material 710 is suitable for various levels of packaging automation or preforming into any size or shape of packaging enclosure or envelope. For example, a retailer may receive a roll of the paper-based packaging material 710 which may be formed on site, into any suitable shape and size of packaging enclosure envelope for the products which that particular retailer sells and needs to package or ship.

In some aspects, the paper-based packaging material 710 is formed such that the material can feed a machine with a minimum amount of air.

As discussed earlier herein, the terms "substrate layer" and "carrier layer" used herein may refer to a layer to which one or more other layers are adhered or bonded and which has an ability to activate at least one of those one or more other layers, causing that other layer to expand. It should be understood that although the first layer 703 (or third layer 705) is disclosed herein as including one or more undulations that enable the first layer to be selectively expanded or extended longitudinally, in other embodiments, the first layer 701 or third layer 705 may be gathered or crinkled or include tabs and nodes that allow the paper to be expanded in one or more directions.

Packaging material 710 may be configured to enable flexibility for package size and to facilitate shipping of bulk rolls of the packaging material 710 while in an unexpanded condition. Preferably, packaging material 710 is formed from materials that are recyclable. In one embodiment, each of the one or more layers in packaging material 710 is made from entirely recyclable materials. One suitable material for use as each of the one or more layers is paper.

Packaging material 710 has been disclosed herein as being comprised of three layers 701, 703, 705 which are secured to one another in such a way that causing one of the three layers to expand will automatically cause the other two layers to expand in unison therewith. It will be understood, however, that in other embodiments the layers may be secured to one another such that expanding one of the three layers may automatically cause only one of the other two layers to expand in unison with the first layer, and the last of the three layers will then be expanded separately from the other layers. In yet other embodiments, all three layers of the packaging material will be separately moved from the unexpanded condition to the expanded condition.

While packaging material 710 has been disclosed herein as being comprised of a first layer 701, a second layer 703, and a third layer 705, it will be understood that in other embodiments one or more additional layers may be incorporated into the packaging material. The one or more additional layers may be configured in a substantially identical manner to first layer 701 and third layer 705, or may be configured in a substantially identical manner to second layer 703. In other embodiment, one or more additional layers may be incorporated into packaging material that have characteristics unlike either of the first and third layers 701, 705, or the second layer 703.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A packaging material comprising:
a first layer configurable to form an outer layer of a packaging enclosure;
a second layer configurable to form an inner layer of the packaging enclosure;
a third layer with the second layer disposed between the first layer and the third layer; and
wherein each of the first layer, the second layer, and the third layer is selectively movable from an unexpanded condition to an expanded condition; and
wherein the first layer and the third layer each include a plurality of undulations therein, and wherein the plurality of undulations flatten out when the first layer and the third layer are moved to the expanded condition.

2. The packaging material according to claim 1, further comprising an adhesive applied between part of the second layer and part of one or both of the first layer and the third layer.

3. The packaging material according to claim 2, wherein the adhesive is applied in a quantity sufficient to enable the second layer and the one or both of the first layer and the second layer to move in unison from the unexpanded condition to the expanded condition.

4. The packaging material according to claim 2, wherein the adhesive is applied as one or both of a substantially continuous line of adhesive or a plurality of discrete dots of adhesive applied at intervals from one another.

5. The packaging material according to claim 4, wherein at least a portion of the substantially continuous line of adhesive or some of the plurality of discrete dots of adhesive remain intact after the second layer and the one or both of the first layer and the third layer have moved to the expanded condition.

6. The packaging material according to claim 5, wherein a rest of the substantially continuous line of adhesive and a rest of the plurality of discrete dots of adhesive break contact with one of the first layer, the second layer, and the third layer when the second layer and the one or both of the first layer and the third layer have moved to the expanded condition.

7. The packaging material according to claim 2, wherein the adhesive is one or more of heat sensitive, pressure sensitive, and moisture sensitive.

8. The packaging material according to claim 2, wherein the second layer and the one or both of the first layer and the third layer are bonded to one another by the adhesive prior to being moved to the expanded condition.

9. The packaging material according to claim 1, further comprising an adhesive coating applied to a surface of the first layer and/or a surface of the third layer, wherein the surface of the first layer and/or the surface of the third layer is adjacent the second layer.

10. The packaging material according to claim 1, wherein an adhesive is applied between the first layer and the second layer, and wherein the adhesive is located proximate a side edge of the first layer.

11. The packaging material according to claim 1, wherein an adhesive is applied between the first layer and the second layer, and wherein the adhesive is located a distance inwardly from opposing side edges of the first layer.

12. The packaging material according to claim 1, wherein an adhesive bonds the first layer and the second layer to one another, and wherein the second layer and the third layer are free of attachments to one another.

13. The packaging material according to claim 1, wherein the plurality of undulations include a plurality of at least one of folds or wrinkles.

14. A packaging material comprising:

a first layer configurable to form an outer layer of a packaging enclosure;

a second layer configurable to form an inner layer of the packaging enclosure; and a third layer with the second layer disposed between the first layer and the third layer;

wherein each of the first layer, the second layer, and the third layer is selectively movable from an unexpanded condition to an expanded condition; and wherein the first layer and the third layer are of a substantially identical configuration and include a plurality of undulations therein, and wherein the plurality of undulations flatten when the first layer and the third layer are moved to the expanded condition.

15. The packaging material according to claim 14, wherein the second layer differs in configuration from the first layer and the third layer, wherein the second layer has a first surface adjacent the first layer and a second surface adjacent the third layer, and wherein the second layer increases in thickness between the first surface and the second surface when the second layer is moved to the expanded condition.

16. A packaging material comprising:

a first layer configurable to form an outer layer of a packaging enclosure;

a second layer configurable to form an inner layer of the packaging enclosure;

a third layer with the second layer disposed between the first layer and the third layer;

an adhesive coating applied to a surface of the first layer and/or a surface of the third layer, at least one of the surface of the first layer or the surface of the third layer is adjacent the second layer; and wherein each of the first layer, the second layer, and the third layer is selectively movable from an unexpanded condition to an expanded condition; and wherein the adhesive coating is activated after the first layer, the second layer, and the third layer are moved to the expanded condition, and wherein the adhesive coating keeps the packaging material in the expanded condition and substantially prevents the first layer, the second layer, and the third layer from moving back to the unexpanded condition.

17. The packaging material according to claim 16, wherein the adhesive coating is applied between part of the second layer and part of at least one of the first layer or the third layer.

18. The packaging material according to claim 17, wherein the adhesive coating is applied in a quantity sufficient to enable the second layer and the one or both of the first layer and the second layer to move in unison from the unexpanded condition to the expanded condition.

19. The packaging material according to claim 17, wherein the adhesive coating is applied as at least one of a substantially continuous line of adhesive coating or a plurality of discrete dots of adhesive coating applied at intervals from one another.

20. The packaging material according to claim 16, wherein the adhesive coating is at least one of heat sensitive, pressure sensitive, or moisture sensitive.

* * * * *